United States Patent
Yamazaki et al.

(10) Patent No.: US 12,278,336 B2
(45) Date of Patent: Apr. 15, 2025

(54) ALKALI METAL ELECTRODE TREATMENT AGENT, ELECTROLYTIC SOLUTION FOR ALKALI METAL SECONDARY BATTERY, ALKALI METAL ELECTRODE, ALKALI METAL SECONDARY BATTERY, AND MODULE

(71) Applicant: DAIKIN INDUSTRIES, LTD., Osaka (JP)

(72) Inventors: Shigeaki Yamazaki, Osaka (JP); Yoshiko Kuwajima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 536 days.

(21) Appl. No.: 17/631,084

(22) PCT Filed: Jun. 30, 2020

(86) PCT No.: PCT/JP2020/025642
§ 371 (c)(1),
(2) Date: Jan. 28, 2022

(87) PCT Pub. No.: WO2021/020005
PCT Pub. Date: Feb. 4, 2021

(65) Prior Publication Data
US 2022/0311050 A1    Sep. 29, 2022

(30) Foreign Application Priority Data
Jul. 31, 2019 (JP) .................. 2019-141701

(51) Int. Cl.
*H01M 10/0565* (2010.01)
*H01M 4/38* (2006.01)
*H01M 4/62* (2006.01)
*H01M 10/0525* (2010.01)
*H01M 4/02* (2006.01)

(52) U.S. Cl.
CPC ....... *H01M 10/0565* (2013.01); *H01M 4/381* (2013.01); *H01M 4/623* (2013.01); *H01M 10/0525* (2013.01); *H01M 2004/027* (2013.01); *H01M 2300/0034* (2013.01)

(58) Field of Classification Search
CPC .. H01M 10/0565; H01M 4/381; H01M 4/623; H01M 2004/027; H01M 10/0525; H01M 2300/0034
See application file for complete search history.

(56) References Cited

U.S. PATENT DOCUMENTS

| | | | |
|---|---|---|---|
| 2009/0004568 A1* | 1/2009 | Hirose | H01M 50/119 429/221 |
| 2014/0050981 A1* | 2/2014 | Kang | H01M 4/623 429/211 |
| 2014/0199599 A1 | 7/2014 | Yu et al. | |
| 2015/0147645 A1* | 5/2015 | Lee | H01M 4/139 429/200 |
| 2018/0115006 A1* | 4/2018 | Lee | C08J 3/24 |

FOREIGN PATENT DOCUMENTS

| | | |
|---|---|---|
| EP | 0 206 899 A1 | 12/1986 |
| EP | 3 422 444 A2 | 1/2019 |
| JP | 06-283205 A | 10/1994 |
| JP | 11-67208 A | 3/1999 |
| JP | 2008-293872 A | 12/2008 |
| JP | 2012-043632 A | 3/2012 |
| JP | 2012-119091 A | 6/2012 |
| JP | 2012043632 * | 6/2012 |
| JP | 2013-231168 A | 11/2013 |
| JP | 2015-518263 A | 6/2015 |
| JP | 2018-85331 A | 5/2018 |
| KR | 10-2013-0134743 A | 12/2013 |
| KR | 10-2015-0026717 A | 3/2015 |
| WO | 2013/151003 A1 | 10/2013 |

OTHER PUBLICATIONS

The Decision of JPO to grant a Patent for Application JP 2021536852 (Year: 2023).*
The Notice of SIPO to grant a Patent for Application CN 202080044705 (Year: 2024).*
International Preliminary Report on Patentability with a translation of the Written Opinion dated Feb. 1, 2022 from the International Bureau in International Application No. PCT/JP2020/025642.
International Search Report for PCT/JP2020/025642, dated Sep. 29, 2020.

(Continued)

*Primary Examiner* — Alexander Usyatinsky
(74) *Attorney, Agent, or Firm* — Sughrue Mion, PLLC

(57) ABSTRACT

An alkali metal electrode treatment agent including an acrylate represented by the following general formula (1):

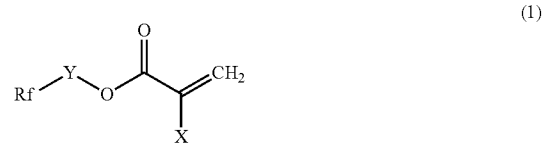

(1)

wherein X, Y and Rf are as defined herein and/or a polymer containing an acrylate represented by the general formula (1) as a part or all of its constituent units. Also disclosed is an electrolytic solution for an alkali metal secondary battery and an alkali metal electrode including the acrylate represented by the general formula (1), an alkali metal secondary battery including the alkali metal electrode, and a module including the alkali metal secondary battery.

3 Claims, No Drawings

(56) References Cited

OTHER PUBLICATIONS

Jens Höpken et al., "Synthesis and Mesoscopic Organization of Perfluoroalkyl-Alkylene Methacrylate Monomers", Mol. Cryst. Liq. Cryst., 1992, vol. 210, pp. 59-73 (15 pages).
Extended European Search Report dated Jul. 5, 2024, issued in European Application No. 20845911.5.

* cited by examiner

ALKALI METAL ELECTRODE TREATMENT AGENT, ELECTROLYTIC SOLUTION FOR ALKALI METAL SECONDARY BATTERY, ALKALI METAL ELECTRODE, ALKALI METAL SECONDARY BATTERY, AND MODULE

This application is a National Stage of International Application No. PCT/JP2020/025642 filed Jun. 30, 2020, claiming priority based on Japanese Patent Application No. 2019-141701 filed Jul. 31, 2019.

TECHNICAL FIELD

The present disclosure relates to alkali metal electrode treatment agents, electrolytic solutions for an alkali metal secondary battery, alkali metal electrodes, alkali metal secondary batteries, and modules.

BACKGROUND ART

Alkali metal secondary batteries in which an alkali metal having a high theoretical capacity is employed as the negative electrode recently have been under research and development, for the purpose of achieving a further higher energy density in alkali metal secondary batteries typified by lithium secondary batteries.

However, in a case of a secondary battery using an alkali metal, repeated charge and discharge generates the alkali metal (dendrites) on the alkali metal electrode, which leads to a short circuit of the battery. Thus, problematically, the battery life is reduced.

Patent Literature 1 discloses an electrode plate for a secondary battery that includes, as an active material, a lithium metal-lithium compound composite material in which many lithium metal particles whose surfaces are covered with a lithium compound layer containing lithium carbonate are compressed.

Patent Literature 2 discloses that flame retardancy is imparted by using a perfluorocarbon in an electrolytic solution.

Patent Literature 3 discloses improvement of the life of a secondary battery by using a negative electrode on which a fluororesin film having an ether bond is formed.

Patent Literature 4 discloses a polymer provided by radically-polymerizing a fluoroalkyl group-containing acrylate.

Patent Literatures 5 and 6 each discloses a non-aqueous electrolytic solution containing a specific unsaturated carboxylate.

CITATION LIST

Patent Literature

Patent Literature 1: Japanese Patent Laid-Open No. 11-67208

Patent Literature 2: Japanese Patent Laid-Open No. 6-283205

Patent Literature 3: Japanese Patent Laid-Open No. 2008-293872

Patent Literature 4: Japanese Patent Laid-Open No. 2013-231168

Patent Literature 5: Japanese Patent Laid-Open No. 2012-119091

Patent Literature 6: Japanese Patent Laid-Open No. 2012-43632

SUMMARY OF INVENTION

Technical Problem

The present disclosure aims to provide an alkali metal electrode treatment agent, an electrolytic solution for an alkali metal secondary battery and an alkali metal electrode that can improve the life of a battery by suppressing precipitation of dendrites, and an alkali metal secondary battery and a module comprising these.

Solution to Problem

The present disclosure relates to an alkali metal electrode treatment agent comprising an acrylate represented by the following general formula (1):

[Formula 1]

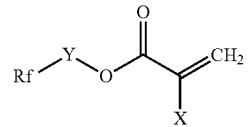

(1)

wherein X is a hydrogen atom, a fluorine atom, a chlorine atom, a bromine atom, an iodine atom, a $CFX^1X^2$ group (wherein $X^1$ and $X^2$ are the same as or different from each other and are each a hydrogen atom, a fluorine atom, or a chlorine atom), a cyano group, a linear or branched fluoroalkyl group having 1 to 21 carbon atoms, a substituted or unsubstituted benzyl group, a substituted or unsubstituted phenyl group, or a linear or branched alkyl group having 1 to 20 carbon atoms, Y is a direct bond, a hydrocarbon group having 1 to 10 carbon atoms and optionally having an oxygen atom or a sulfur atom, a $-CH_2CH_2N(R^1)SO_2-$ group (wherein $R^1$ is an alkyl group having 1 to 4 carbon atoms), a $-CH_2CH(OY^1)CH_2-$ group (wherein $Y_1$ is a hydrogen atom or an acetyl group), or a $-(CH_2)_nSO_2-$ group (n is 1 to 10), and Rf is a linear or branched fluorinated alkyl group having 2 to 7 carbon atoms, and/or a polymer containing an acrylate represented by the general formula (1) as a part or all of the constituent units.

Rf in the above general formula (1) is preferably a linear or branched perfluoroalkyl group having 2 to 7 carbon atoms.

The present disclosure also relates to an electrolytic solution for an alkali metal secondary battery comprising an acrylate represented by the following general formula (1):

[Formula 2]

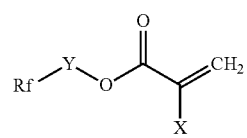

(1)

wherein X is a hydrogen atom, a fluorine atom, a chlorine atom, a bromine atom, an iodine atom, a $CFX^1X^2$ group (wherein $X^1$ and $X^2$ are the same as or different from each other and are each a hydrogen atom, a fluorine atom, or a chlorine atom), a cyano group, a linear or branched fluoroalkyl group having 1 to 21 carbon atoms, a substituted or unsubstituted benzyl group, a substituted or unsubstituted phenyl group, or a linear or branched alkyl group having 1 to 20 carbon atoms, Y is a direct bond, a hydrocarbon group having 1 to 10 carbon atoms and optionally having an oxygen atom or a sulfur atom, a —$CH_2CH_2N(R^1)SO_2$— group (wherein $R^1$ is an alkyl group having 1 to 4 carbon atoms), a —$CH_2CH(OY^1)CH_2$— group (wherein $Y^1$ is a hydrogen atom or an acetyl group), or a —$(CH_2)_nSO_2$— group (n is 1 to 10), and Rf is a linear or branched fluorinated alkyl group having 2 to 7 carbon atoms.

Rf in the above general formula (1) is preferably a linear or branched perfluoroalkyl group having 2 to 7 carbon atoms.

The present disclosure also relates to an alkali metal electrode comprising an acrylate represented by the above general formula (1) and/or a polymer containing an acrylate represented by the general formula (1) as a part or all of the constituent units.

The present disclosure also relates to an alkali metal secondary battery comprising the above alkali metal electrode as a negative electrode.

The present disclosure also relates to an alkali metal secondary battery in which the above electrolytic solution for an alkali metal secondary battery is used.

The present disclosure also relates to a module comprising the above alkali metal secondary battery.

Advantageous Effect of Invention

According to the present disclosure, suppression of precipitation of dendrites on the alkali metal can improve the life of a battery as well as suppress increase in resistance.

DESCRIPTION OF EMBODIMENT

Hereinafter, the present disclosure will be concretely described.

The present disclosure significantly improves the life by treating an alkali metal surface with a specific fluorine alkyl-containing acrylate and/or a polymer at least partially having a structure derived from such a fluorine alkyl-containing acrylate.

An alkali metal electrode treatment agent of the present disclosure includes an acrylate represented by the following general formula (1) and/or a polymer thereof:

[Formula 3]

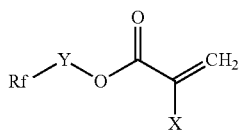

(1)

wherein X is a hydrogen atom, a fluorine atom, a chlorine atom, a bromine atom, an iodine atom, a $CFX^1X^2$ group (wherein $X^1$ and $X^2$ are the same as or different from each other and are each a hydrogen atom, a fluorine atom, or a chlorine atom), a cyano group, a linear or branched fluoroalkyl group having 1 to 21 carbon atoms, a substituted or unsubstituted benzyl group, a substituted or unsubstituted phenyl group, or a linear or branched alkyl group having 1 to 20 carbon atoms, Y is a direct bond, a hydrocarbon group having 1 to 10 carbon atoms and optionally having an oxygen atom or a sulfur atom, a —$CH_2CH_2N(R^1)SO_2$— group (wherein $R^1$ is an alkyl group having 1 to 4 carbon atoms), a —$CH_2CH(OY^1)CH_2$— group (wherein $Y^1$ is a hydrogen atom or an acetyl group), or a —$(CH_2)_nSO_2$— group (n is 1 to 10), and Rf is a linear or branched fluorinated alkyl group having 2 to 7 carbon atoms.

The above acrylate (1) is provided by ester-bonding of a fluorinated alkyl group directly or via a specific divalent organic group to an acrylic acid optionally having a substituent at the α-position.

A polymer of the acrylate (1) is a compound having a nature of a robust fluorine alkyl group. When such a compound is contained in an alkali metal electrode, it is presumed that reductive decomposition of the electrolytic solution is suppressed as well as a favorable precipitation form of lithium metal is generated to thereby enable deactivation of the alkali metal on the electrode to be suppressed.

In the general formula (1), the hydrocarbon group may be cyclic or acyclic, or may be linear or branched.

In the general formula (1), the fluorinated alkyl group is an alkyl group in which at least one hydrogen atom is replaced by a fluorine atom, including a perfluoroalkyl group in which all the hydrogen atoms are replaced by fluorine atoms. Rf is preferably a perfluoroalkyl group in view of difficulty of dissolving in an electrolytic solution.

In the general formula (1), Rf is preferably a linear or branched fluoroalkyl group having 2 to 7 carbon atoms, particularly preferably a linear or branched perfluoroalkyl group having 4 to 6 carbon atoms, in view of favorable solubility in fluorine-based organic solvents mentioned below, particularly hydrofluoroethers. When the Rf is a linear or branched fluoroalkyl group having 4 to 6 carbon atoms, preferred is an α-position-substituted acrylate in which the substituent at the α-position represented by X is a group or an atom other than a hydrogen atom in the general formula (1), in order to further improve the waterproof property of a film to be formed.

Particularly, when the substituent X at the α-position is a methyl group or a fluorine atom, a film having a favorable waterproof property and not impairing ion conductivity and dispersibility of a solid electrolyte can be formed using an inexpensive raw material. The substituent X at the α-position is particularly preferably a methyl group.

In the general formula (1), Y is preferably a hydrocarbon group having 1 to 10 carbon atoms and optionally having an oxygen atom or a sulfur atom, more preferably an alkylene group having 1 to 10 carbon atoms, further preferably an alkylene group having 1 to 5 carbon atoms, further preferably an alkylene group having 1 to 3 carbon atoms.

Specific examples of the acrylate (1) are as follows.

[Formula 4]

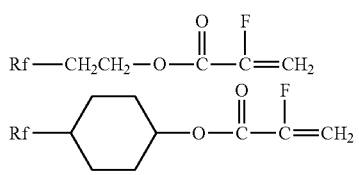

-continued

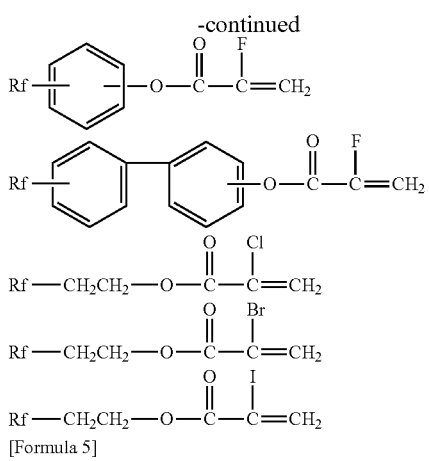

[Formula 5]

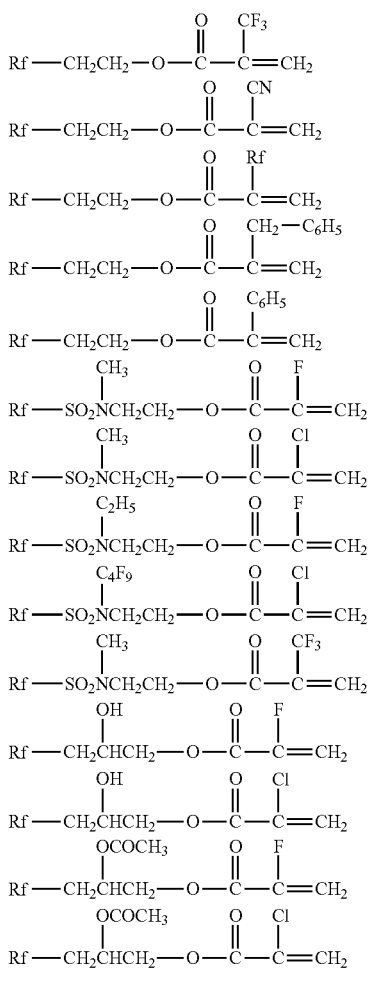

[Formula 6]

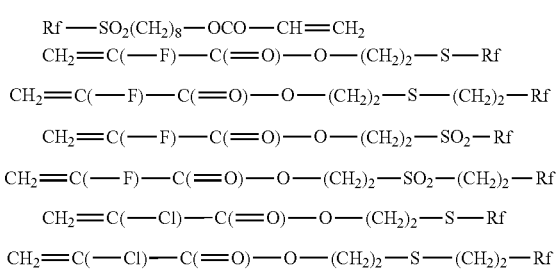

-continued

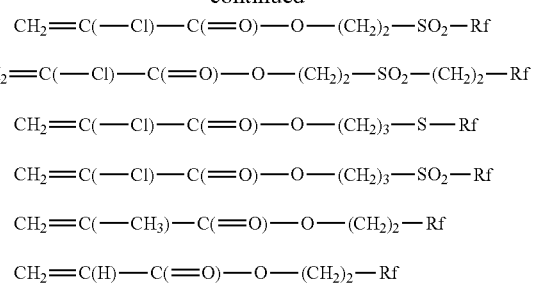

Preferred among the above acrylates (1) are as follows.

[Formula 7]

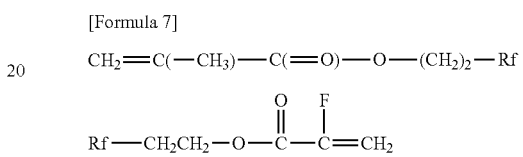

One of the acrylates (1) may be used singly, or two or more thereof may be used in admixture.

The alkali metal electrode treatment agent of the present disclosure contains an acrylate represented by the general formula (1) and/or a polymer thereof, but may further contain a monomer other than the above acrylates. Furthermore, the above polymer may be a homopolymer of the acrylate or may be a copolymer in which a monomer other than the acrylates represented by the general formula (1) is used in combination with an acryl ester monomer represented by the general formula (1). Hereinafter, a "monomer other than the acrylates represented by the general formula (1)" will be described in detail, which monomer can be blended in an alkali metal electrode treatment agent or used as a copolymerizing component in a copolymer.

The above "monomer other than the acrylates represented by the general formula (1)" is preferably one based on at least one selected from the group consisting of a (meth)acrylate (2) represented by the following general formula (2), an alkoxysilyl group-containing monomer (3) represented by the following general formula (3), and a vinyl-based monomer (hereinafter, also referred to as the second monomer).

General Formula (2)

[Formula 8]

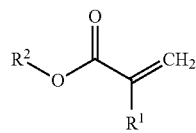

(2)

wherein $R^1$ is H or $CH_3$, and $R^2$ is a hydrocarbon group having 6 or more carbon atoms and having a ring structure.

General Formula (3)

[Formula 9]

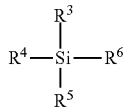

(3)

wherein $R^3$, $R^4$, and $R^5$ are the same as or different from each other, and are each an alkyl group having 1 to 4 carbon atoms or an alkoxy group having 1 to 4 carbon atoms, at least one of $R^3$, $R^4$, and $R^5$ is the above alkoxy group, and $R^6$ is a group containing a radical-polymerizable unsaturated bond.

In the general formula (2), the above hydrocarbon group as $R^2$ has 6 or more carbon atoms. The number of the carbon atoms is preferably 7 or more, while preferably 20 or less, more preferably 15 or less.

Examples of the hydrocarbon group as $R^2$ include groups having a hydrocarbon ring such as a group having an aliphatic hydrocarbon ring and a group having an aromatic hydrocarbon ring.

Examples of the group having an aliphatic hydrocarbon ring include cycloalkyl groups; and groups having a crosslinked hydrocarbon ring such as isobornyl, bornyl, fenchyl, adamantyl, and norbornyl.

Examples of the group having an aromatic hydrocarbon ring include a phenyl group and a benzyl group.

The hydrocarbon group is preferably a cycloalkyl group, a group having a crosslinked hydrocarbon ring, and a benzyl group, more preferably a group having a crosslinked hydrocarbon ring.

The hydrocarbon ring may be bonded directly to a carboxyl group or may be bonded via a linear or branched alkylene group having 1 to 5 carbon atoms to a carboxyl group. The hydrocarbon ring may further include replacement by a hydroxyl group or an alkyl group (the number of carbon atoms: 1 to 5, for example).

Examples of the above (meth)acrylate (2) may include a (meth)acrylate having a cyclohexyl group, a (meth)acrylate having a benzyl group, a (meth)acrylate having an isobornyl group, a (meth)acrylate having a norbornyl group, and a (meth)acrylate having an adamantyl group.

Among these, examples of the (meth)acrylate having a cyclohexyl group may include cyclohexyl (meth)acrylate.

Examples of the (meth)acrylate having a benzyl group may include benzyl (meth)acrylate.

Examples of the (meth)acrylate having an isobornyl group may include isobornyl (meth)acrylate and isobornyl methyl (meth)acrylate.

Examples of the (meth)acrylate having a norbornyl group may include 3-methyl-norbornyl methyl(meth)acrylate, norbornyl methyl(meth)acrylate, norbornyl (meth)acrylate, 1,3,3-trimethyl-norbornyl (meth)acrylate, myrtanylmethyl (meth)acrylate, isopinocamphanyl (meth)acrylate, and 2-{[5-(1',1',1'-trifluoro-2'-trifluoromethyl-2'-hydroxy)propyl]norbornyl} (meth)acrylate.

Examples of the (meth)acrylate having an adamantyl group may include 2-methyl-2-adamantyl (meth)acrylate, 2-ethyl-2-adamantyl (meth)acrylate, 3-hydroxy-1-adamantyl (meth)acrylate, and 1-adamantyl-α-trifluoromethyl (meth)acrylate.

As the (meth)acrylate (2), among these, (meth)acrylates having an isobornyl group are preferred, and isobornyl (meth)acrylate is more preferred.

In the general formula (3), $R^3$, $R^4$, and $R^5$ are the same as or different from each other and are each an alkyl group having 1 to 4 carbon atoms or an alkoxy group having 1 to 4 carbon atoms. At least one of $R^3$, $R^4$, and $R^5$ is the above alkoxy group. As the alkoxy group, a methoxy group or the like is preferred, and all of $R^3$, $R^4$, and $R^5$ are particularly preferably methoxy groups or ethoxy groups. $R^6$ is a group containing a radical-polymerizable unsaturated bond.

Specific examples of the above alkoxysilyl group-containing monomer (3) may include monomers represented by the following formulas.

[Formula 10]

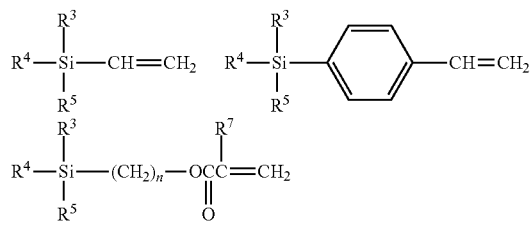

In each of the above formulas, $R^3$, $R^4$, and $R^5$ are as described above, $R^7$ is a hydrogen atom, a methyl group, or Cl, and n is an integer of 1 to 10.

$R^7$ is preferably a hydrogen atom or a methyl group, more preferably a methyl group.

n is preferably 1 to 5, more preferably 1 to 3.

A preferred among the above alkoxysilyl group-containing monomer (3) is as follows.

[Formula 11]

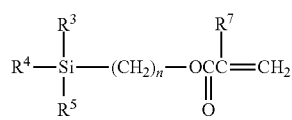

Examples of the above vinyl-based monomer include vinyl compounds having a fluorine atom such as trifluoromethylvinyl, perfluoroethylvinyl, and perfluoroethylethervinyl, and vinyl compounds having a chlorine atom such as vinyl chloride and vinylidene chloride.

One of the second monomers may be used singly, or two or more thereof may be used in admixture.

Preferred among the above second monomers is at least one selected from the group consisting of the (meth)acrylate (2) and the alkoxysilyl group-containing monomer (3).

The content of the (meth)acrylate (2) is preferably 1 to 30 parts by mass based on 100 parts by mass of the acrylate represented by the general formula (1). The above content is more preferably 5 parts by mass or more, further preferably 10 parts by mass or more, while more preferably 20 parts by mass or less.

The content of the alkoxysilyl group-containing monomer (3) is preferably 1 to 30 parts by mass based on 100 parts by mass of the acrylate represented by the general formula (1). The above content is more preferably 5 parts by mass or more, further preferably 10 parts by mass or more, while more preferably 20 parts by mass or less.

The alkali metal electrode treatment agent or the polymer may further include, as required, a monomer (4) other than (1) to (3) mentioned above or a structural unit derived from the monomer (4). The content of the monomer (4) is only required to be 20% by mass or less, is preferably 10% by mass or less based on the total amount of the total structural units constituting the fluorine-containing polymer.

The further monomer (4) is only required to be a monomer copolymerizable with the acrylate (1) and the second monomer, and can be selected from a broad range as long as the monomer does not adversely affect the performance of a fluorine-containing polymer to be provided. Examples of the further monomer may include, but are not limited to, an aromatic alkenyl compound, a vinyl cyanide compound, a conjugated diene compound, a halogen-containing unsaturated compound, a silicon-containing unsaturated compound, an unsaturated dicarboxylic acid compound, a vinyl ester compound, an allyl ester compound, an unsaturated group-containing ether compound, a maleimide compound, a (meth)acrylate, acrolein, methacrolein, a cyclopolymerizable monomer, and a N-vinyl compound.

The alkali metal electrode treatment agent of the present disclosure may contain the acrylate represented by the general formula (1) or may contain a polymer containing an acrylate represented by the general formula (1) as a part or all of the constituent units. Furthermore, the alkali metal electrode treatment agent may contain both the monomer and the polymer. The acrylate represented by the general formula (1) is brought into contact with an alkali metal to thereby cause a polymerization reaction. Thus, also when the alkali metal electrode treatment agent containing a monomer is used, a polymer is formed. This can provide an alkali metal electrode comprising the compound represented by the general formula (1) and/or the polymer containing an acrylate represented by the general formula (1) as a part or all of the constituent units.

A polymerization method to obtain the polymer containing an acrylate represented by the general formula (1) is not limited, and solution polymerization is preferably conducted in a fluorine-based solvent. This method, which forms a fluorine-containing polymer having favorable solubility in a fluorine-based solvent, smoothly enables a radical polymerization reaction to proceed, without formation of precipitates.

The polymer containing an acrylate represented by the general formula (1) has a weight average molecular weight of preferably 3,000 to 500,000, preferably 5,000 to 300,000. The weight average molecular weight of the fluorine-containing polymer has been measured by GPC (gel permeation chromatography) using a mixed solvent of HCFC225 (AK-225 (manufactured by AGC Inc.))/hexafluoroisopropanol (=90/10 mass) as an elution solvent (in terms of standard polymethyl methacrylate).

The alkali metal electrode treatment agent comprising the aforementioned acrylate represented by the general formula (1) and/or the polymer containing an acrylate represented by the general formula (1) as a part or all of the constituent units preferably contains an acrylate represented by the general formula (1). The reason is that use of this can eliminate a step of providing a polymer and is advantageous in terms of the cost.

Furthermore, also when a monomer other than the aforementioned acrylate represented by the general formula (1) is used in combination, a polymerization reaction occurs on the alkali metal surface to form a film in the same manner. Accordingly, the alkali metal electrode treatment agent of the present disclosure may contain, in addition to the acrylate represented by the general formula (1), at least one selected from the group consisting of a (meth)acrylate (2) represented by the general formula (2), an alkoxysilyl group-containing monomer (3) represented by the general formula (3), and a vinyl-based monomer. Additionally, a further monomer may be blended thereto. The blending proportions thereof is as mentioned above.

The alkali metal electrode treatment agent containing the acrylate represented by the general formula (1) is one prepared by dissolving the essential components in a solvent. An alkali metal electrode is brought into contact with the alkali metal electrode treatment agent to thereby be subjected to a required treatment.

The alkali metal electrode treatment agent of the present disclosure, when comprising a polymer containing an acrylate represented by the general formula (1) as a part or all of the constituent units, may be used in a method in which the treatment liquid prepared by dissolving the polymer in the solvent is applied on the alkali metal surface and dried to form a film.

The aforementioned alkali metal electrode treatment agent is preferably one prepared by dissolving the aforementioned acrylate and/or polymer thereof in a solvent. Examples of the solvent that can be used here include a fluorine-based solvent, toluene, xylene, dibutyl ether, heptane, and butyl n-butyrate. Preferred among these is a fluorine-based solvent. One of the above organic solvents may be used singly, or two or more thereof may be used in admixture.

The alkali metal electrode treatment agent of the present disclosure preferably contains the acrylate represented by the general formula (1) and/or polymer containing an acrylate represented by the general formula (1) as a part or all of the constituent units at a concentration of 1 to 50 g/l (in terms of weight of the acrylate represented by the general formula (1)) although the concentration is not limited. Containing the acrylate and/or polymer at such a concentration enables the aforementioned effects to be suitably achieved.

The present disclosure also provides an electrolytic solution containing the aforementioned acrylate represented by the general formula (1). As mentioned above, the acrylate represented by the general formula (1), when brought into contact with the alkali metal electrode, can start to be polymerized to thereby form a resin coating. Accordingly, after a laminate including an electrode, a separator, and the like is formed, injection of the electrolytic solution containing the aforementioned acrylate represented by the general formula (1) therein is preferred because the acrylate in the electrolytic solution causes a polymerization reaction on the alkali metal electrode to thereby form a coating.

The concentration of the acrylate represented by the general formula (1) is preferably in the proportion of 0.01 to 5% by mass based on the total amount of the electrolytic solution. The concentration within the above range is preferred because the polymer can be favorably precipitated on the alkali metal electrode.

The electrolytic solution of the present disclosure or the electrolytic solution for use in the alkali metal secondary battery of the present disclosure may contain at least one selected from the group consisting of the (meth)acrylate (2) represented by the general formula (2), the alkoxysilyl group-containing monomer (3) represented by the general formula (3), and the vinyl-based monomer, exemplified for the aforementioned alkali metal electrode treatment agent of the present disclosure. Additionally, a further monomer may be blended thereto. The blending proportions thereof is as described in detail for the alkali electrode treatment agent.

The electrolytic solution of the present disclosure or the electrolytic solution for use in the alkali metal secondary battery of the present disclosure are not limited except for containing the acrylate represented by the general formula (1), and can contain known electrolytic solution components described in detail hereinafter as further components.

The present disclosure also provides an alkali metal electrode comprising the compound represented by the general formula (1) and/or a polymer thereof. Such an alkali metal electrode of the present disclosure can be provided by treating an alkali metal with the aforementioned alkali metal electrode treatment agent of the present disclosure. Furthermore, when a battery is produced with the aforementioned electrolytic solution of the present disclosure or electrolytic solution for use in the alkali metal secondary battery of the present disclosure, contact of the electrolytic solution with the electrode results in the alkali metal electrode of the present disclosure.

The present disclosure also provides an alkali metal secondary battery comprising the aforementioned alkali metal electrode of the present disclosure. The present disclosure further provides an alkali metal secondary battery in which the electrolytic solution for an alkali metal secondary battery of the present disclosure is used. In the alkali metal secondary battery of the present disclosure, the positive electrode, electrolytic solution compositional features, separator, and the like that are used may be known common ones.

Those will be described in detail hereinafter.

<Electrolytic Solution>

The electrolytic solution in the alkali metal secondary battery of the present disclosure may contain the aforementioned components. The electrolytic solution for use in the alkali metal secondary battery of the present disclosure may contain the following components.

The electrolytic solution of the present disclosure or the electrolytic solution for use in the alkali metal secondary battery of the present disclosure preferably contains a solvent.

The solvent preferably contains at least one selected from the group consisting of a carbonate and a carboxylate.

The carbonate may be a cyclic carbonate or a chain carbonate.

The cyclic carbonate may be a non-fluorinated cyclic carbonate or a fluorinated cyclic carbonate.

An example of the non-fluorinated cyclic carbonate includes a non-fluorinated saturated cyclic carbonate. Preferred is a non-fluorinated saturated alkylene carbonate having an alkylene group having 2 to 6 carbon atoms, and more preferred is a non-fluorinated saturated alkylene carbonate having an alkylene group having 2 to 4 carbon atoms.

Of these, in respect of high permittivity and a suitable viscosity, the non-fluorinated saturated cyclic carbonate is preferably at least one selected from the group consisting of ethylene carbonate, propylene carbonate, cis-2,3-pentylene carbonate, cis-2,3-butylene carbonate, 2,3-pentylene carbonate, 2,3-butylene carbonate, 1,2-pentylene carbonate, 1,2-butylene carbonate, and butylene carbonate.

One of the non-fluorinated saturated cyclic carbonates may be used singly, or two or more thereof may be used in any combination at any ratio.

When the non-fluorinated saturated cyclic carbonate is contained, the content of the non-fluorinated saturated cyclic carbonate is preferably 5 to 90% by volume, more preferably, 10 to 60% by volume, further preferably, 15 to 45% by volume with respect to the solvent.

The fluorinated cyclic carbonate is a cyclic carbonate having a fluorine atom. A solvent containing a fluorinated cyclic carbonate can be suitably used also at a high voltage.

The term "high voltage" herein means a voltage of 4.2 V or more. The upper limit of the "high voltage" is preferably 4.9 V.

The fluorinated cyclic carbonate may be a fluorinated saturated cyclic carbonate or a fluorinated unsaturated cyclic carbonate.

The fluorinated saturated cyclic carbonate is a saturated cyclic carbonate having a fluorine atom. Specific examples thereof include a compound represented by the following general formula (A):

[Formula 12]

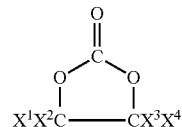

(A)

wherein $X^1$ to $X^4$ are the same as or different from each other, and are each —H, —$CH_3$, —$C_2H_5$, —F, a fluorinated alkyl group optionally having an ether bond, or a fluorinated alkoxy group optionally having an ether bond; provided that at least one of $X^1$ to $X^4$ is —F, a fluorinated alkyl group optionally having an ether bond, or a fluorinated alkoxy group optionally having an ether bond. Examples of the fluorinated alkyl group include —$CF_3$, —$CF_2H$, and —$CH_2F$.

In the case where the electrolytic solution of the present disclosure or the electrolytic solution for use in the alkali metal secondary battery of the present disclosure, when containing the fluorinated saturated cyclic carbonate, is applied to a high-voltage lithium ion secondary battery or the like, the oxidation resistance of the electrolytic solution can be improved, and stable and excellent charge and discharge characteristics can be provided.

The term "ether bond" herein means a bond represented by —O—.

In respect of favorable permittivity and oxidation resistance, one or two of $X^1$ to $X^4$ is/are each preferably —F, a fluorinated alkyl group optionally having an ether bond, or a fluorinated alkoxy group optionally having an ether bond.

In anticipation of decrease in a viscosity at low temperature, increase in the flash point, and improvement in the solubility of an electrolyte salt, $X^1$ to $X^4$ are each preferably —H, —F, a fluorinated alkyl group (a), a fluorinated alkyl group having an ether bond (b), or a fluorinated alkoxy group (c).

The fluorinated alkyl group (a) is a group obtainable by replacing at least one hydrogen atom of an alkyl group by a fluorine atom. The fluorinated alkyl group (a) has preferably 1 to 20 carbon atoms, more preferably 1 to 17 carbon atoms, further preferably 1 to 7 carbon atoms, particularly preferably 1 to 5 carbon atoms.

An excessively large number of carbon atoms may lead to deterioration of the low-temperature characteristics and decrease in the solubility of an electrolyte salt.

Examples of the fluorinated alkyl group (a) having 1 carbon atom include $CFH_2$—, $CF_2H$—, and $CF_3$—. In respect of high-temperature storage characteristics, particularly preferred is $CF_2H$— or $CF_3$—, and most preferred is $CF_3$—.

In respect of favorable solubility of an electrolyte salt, among the above fluorinated alkyl groups (a), a preferred example of the group (a) having 2 or more carbon atoms includes a fluorinated alkyl group represented by the following general formula (a-1):

wherein $R^1$ is an alkyl group having one or more carbon atoms and optionally having a fluorine atom; $R^2$ is an alkylene group having 1 to 3 carbon atoms and optionally having a fluorine atom; provided that at least one of $R^1$ and $R^2$ has a fluorine atom.

$R^1$ and $R^2$ each may further have an atom other than carbon, hydrogen, and fluorine atoms.

$R^1$ is an alkyl group having one or more carbon atoms and optionally having a fluorine atom. $R^1$ is preferably a linear or branched chain alkyl group having 1 to 16 carbon atoms. $R^1$ has more preferably 1 to 6 carbon atoms, further preferably 1 to 3 carbon atoms.

Specific examples of linear or branched chain alkyl groups for $R^1$ include $CH_3$—, $CH_3CH_2$—, $CH_3CH_2CH_2$—, $CH_3CH_2CH_2CH_2$—, and

[Formula 13]

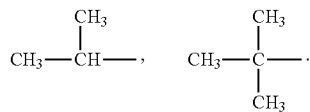

When $R^1$ is a linear alkyl group having a fluorine atom, examples of $R^1$ include $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CF_2CF_2CH_2$—, $CF_3CF_2CH_2CF_2CH_2$—, $CF_3CF_2CH_2CH_2CH_2CH_2$—, $CF_3CF_2CF_2CF_2CH_2CH_2$—, $CF_3CF_2CH_2CF_2CH_2CH_2$—, $HCF_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CF_2CH_2CF_2$—, $CH_3CF_2CF_2CF_2$—, $CH_3CH_2CF_2CF_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CF_2CF_2CH_2$—, $CH_3CF_2CH_2CF_2CH_2CH_2$—, $CH_3CF_2CH_2CF_2CH_2CH_2$—, $HCFClCF_2CH_2$—, $HCF_2CFClCH_2$—, $HCF_2CFClCF_2CFClCH_2$—, and $HCFClCF_2CFClCF_2CH_2$.

When $R^1$ is a branched chain alkyl group having a fluorine atom, preferred examples of $R^1$ include:

[Formula 14]

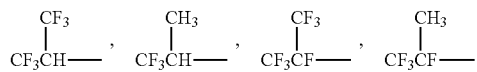

-continued

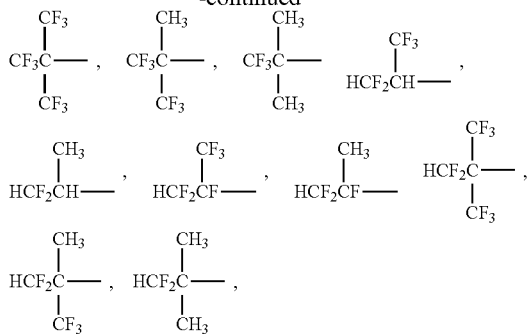

[Formula 15]

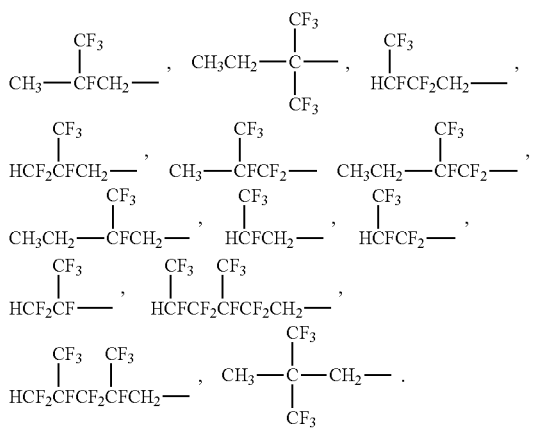

However, if a branch such as $CH_3$— or $CF_3$— is contained, the viscosity is likely to increase. Thus, the number of such branches is more preferably small (one) or zero.

$R^2$ is an alkylene group having 1 to 3 carbon atoms and optionally having a fluorine atom. $R^2$ may be linear or branched chain. Examples of a minimum structural unit constituting such a linear or branched chain alkylene group are shown below. $R^2$ is constituted by one or combination of these units.

(i) Linear Minimum Structural Units:
—$CH_2$—, —CHF—, —$CF_2$—, —CHCl—, —CFCl—, —$CCl_2$—

(ii) Branched Chain Minimum Structural Units:

[Formula 16]

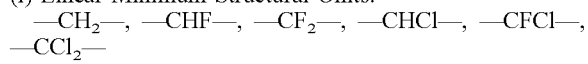

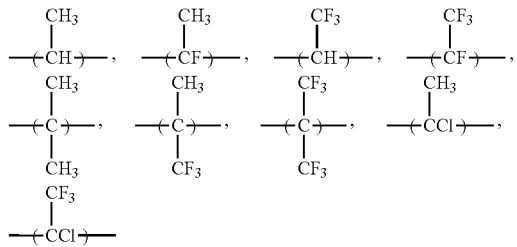

$R^2$ is preferably constituted by Cl-free structural units among these examples, because such units may not be dehydrochlorinated by a base and thus may be more stable.

When being linear, $R^2$ is composed only of any of the above linear minimum structural units, and is preferably —$CH_2$—, —$CH_2CH_2$—, or $CF_2$— among these. Since the solubility of an electrolyte salt can be further improved, —$CH_2$— or —$CH_2CH_2$— is more preferred.

When being branched chain, $R^2$ includes at least one of the above branched chain minimum structural units. A preferred example thereof is a group represented by the general formula: —$(CX^aX^b)$—, wherein $X^a$ is H, F, $CH_3$, or $CF_3$; $X^b$ is $CH_3$ or $CF_3$; provided that, when $X^b$ is $CF_3$, $X^a$ is H or $CH_3$. Such groups can much further particularly improve the solubility of an electrolyte salt.

Preferred examples of the fluorinated alkyl group (a) include $CF_3CF_2$—, $HCF_2CF_2$—, $H_2CFCF_2$—, $CH_3CF_2$—, $CF_3CHF$—, $CF_3CH_2$—, $CF_3CF_2CF_2$—, $HCF_2CF_2CF_2$—, $H_2CFCF_2CF_2$—, $CH_3CF_2CF_2$—,

[Formula 17]

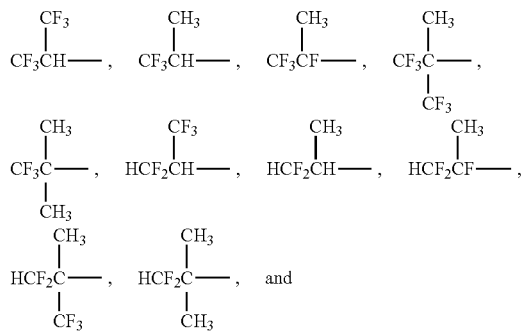

[Formula 18]

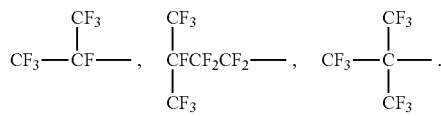

The above fluorinated alkyl group having an ether bond (b) is a group obtainable by replacing at least one hydrogen atom of an alkyl group having an ether bond by a fluorine atom. The fluorinated alkyl group having an ether bond (b) preferably has 2 to 17 carbon atoms. An excessively large number of carbon atoms may lead to increase in the viscosity of the fluorinated saturated cyclic carbonate and also increase of fluorine-containing groups. Thus, there may be observed decrease in the solubility of an electrolyte salt due to reduction in permittivity, and decrease in miscibility with other solvents. From this viewpoint, the fluorinated alkyl group having an ether bond (b) has more preferably 2 to 10 carbon atoms, further preferably 2 to 7 carbon atoms.

The alkylene group which constitutes the ether moiety of the fluorinated alkyl group having an ether bond (b) may be a linear or branched chain alkylene group. Examples of a minimum structural unit constituting such a linear or branched chain alkylene group are shown below.

(i) Linear Minimum Structural Units:
—$CH_2$—, —CHF—, —$CF_2$—, —CHCl—, —CFCl—, —$CCl_2$—

(ii) Branched chain Minimum Structural Units:

[Formula 19]

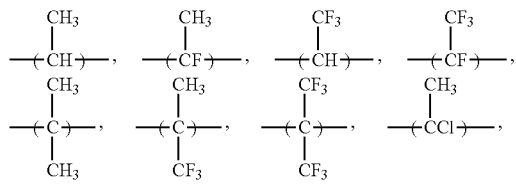

-continued

The alkylene group may be constituted by one of these minimum structural units, or may be constituted by linear units (i), by branched chain units (ii), or by a combination of a linear unit (i) and a branched chain unit (ii). Preferred specific examples will be described below in detail.

The alkylene group is preferably constituted by Cl-free structural units among these examples, because such units may not be dehydrochlorinated by a base and thus may be more stable.

A further preferred example of the fluorinated alkyl group having an ether bond (b) includes a group represented by the general formula (b-1):

$$R^3—(OR^4)_{n1}—\qquad\qquad (b\text{-}1)$$

wherein $R^3$ is preferably an alkyl group having 1 to 6 carbon atoms and optionally having a fluorine atom; $R^4$ is preferably an alkylene group having 1 to 4 carbon atoms and optionally having a fluorine atom; n1 is an integer of 1 to 3; provided that at least one of $R^3$ and $R^4$ has a fluorine atom.

Examples of $R^3$ and $R^4$ include the following groups, and any appropriate combination of these groups can provide, but not limited to, the fluorinated alkyl group having an ether bond (b) represented by the general formula (b-1).

(1) $R^3$ is preferably an alkyl group represented by the general formula: $X^c{}_3C—(R^5)_{n2}$—, wherein three $X^c$'s are the same as or different from each other, and are each H or F; $R^5$ is an alkylene group having 1 to 5 carbon atoms and optionally having a fluorine atom; and n2 is 0 or 1.

When n2 is 0, examples of $R^3$ include $CH_3$—, $CF_3$—, $HCF_2$—, and $H_2CF$—.

When n2 is 1, specific examples of $R^3$ which is a linear group include $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CH_2CH_2CF_2$—, $CF_3CF_2CH_2CF_2$—, $CF_3CH_2CF_2CF_2$—, $CF_3CF_2CF_2CF_2$—, $CF_3CF_2CH_2CH_2CH_2$—, $CF_3CH_2CF_2CH_2CH_2$—, $CF_3CF_2CF_2CH_2CH_2$—, $CF_3CF_2CH_2CF_2CH_2$—, $CF_3CH_2CF_2CF_2CH_2$—, $CF_3CH_2CF_2CH_2CH_2$—, $CF_3CF_2CF_2CF_2CH_2CH_2$—, $CF_3CF_2CH_2CF_2CH_2CH_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2CH_2$—, $FCH_2CF_2$—, $FCH_2CF_2CH_2$—, $CH_3CF_2$—, $CH_3CH_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CH_2CH_2CH_2$—, $CH_3CF_2CH_2CF_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2CH_2$—, $H_3CH_2CF_2CF_2CH_2CH_2$—, and $CH_3CF_2CH_2CF_2CH_2CH_2$—.

Examples thereof in which n2 is 1 and $R^3$ is a branched chain group include:

[Formula 20]

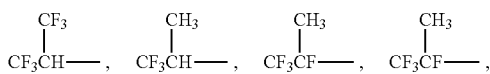

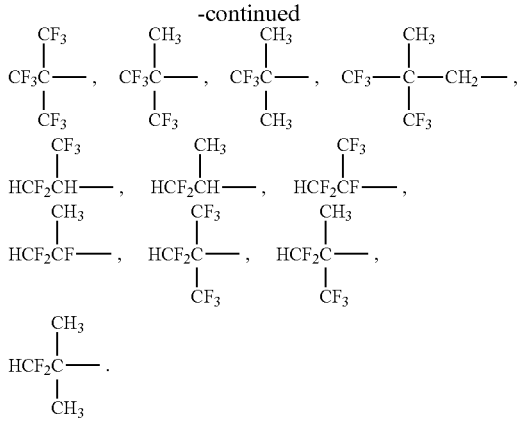

However, if a branch such as CH$_3$— or CF$_3$— is contained, the viscosity is likely to increase. Thus, those in which R$^3$ is a linear group are more preferred.

(2) In —(OR$^4$)$_{n1}$— of the general formula (b-1), n1 is an integer of 1 to 3, preferably 1 or 2. When n1 is 2 or 3, R$^4$'s may be the same as or different from each other.

Preferred specific examples of R$^4$ include the following linear or branched chain groups.

Examples of R$^4$ which is a linear group include -CH$_2$—, —CHF—, —CF$_2$—, —CH$_2$CH$_2$—, —CF$_2$CH$_2$—, —CF$_2$CF$_2$—, —CH$_2$CF$_2$—, —CH$_2$CH$_2$CH$_2$—, —CH$_2$CH$_2$CF$_2$—, —CH$_2$CF$_2$CH$_2$—, —CH$_2$CF$_2$CF$_2$—, —CF$_2$CH$_2$CH$_2$—, —CF$_2$CF$_2$CH$_2$—, —CF$_2$CH$_2$CF$_2$—, and —CF$_2$CF$_2$CF$_2$—.

Examples of R$^4$ which is a branched chain group include:

[Formula 21]

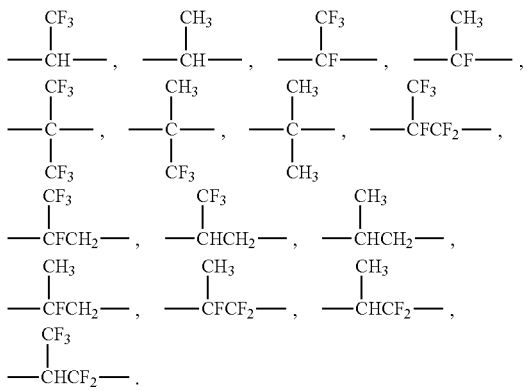

The fluorinated alkoxy group (c) is a group obtainable by replacing at least one hydrogen atom of an alkoxy group by a fluorine atom. The fluorinated alkoxy group (c) has preferably 1 to 17 carbon atoms, more preferably 1 to 6 carbon atoms.

The fluorinated alkoxy group (c) is particularly preferably a fluorinated alkoxy group represented by the general formula: X$^d_3$C—(R$^6$)$_{n3}$—O—, wherein three X$^d$'s are the same as or different from each other, and are each H or F; R$^6$ is an alkylene group having 1 to 5 carbon atoms and optionally having a fluorine atom; n3 is 0 or 1; provided that any of the three X$^d$'s contains a fluorine atom.

Specific examples of the fluorinated alkoxy group (c) include fluorinated alkoxy groups in which an oxygen atom binds to an end of an alkyl group, mentioned as an example for R$^1$ in the general formula (a-1).

The fluorinated alkyl group (a), the fluorinated alkyl group having an ether bond (b), and the fluorinated alkoxy group (c) in the fluorinated saturated cyclic carbonate each preferably have a fluorine content of 10% by mass or more. An excessively low fluorine content may not sufficiently achieve an effect of reducing the viscosity at low temperature and an effect of increasing the flash point. From this viewpoint, the fluorine content is more preferably 12% by mass or more, further preferably 15% by mass or more. The upper limit thereof is usually 76% by mass.

The fluorine content of each of the fluorinated alkyl group (a), the fluorinated alkyl group having an ether bond (b), and the fluorinated alkoxy group (c) is a value calculated based on each structural formula thereof by:

[(Number of fluorine atoms×19)/(Formula weight of each group)]×100(%).

In view of favorable permittivity and oxidation resistance, the fluorine content in the total fluorinated saturated cyclic carbonate is preferably 10% by mass or more, more preferably 15% by mass or more. The upper limit thereof is usually 76% by mass.

The fluorine content in the fluorinated saturated cyclic carbonate is a value calculated based on the structural formula of the fluorinated saturated cyclic carbonate by:

[(Number of fluorine atoms×19)/(Molecular weight of fluorinated saturated cyclic carbonate)]×100 (%).

Specific examples of the fluorinated saturated cyclic carbonate include the following.

Specific examples of the fluorinated saturated cyclic carbonate in which at least one of X$^1$ to X$^4$ is —F include:

[Formula 22]

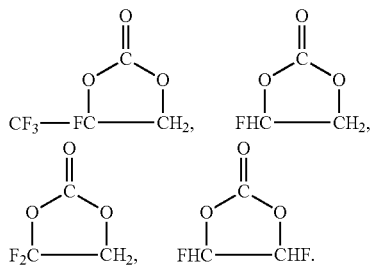

These compounds have a high withstand voltage and also give favorable solubility of an electrolyte salt.

Alternatively,

[Formula 23]

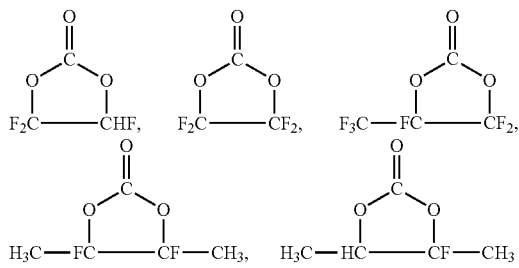

and the like may be used.

Specific examples of the fluorinated saturated cyclic carbonate in which at least one of $X^1$ to $X^4$ is a fluorinated alkyl group (a) and the others are —H include

[Formula 24]

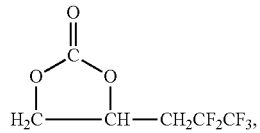
H$_2$C—CH—CH$_2$CF$_2$CF$_3$,

H$_2$C—CH—CH$_2$CF(CF$_3$)$_2$, H$_2$C—CH—CF$_3$,

H$_2$C—CH—CH$_2$F, H$_2$C—CH—CF$_2$H,

H$_2$C—C(CF$_3$)$_2$, H$_2$C—CH—CH$_2$CF$_2$CF$_2$CF$_2$CF$_3$,

H$_2$C—CH—CH$_2$CF$_3$

[Formula 25]

CF$_3$CF$_2$—CH—CH$_2$, HCF$_2$CF$_2$—CH—CH$_2$,

H$_2$CFCF$_2$—CH—CH$_2$, CH$_3$CF$_2$—CH—CH$_2$,

CF$_3$CF$_2$CF$_2$—CH—CH$_2$, CF$_3$CF$_2$CF$_2$CF$_2$—CH—CH$_2$,

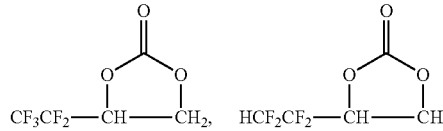

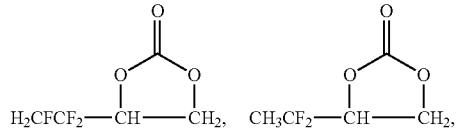

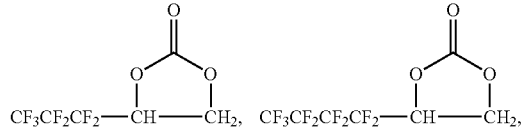

HCF$_2$CF$_2$CF$_2$CF$_2$—CH—CH$_2$, and

[Formula 26]

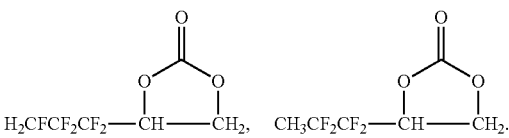
H$_2$CFCF$_2$CF$_2$—CH—CH$_2$, CH$_3$CF$_2$CF$_2$—CH—CH$_2$.

Specific examples of the fluorinated saturated cyclic carbonate in which at least one of $X^1$ to $X^4$ is a fluorinated alkyl group having an ether bond (b) or a fluorinated alkoxy group (c) and the others are —H include

[Formula 27]

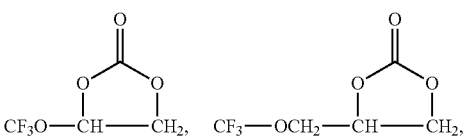
CF$_3$O—CH—CH$_2$, CF$_3$—OCH$_2$—CH—CH$_2$,

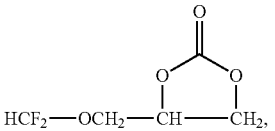
HCF$_2$—OCH$_2$—CH—CH$_2$,

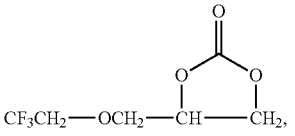
CF$_3$CH$_2$—OCH$_2$—CH—CH$_2$,

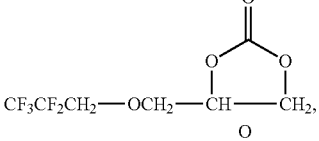
CF$_3$CF$_2$CH$_2$—OCH$_2$—CH—CH$_2$,

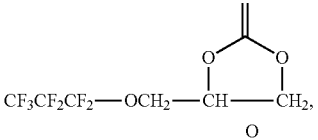
CF$_3$CF$_2$CF$_2$—OCH$_2$—CH—CH$_2$,

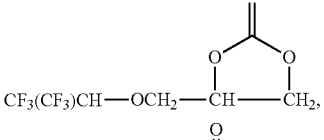
CF$_3$(CF$_3$)CH—OCH$_2$—CH—CH$_2$,

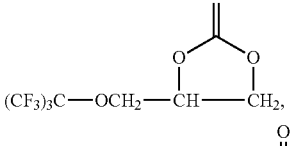
(CF$_3$)$_3$C—OCH$_2$—CH—CH$_2$,

CH$_3$(CF$_3$)$_2$CCH$_2$—OCH$_2$—CH—CH$_2$,

[Formula 28]

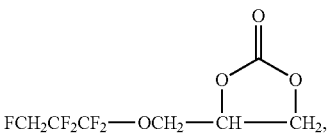
FCH$_2$CF$_2$CF$_2$—OCH$_2$—CH—CH$_2$,

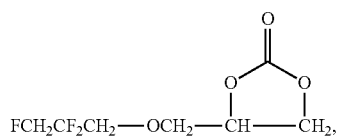
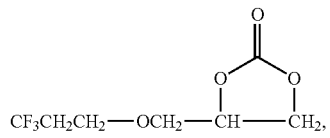
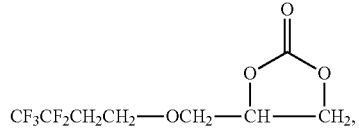
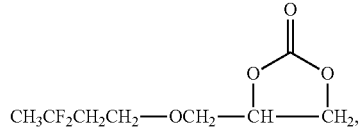
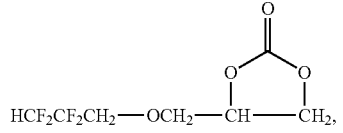
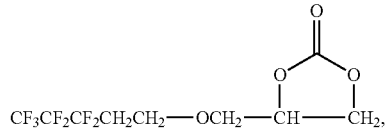
[Formula 29]
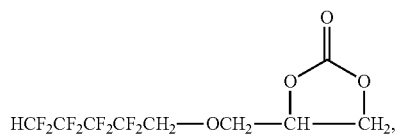
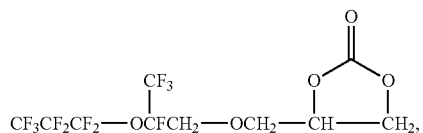
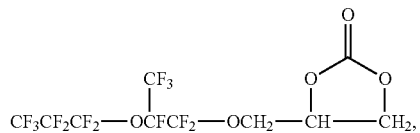
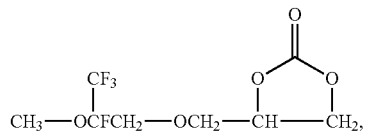
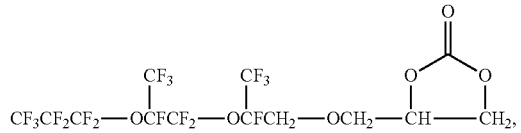
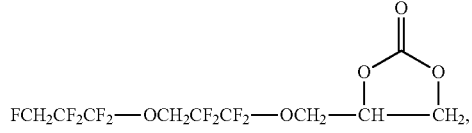
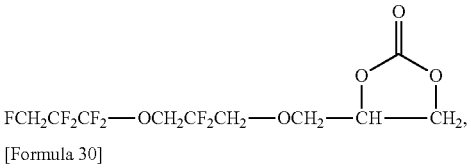
[Formula 30]
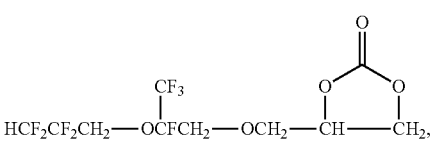
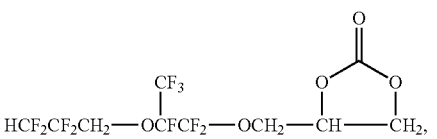
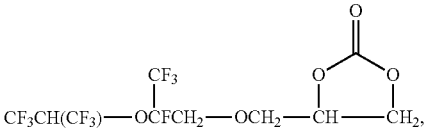
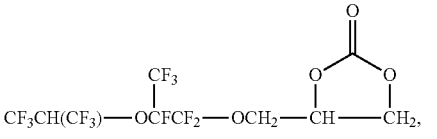
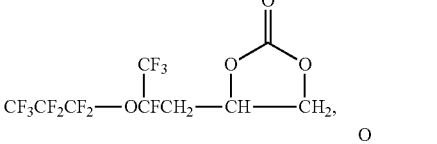
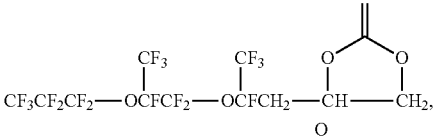
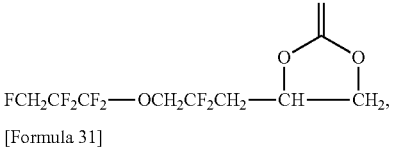
[Formula 31]
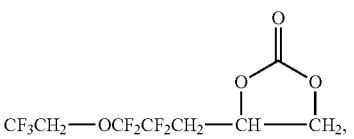
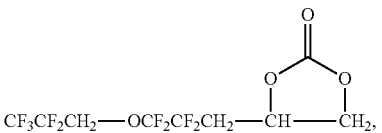

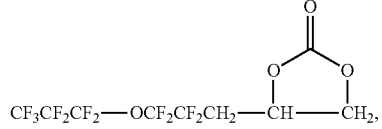

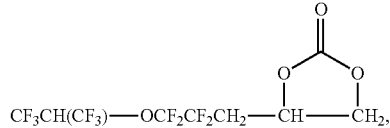

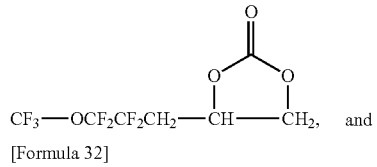 and

[Formula 32]

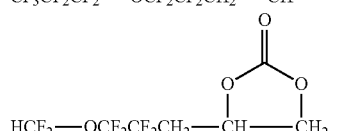

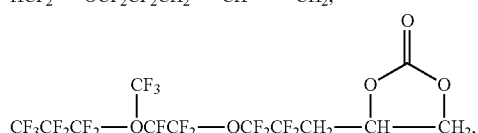

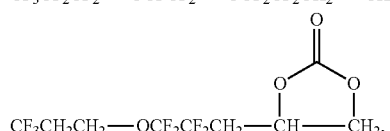

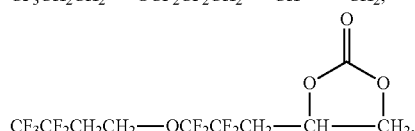

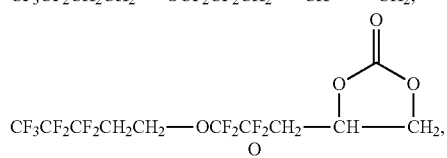

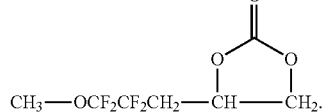

Among these, the fluorinated saturated cyclic carbonate is preferably any of the following compounds.

[Formula 33]

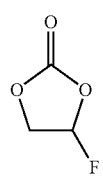 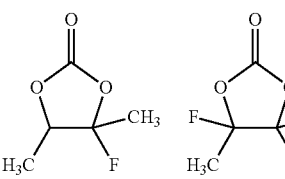 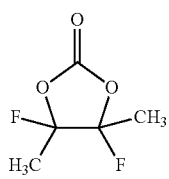

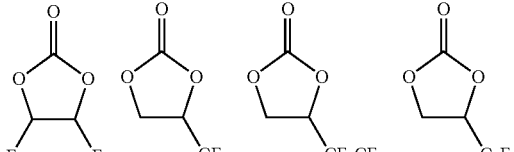

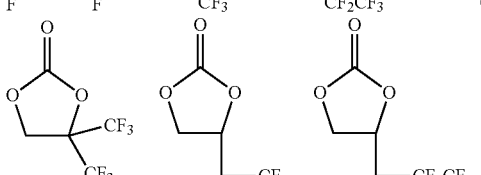

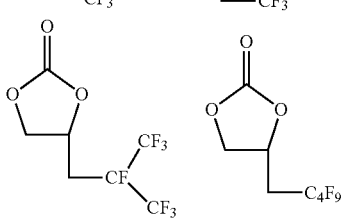

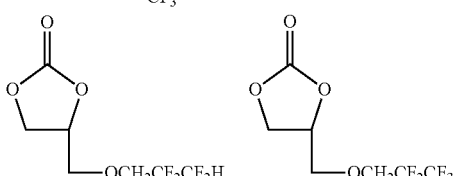

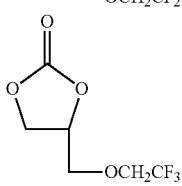

[Formula 34]

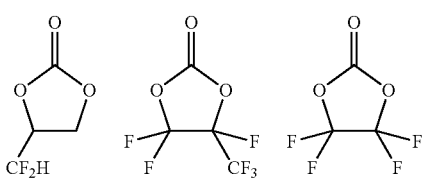

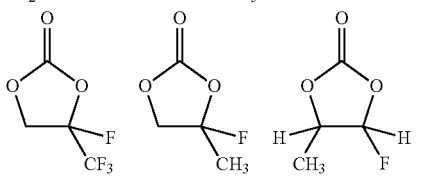

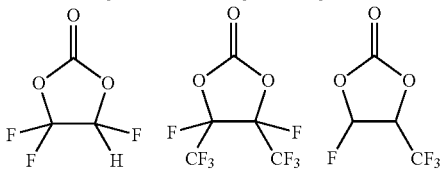

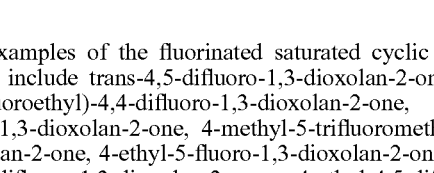

Examples of the fluorinated saturated cyclic carbonate also include trans-4,5-difluoro-1,3-dioxolan-2-one, 5-(1,1-difluoroethyl)-4,4-difluoro-1,3-dioxolan-2-one, 4-methylene-1,3-dioxolan-2-one, 4-methyl-5-trifluoromethyl-1,3-dioxolan-2-one, 4-ethyl-5-fluoro-1,3-dioxolan-2-one, 4-ethyl-5,5-difluoro-1,3-dioxolan-2-one, 4-ethyl-4,5-difluoro-1,3-dioxolan-2-one, 4-ethyl-4,5,5-trifluoro-1,3-dioxolan-2-one, 4,4-difluoro-5-methyl-1,3-dioxolan-2-one, 4-fluoro-5-methyl-1,3-dioxolan-2-one, 4-fluoro-5-trifluoromethyl-1,3-dioxolan-2-one, and 4,4-difluoro-1,3-dioxolan-2-one.

More preferred among these as the fluorinated saturated cyclic carbonate are fluoroethylene carbonate, difluoroethylene carbonate, trifluoromethylethylene carbonate (3,3,3-trifluoropropylene carbonate), and 2,2,3,3,3-pentafluoropropylethylene carbonate.

The fluorinated unsaturated cyclic carbonate is a cyclic carbonate having an unsaturated bond and a fluorine atom, and is preferably a fluorinated ethylene carbonate derivative substituted with a substituent having an aromatic ring or a carbon-carbon double bond. Specific examples thereof include 4,4-difluoro-5-phenyl ethylene carbonate, 4,5-difluoro-4-phenyl ethylene carbonate, 4-fluoro-5-phenyl ethylene carbonate, 4-fluoro-5-vinyl ethylene carbonate, 4-fluoro-4-phenyl ethylene carbonate, 4,4-difluoro-4-vinyl ethylene carbonate, 4,4-difluoro-4-allyl ethylene carbonate, 4-fluoro-4-vinyl ethylene carbonate, 4-fluoro-4,5-diallyl ethylene carbonate, 4,5-difluoro-4-vinyl ethylene carbonate, 4,5-difluoro-4,5-divinyl ethylene carbonate, and 4,5-difluoro-4,5-diallyl ethylene carbonate.

One of the fluorinated unsaturated cyclic carbonates may be used singly, or two or more thereof may be used in any combination at any ratio.

When the fluorinated unsaturated cyclic carbonate is contained, the content of the fluorinated cyclic carbonate is preferably 5 to 90% by volume, more preferably 10 to 60% by volume, further preferably 15 to 45% by volume with respect to the solvent.

The chain carbonate may be a non-fluorinated chain carbonate or a fluorinated chain carbonate.

Examples of the non-fluorinated chain carbonate include hydrocarbon-based chain carbonates such as $CH_3OCOOCH_3$ (dimethyl carbonate, DMC), $CH_3CH_2OCOOCH_2CH_3$ (diethyl carbonate, DEC), $CH_3CH_2OCOOCH_3$ (ethyl methyl carbonate, EMC), $CH_3OCOOCH_2CH_3$ (methyl propyl carbonate), methyl butyl carbonate, ethyl propyl carbonate, ethyl butyl carbonate, dipropyl carbonate, dibutyl carbonate, methyl isopropyl carbonate, methyl-2-phenyl phenyl carbonate, phenyl-2-phenyl phenyl carbonate, trans-2,3-pentylene carbonate, trans-2,3-butylene carbonate, and ethyl phenyl carbonate. Preferred among these is at least one selected from the group consisting of ethyl methyl carbonate, diethyl carbonate, and dimethyl carbonate.

One of the non-fluorinated chain carbonates may be used singly, or two or more thereof may be used in any combination at any ratio.

When the non-fluorinated chain carbonate is contained, the content of the non-fluorinated chain carbonate is preferably 10 to 90% by volume, more preferably 40 to 85% by volume, further preferably 50 to 80% by volume with respect to the solvent.

The fluorinated chain carbonate is a chain carbonate having a fluorine atom. A solvent containing a fluorinated chain carbonate can be suitably used also at a high voltage.

An example of the fluorinated chain carbonate can include a compound represented by the general formula (B):

$$Rf^2OCOOR^7 \quad (B)$$

wherein $Rf^2$ is a fluorinated alkyl group having 1 to 7 carbon atoms, and $R^7$ is an alkyl group having 1 to 7 carbon atoms and optionally containing a fluorine atom.

$Rf^2$ is a fluorinated alkyl group having 1 to 7 carbon atoms, and $R^7$ is an alkyl group having 1 to 7 carbon atoms and optionally containing a fluorine atom.

The fluorinated alkyl group is a group obtainable by replacing at least one hydrogen atom of an alkyl group by a fluorine atom. When $R^7$ is an alkyl group containing a fluorine atom, the group is a fluorinated alkyl group.

$Rf^2$ and $R^7$ preferably have 1 to 7 carbon atoms, more preferably 1 to 2 carbon atoms, in view of giving a low viscosity.

An excessively large number of carbon atoms may lead to deterioration of the low-temperature characteristics and decrease in the solubility of an electrolyte salt. An excessively small number of carbon atoms may lead to decrease in the boiling point.

Examples of the fluorinated alkyl group having 1 carbon atom include $CFH_2$—, $CF_2H$—, and $CF_3$—. In respect of high-temperature storage characteristics, particularly preferred is $CFH_2$— or $CF_3$—.

In respect of favorable solubility of an electrolyte salt, a preferred example of the fluorinated alkyl group having 2 or more carbon atoms includes a fluorinated alkyl group represented by the following general formula (d-1):

$$R^1\text{-}R^2\text{-} \quad (d-1)$$

wherein $R^1$ is an alkyl group having one or more carbon atoms and optionally having a fluorine atom; $R^2$ is an alkylene group having 1 to 3 carbon atoms and optionally having a fluorine atom; provided that at least one of $R^1$ and $R^2$ has a fluorine atom.

$R^1$ and $R^2$ each may further have an atom other than carbon, hydrogen, and fluorine atoms.

$R^1$ is an alkyl group having one or more carbon atoms and optionally having a fluorine atom. $R^1$ is preferably a linear or branched chain alkyl group having 1 to 6 carbon atoms. $R^1$ has more preferably 1 to 3 carbon atoms.

Specific examples of linear or branched chain alkyl groups for $R^1$ include $CH_3$—, $CH_3CH_2$—, $CH_3CH_2CH_2$—, $CH_3CH_2CH_2CH_2$—,

[Formula 35]

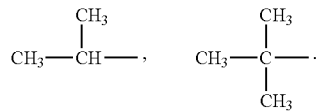

When $R^1$ is a linear alkyl group having a fluorine atom, examples of $R^1$ include $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CF_2CF_2CH_2$—, $CF_3CF_2CH_2CF_2CH_2$—, $CF_3CF_2CH_2CH_2CH_2CH_2$—, $CF_3CF_2CF_2CF_2CH_2CH_2$—, $CF_3CF_2CF_2CH_2CH_2CH_2$—, $HCF_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CF_2CH_2CF_2$—, $CH_3CF_2CF_2CF_2$—, $CH_3CH_2CF_2CF_2$—, $CH_3CF_2CH_2CF_2CH_2$—, $CH_3CF_2CF_2CF_2CH_2$—, $CH_3CF_2CH_2CH_2CH_2$—, $CH_3CF_2CF_2CF_2CH_2$—, $CH_3CF_2CH_2CH_2CH_2$—, $CH_3CF_2CH_2CF_2CH_2CH_2$—, $HCFClCF_2CH_2$—, $HCF_2CFClCH_2$—, $HCF_2CFClCF_2CFClCH_2$—, and $HCFClCF_2CFClCF_2CH_2$—.

When R¹ is a branched chain alkyl group having a fluorine atom, preferred examples of R¹ include

[Formula 36]

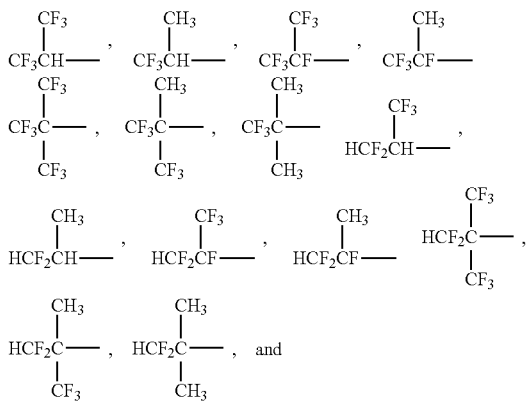

[Formula 37]

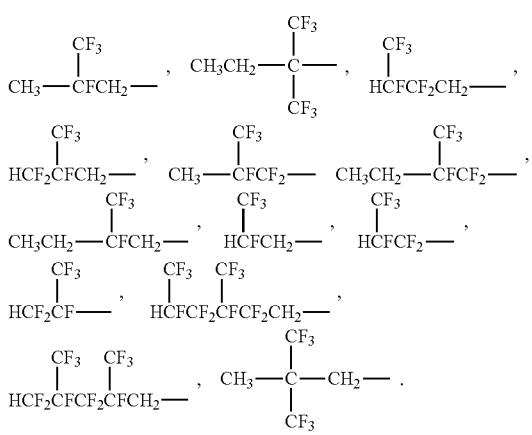

However, if a branch such as CH₃— or CF₃— is contained, the viscosity is likely to increase. Thus, the number of such branches is more preferably small (one) or zero.

R² is an alkylene group having 1 to 3 carbon atoms and optionally having a fluorine atom. R² may be linear or branched chain. Examples of a minimum structural unit constituting such a linear or branched chain alkylene group are shown below. R² is constituted by one or a combination of these units.

(i) Linear Minimum Structural Units:
—CH₂—, —CHF—, —CF₂—, —CHCl—, —CFCl—, —CCl₂—

(ii) Branched chain Minimum Structural Units:

[Formula 38]

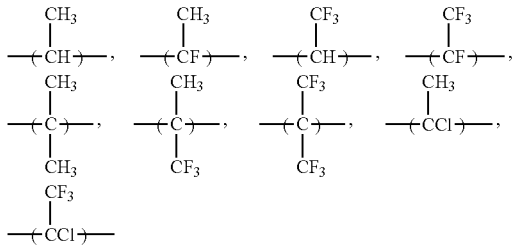

R² is preferably constituted by Cl-free structural units among these examples, because such units may not be dehydrochlorinated by a base and thus may be more stable.

When being linear, R² is composed only of any of the above linear minimum structural units, and is preferably —CH₂—, —CH₂CH₂—, or CF₂— among these. Since the solubility of an electrolyte salt can be further improved, —CH₂— or —CH₂CH₂— is more preferred.

When being branched chain, R² includes at least one of the above branched chain minimum structural units. A preferred example thereof is a group represented by the general formula: —(CX$^a$X$^b$)—, wherein X$^a$ is H, F, CH₃, or CF₃; X$^b$ is CH₃ or CF₃; provided that, when X$^b$ is CF₃, X$^a$ is H or CH₃. Such groups can much further particularly improve the solubility of an electrolyte salt.

Preferred specific examples of the fluorinated alkyl group include CF₃CF₂—, HCF₂CF₂—, H₂CFCF₂—, CH₃CF₂—, CF₃CH₂—, CF₃CF₂CF₂—, HCF₂CF₂CF₂—, H₂CFCF₂CF₂—, CH₃CF₂CF₂—,

[Formula 39]

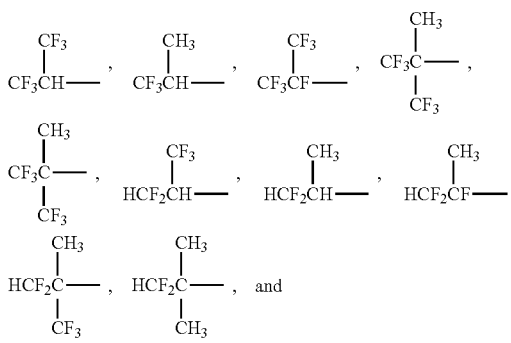

[Formula 40]

$$CH_3-\overset{CF_3}{\underset{CF_3}{CF}}-, \quad \overset{CF_3}{\underset{CF_3}{CFCF_2CF_2}}-, \quad CF_3-\overset{CF_3}{\underset{CF_3}{C}}-.$$

Among these, the fluorinated alkyl group for Rf² and R⁷ is preferably CF₃—, CF₃CF₂—, (CF₃)₂CH—, CF₃CH₂—, C₂F₅CH₂—, CF₃CF₂CH₂—, HCF₂CF₂CH₂—, CF₃CFHCF₂CH₂—, CFH₂—, or CF₂H—, more preferably CF₃CH₂—, CF₃CF₂CH₂—, HCF₂CF₂CH₂—, CFH₂—, or CF₂H—, in view of high flame retardancy and favorable rate characteristics and oxidation resistance.

When R⁷ is an alkyl group containing no fluorine atom, the group is an alkyl group having 1 to 7 carbon atoms. R⁷ has preferably 1 to 4 carbon atoms, more preferably 1 to 3 carbon atoms, in view of giving a low viscosity.

Examples of the alkyl group containing no fluorine atom include CH₃—, CH₃CH₂—, (CH₃)₂CH—, and C₃H₇—. Among these, CH₃— and CH₃CH₂— are preferred, in view of giving a low viscosity and favorable rate characteristics.

The fluorinated chain carbonate preferably has a fluorine content of 15 to 70% by mass. The fluorinated chain carbonate, when having a fluorine content in the range described above, can maintain the miscibility with a solvent and the solubility of a salt. The fluorine content is more preferably 20% by mass or more, further preferably 30% by mass or more, particularly preferably 35% by mass or more, and more preferably 60% by mass or less, further preferably 50% by mass or less.

In the present disclosure, the fluorine content is a value calculated based on the structural formula of the fluorinated chain carbonate by:

[(Number of fluorine atoms×19)/(Molecular weight of fluorinated chain carbonate)]×100(%).

The fluorinated chain carbonate is preferably any of the following compounds, in view of giving a low viscosity.

[Formula 41]

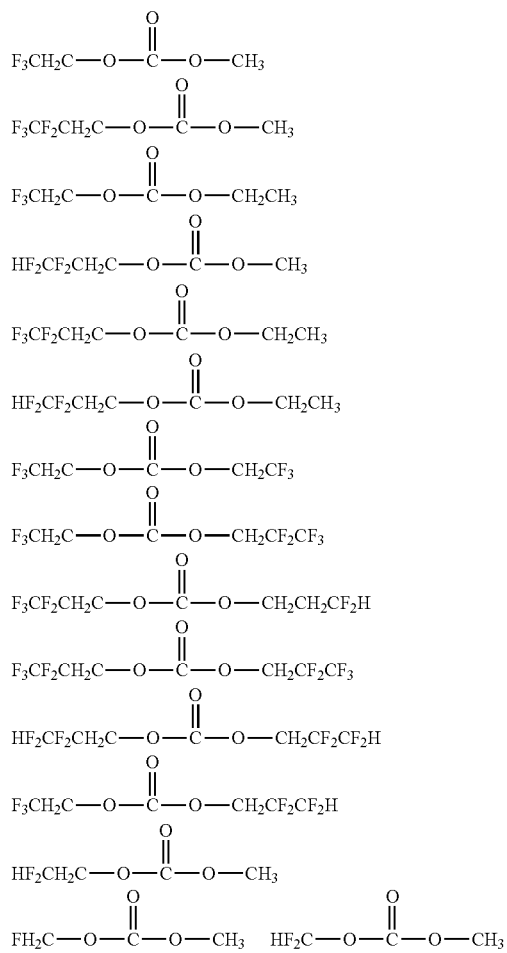

The fluorinated chain carbonate is particularly preferably methyl 2,2,2-trifluoroethyl carbonate ($F_3CH_2COC(=O)OCH_3$).

One of the fluorinated chain carbonates may be used singly, or two or more thereof may be used in any combination at any ratio.

When the fluorinated chain carbonate is contained, the content of the fluorinated chain carbonate is preferably 10 to 90% by volume, more preferably 40 to 85% by volume, further preferably 50 to 80% by volume with respect to the solvent.

The carboxylate may be a cyclic carboxylate or a chain carboxylate.

The cyclic carboxylate may be a non-fluorinated cyclic carboxylate or a fluorinated cyclic carboxylate.

An example of the non-fluorinated cyclic carboxylate includes a non-fluorinated saturated cyclic carboxylate. Preferred is a non-fluorinated saturated cyclic carboxylate having an alkylene group having 2 to 4 carbon atoms.

Specific examples of the non-fluorinated saturated cyclic carboxylate having an alkylene group having 2 to 4 carbon atoms include β-propiolactone, γ-butyrolactone, ε-caprolactone, δ-valerolactone, and α-methyl-γ-butyrolactone. Among these, γ-butyrolactone and δ-valerolactone are particularly preferred, in view of improvement of the degree of dissociation of lithium ions and improvement of the load characteristics.

One of the non-fluorinated saturated cyclic carboxylates may be used singly, or two or more thereof may be used in any combination at any ratio.

When the non-fluorinated saturated cyclic carboxylate is contained, the content of the non-fluorinated saturated cyclic carboxylate is preferably 0 to 90% by volume, more preferably 0.001 to 90% by volume, further preferably 1 to 60% by volume, particularly preferably 5 to 40% by volume with respect to the solvent.

The chain carboxylate may be a non-fluorinated chain carboxylate or a fluorinated chain carboxylate. When containing the chain carboxylate, the solvent enables the electrolytic solution to have a further suppressed increase in resistance after high-temperature storage.

Examples of the non-fluorinated chain carboxylate include methyl acetate, ethyl acetate, propyl acetate, butyl acetate, methyl propionate, ethyl propionate, propyl propionate, butyl propionate, tert-butyl propionate, tert-butyl butyrate, sec-butyl propionate, sec-butyl butyrate, n-butyl butyrate, methyl pyrophosphate, ethyl pyrophosphate, tert-butyl formate, tert-butyl acetate, sec-butyl formate, sec-butyl acetate, n-hexyl pivalate, n-propyl formate, n-propyl acetate, n-butyl formate, n-butyl pivalate, n-octyl pivalate, ethyl 2-(dimethoxyphosphoryl)acetate, ethyl 2-(dimethylphosphoryl)acetate, ethyl 2-(diethoxyphosphoryl)acetate, ethyl 2-(diethylphosphoryl)acetate, isopropyl propionate, isopropyl acetate, ethyl formate, ethyl 2-propynyl oxalate, isopropyl formate, isopropyl butyrate, isobutyl formate, isobutyl propionate, isobutyl butyrate, and isobutyl acetate.

Among these, butyl acetate, methyl propionate, ethyl propionate, propyl propionate, and butyl propionate are preferred, and ethyl propionate and propyl propionate are particularly preferred.

One of the non-fluorinated chain carboxylates may be used singly, or two or more thereof may be used in any combination at any ratio.

When the non-fluorinated chain carboxylate is contained, the content of the non-fluorinated chain carboxylate is preferably 0 to 90% by volume, more preferably 0.001 to 90% by volume, further preferably 1 to 60% by volume, particularly preferably 5 to 40% by volume with respect to the solvent.

The fluorinated chain carboxylate is a chain carboxylate having a fluorine atom. A solvent containing a fluorinated chain carboxylate can be suitably used also at a high voltage.

In view of favorable miscibility with other solvents and favorable oxidation resistance, the fluorinated chain carboxylate is preferably a fluorinated chain carboxylate represented by the following general formula:

$R^{31}COOR^{32}$ wherein $R^{31}$ and $R^{32}$ are each independently an alkyl group having 1 to 4 carbon atoms and optionally having a fluorine atom, and at least one of $R^{31}$ and $R^{32}$ contains a fluorine atom.

Examples of $R^{31}$ and $R^{32}$ include non-fluorinated alkyl groups such as a methyl group (—$CH_3$), an ethyl group (—$CH_2CH_3$), a propyl group (—$CH_2CH_2CH_3$), an isopropyl group (—$CH(CH_3)_2$), a n-butyl group ($-CH_2CH_2CH_2CH_3$), and a tertiary butyl group ($-C(CH_3)_3$); and fluorinated alkyl groups such as $-CF_3$, $-CF_2H$, $-CFH_2$, $-CF_2CF_3$, $-CF_2CF_2H$, $-CF_2CFH_2$, $-CH_2CF_3$, $-CH_2CF_2H$, $-CH_2CFH_2$, $-CF_2CF_2CF_3$, $-CF_2CF_2CF_2H$, $-CF_2CF_2CFH_2$, $-CH_2CF_2CF_3$, $-CH_2CF_2CF_2H$, $-CH_2CF_2CFH_2$, $-CH_2CH_2CF_3$, $-CH_2CH_2CF_2H$, $-CH_2CH_2CFH_2$, $-CF(CF_3)_2$, $-CF(CF_2H)_2$, $-CF(CFH_2)_2$, $-CH(CF_3)_2$, $-CH(CF_2H)_2$, $-CH(CFH_2)_2$, $-CF(OCH_3)CF_3$, $-CF_2CF_2CF_2CF_3$, $-CF_2CF_2CF_2CF_2H$, $-CF_2CF_2CF_2CFH_2$, $-CH_2CF_2CF_2CF_3$, $-CH_2CF_2CF_2CF_2H$, $-CH_2CF_2CF_2CFH_2$, $-CH_2CH_2CF_2CF_3$, $-CH_2CH_2CF_2CF_2H$, $-CH_2CH_2CF_2CFH_2$, $-CH_2CH_2CH_2CF_3$, $-CH_2CH_2CH_2CF_2H$, $-CH_2CH_2CH_2CFH_2$, $-CF(CF_3)CF_2CF_3$, $-CF(CF_2H)CF_2CF_3$, $-CF(CFH_2)CF_2CF_3$, $-CF(CF_3)CF_2CF_2H$, $-CF(CF_3)CF_2CFH_2$, $-CF(CF_3)CH_2CF_3$, $-CF(CF_3)CH_2CF_2H$, $-CF(CF_3)CH_2CFH_2$, $-CH(CF_3)CF_2CF_3$, $-CH(CF_2H)CF_2CF_3$, $-CH(CFH_2)CF_2CF_3$, $-CH(CF_3)CF_2CF_2H$, $-CH(CF_3)CF_2CFH_2$, $-CH(CF_3)CH_2CF_3$, $-CH(CF_3)CH_2CF_2H$, $-CH(CF_3)CH_2CFH_2$, $-CF_2CF(CF_3)CF_3$, $-CF_2CF(CF_2H)CF_3$, $-CF_2CF(CFH_2)CF_3$, $-CF_2CF(CF_3)CF_2H$, $-CF_2CF(CF_3)CFH_2$, $-CH_2CF(CF_3)CF_3$, $-CH_2CF(CF_2H)CF_3$, $-CH_2CF(CFH_2)CF_3$, $-CH_2CF(CF_3)CF_2H$, $-CH_2CF(CF_3)CFH_2$, $-CH_2CH(CF_3)CF_3$, $-CH_2CH(CF_2H)CF_3$, $-CH_2CH(CFH_2)CF_3$, $-CH_2CH(CF_3)CF_2H$, $-CH_2CH(CF_3)CFH_2$, $-CF_2CH(CF_3)CF_3$, $-CF_2CH(CF_2H)CF_3$, $-CF_2CH(CFH_2)CF_3$, $-CF_2CH(CF_3)CF_2H$, $-CF_2CH(CF_3)CFH_2$, $-C(CF_3)_3$, $-C(CF_2H)_3$, and $-C(CFH_2)_3$. Particularly preferred among these are a methyl group, an ethyl group, $-CF_3$, $-CF_2H$, $-CF_2CF_3$, $-CH_2CF_3$, $-CH_2CF_2H$, $-CH_2CFH_2$, $-CH_2CH_2CF_3$, $-CH_2CF_2CF_3$, $-CH_2CF_2CF_2H$, and $-CH_2CF_2CFH_2$, in view of favorable miscibility with other solvents, viscosities, and oxidation resistance.

Specific examples of the fluorinated chain carboxylate include one or two or more of $CF_3CH_2C(=O)OCH_3$ (methyl 3,3,3-trifluoropropionate), $HCF_2C(=O)OCH_3$ (methyl difluoroacetate), $HCF_2C(=O)OC_2H_5$ (ethyl difluoroacetate), $CF_3C(=O)$ $OCH_2CH_2CF_3$, $CF_3C(=O)$ $OCH_2C_2F_5$, $CF_3C(=O)$ $OCH_2CF_2CF_2H$ (2,2,3,3-tetrafluoropropyl trifluoroacetate), $CF_3C(=O)$ $OCH_2CF_3$, $CF_3C(=O)$ $OCH(CF_3)_2$, ethyl pentafluorobutyrate, methyl pentafluoropropionate, ethyl pentafluoropropionate, methyl heptafluoroisobutyrate, isopropyl trifluorobutyrate, ethyl trifluoroacetate, tert-butyl trifluoroacetate, n-butyl trifluoroacetate, methyl tetrafluoro-2-(methoxy)propionate, 2,2-difluoroethyl acetate, 2,2,3,3-tetrafluoropropyl acetate, $CH_3C(=O)OCH_2CF_3$ (2,2,2-trifluoroethyl acetate), 1H,1H-heptafluorobutyl acetate, methyl 4,4,4-trifluorobutyrate, ethyl 4,4,4-trifluorobutyrate, ethyl 3,3,3-trifluoropropionate, 3,3,3-trifluoropropyl 3,3,3-trifluoropropionate, ethyl 3-(trifluoromethyl)butyrate, methyl 2,3,3,3-tetrafluoropropionate, butyl 2,2-difluoroacetate, methyl 2,2,3,3,-tetrafluoropropionate, methyl 2-(trifluoromethyl)-3,3,3-trifluoropropionate, and methyl heptafluorobutyrate.

Among these, preferred are $CF_3CH_2C(=O)OCH_3$, $HCF_2C(=O)$ $OCH_3$, $HCF_2C(=O)$ $OC_2H_5$, $CF_3C(=O)$ $OCH_2C_2F_5$, $CF_3C(=O)$ $OCH_2CF_2CF_2H$, $CF_3C(=O)$ $OCH_2CF_3$, $CF_3C(=O)$ $OCH(CF_3)_2$, ethyl pentafluorobutyrate, methyl pentafluoropropionate, ethyl pentafluoropropionate, methyl heptafluoroisobutyrate, isopropyl trifluorobutyrate, ethyl trifluoroacetate, tert-butyl trifluoroacetate, n-butyl trifluoroacetate, methyl tetrafluoro-2-(methoxy)propionate, 2,2-difluoroethyl acetate, 2,2,3,3-tetrafluoropropyl acetate, $CH_3C(=O)$ $OCH_2CF_3$, 1H, 1H-heptafluorobutyl acetate, methyl 4,4,4-trifluorobutyrate, ethyl 4,4,4-trifluorobutyrate, ethyl 3,3,3-trifluoropropionate, 3,3,3-trifluoropropyl 3,3,3-trifluoropropionate, ethyl 3-(trifluoromethyl)butyrate, methyl 2,3,3,3-tetrafluoropropionate, butyl 2,2-difluoroacetate, methyl 2,2,3,3,-tetrafluoropropionate, methyl 2-(trifluoromethyl)-3,3,3-trifluoropropionate, and methyl heptafluorobutyrate, in view of favorable miscibility with other solvents and rate characteristics, more preferred are $CF_3CH_2C(=O)$ $OCH_3$, $HCF_2C(=O)$ $OCH_3$, $HCF_2C(=O)$ $OC_2H_5$, and $CH_3C(=O)$ $OCH_2CF_3$, and particularly preferred are $HCF_2C(=O)$ $OCH_3$, $HCF_2C(=O)$ $OC_2H_5$, and $CH_3C(=O)$ $OCH_2CF_3$.

One of the fluorinated chain carboxylates may be used singly, or two or more thereof may be used in any combination at any ratio.

When the fluorinated chain carboxylate is contained, the content of the fluorinated chain carboxylate is preferably 10 to 90% by volume, more preferably 40 to 85% by volume, further preferably 50 to 80% by volume with respect to the solvent.

The above solvent preferably contains at least one selected from the group consisting of the above cyclic carbonate, the above chain carbonate, and the above chain carboxylate, more preferably contains the above cyclic carbonate. The above cyclic carbonate is preferably a saturated cyclic carbonate.

An electrolytic solution containing a solvent of the compositional feature enables an electrochemical device to have further improved high-temperature storage characteristics and cycle characteristics.

When the above solvent contains the above cyclic carbonate and at least one selected from the group consisting of the above chain carbonate and the above chain carboxylate, the solvent contains the above cyclic carbonate and at least one selected from the group consisting of the above chain carbonate and the above chain carboxylate in a total amount of preferably 10 to 100% by volume, more preferably 30 to 100% by volume, further preferably 50 to 100% by volume, with respect to the solvent.

When the above solvent contains the above cyclic carbonate and at least one selected from the group consisting of the above chain carbonate and the above chain carboxylate, the volume ratio of the cyclic carbonate to at least one selected from the group consisting of the chain carbonate and the chain carboxylate is preferably 5/95 to 95/5, more preferably 10/90 or more, further preferably 15/85 or more, particularly preferably 20/80 or more, and more preferably 90/10 or less, further preferably 60/40 or less, particularly preferably 50/50 or less.

The above solvent also preferably contains at least one selected from the group consisting of the above non-fluorinated saturated cyclic carbonate, the above non-fluorinated chain carbonate, and the above non-fluorinated chain carboxylate, more preferably contains the above non-fluorinated saturated cyclic carbonate and at least one selected from the group consisting of the above non-fluorinated chain carbonate and the above non-fluorinated chain carboxylate. An electrolytic solution containing a solvent having the above compositional feature can be suitably used for electrochemical devices used at a relatively low voltage.

When the above solvent contains the above non-fluorinated saturated cyclic carbonate and at least one selected from the group consisting of the above non-fluorinated chain carbonate and the above non-fluorinated chain carboxylate, the other solvent contains the non-fluorinated saturated cyclic carbonate and at least one selected from the group consisting of the non-fluorinated chain carbonate and the non-fluorinated chain carboxylate in a total amount of preferably 5 to 100% by volume, more preferably 20 to 100% by volume, further preferably 30 to 100% by volume.

When the electrolytic solution contains the above non-fluorinated saturated cyclic carbonate and at least one selected from the group consisting of the above non-fluorinated chain carbonate and the above non-fluorinated chain carboxylate, the volume ratio of the non-fluorinated saturated cyclic carbonate to at least one selected from the group consisting of the non-fluorinated chain carbonate and the non-fluorinated chain carboxylate is preferably 5/95 to 95/5, more preferably 10/90 or more, further preferably 15/85 or more, particularly preferably 20/80 or more, and more preferably 90/10 or less, further preferably 60/40 or less, particularly preferably 50/50 or less.

The above solvent also preferably contains at least one selected from the group consisting of the above fluorinated saturated cyclic carbonate, the above fluorinated chain carbonate, and the above fluorinated chain carboxylate, more preferably contains the above fluorinated saturated cyclic carbonate and at least one selected from the group consisting of the above fluorinated chain carbonate and the above fluorinated chain carboxylate. An electrolytic solution containing a solvent of the compositional feature can be suitably used not only for electrochemical devices used at a relatively low voltage but also for electrochemical devices used at a relatively high voltage.

When the above solvent contains the above fluorinated saturated cyclic carbonate and at least one selected from the group consisting of the above fluorinated chain carbonate and the above fluorinated chain carboxylate, the other solvent contains the fluorinated saturated cyclic carbonate and at least one selected from the group consisting of the fluorinated chain carbonate and the fluorinated chain carboxylate in a total amount of preferably 5 to 100% by volume, more preferably 10 to 100% by volume, further preferably 30 to 100% by volume, with respect to the above solvent.

When the other solvent contains the above fluorinated saturated cyclic carbonate and at least one selected from the group consisting of the above fluorinated chain carbonate and the above fluorinated chain carboxylate, the volume ratio of the fluorinated saturated cyclic carbonate to at least one selected from the group consisting of the fluorinated chain carbonate and the fluorinated chain carboxylate is preferably 5/95 to 95/5, more preferably 10/90 or more, further preferably 15/85 or more, particularly preferably 20/80 or more, and more preferably 90/10 or less, further preferably 60/40 or less, particularly preferably 50/50 or less.

The above solvent to be used may be an ion liquid. The "ion liquid" is a liquid composed of an ion containing an organic cation and an anion in combination.

Examples of the organic cation include, but are not limited to, imidazolium ions such as dialkyl imidazolium cations and trialkyl imidazolium cations; tetraalkyl ammonium ions; alkyl pyridinium ions; dialkyl pyrrolidinium ions; and dialkyl piperidinium ions.

Examples of the anion to be used as a counterion of any of these organic cations include, but are not limited to, a $PF_6$ anion, a $PF_3(C_2F_5)_3$ anion, a $PF_3(CF_3)_3$ anion, a $BF_4$ anion, a $BF_2(CF_3)_2$ anion, a $BF_3(CF_3)$ anion, a bisoxalatoborate anion, a $P(C_2O_4)F_2$ anion, a Tf (trifluoromethanesulfonyl) anion, a Nf (nonafluorobutanesulfonyl) anion, a bis(fluorosulfonyl)imide anion, a bis(trifluoromethanesulfonyl)imide anion, a bis(pentafluoroethanesulfonyl)imide anion, a dicyanoamine anion, halide anions, and the like.

The solvent is preferably a non-aqueous solvent, and the electrolytic solution of the present disclosure or the electrolytic solution for use in the alkali metal secondary battery of the present disclosure is preferably a non-aqueous electrolytic solution.

The content of the non-aqueous solvent is preferably 70 to 99.999% by mass, more preferably 80% by mass or more, more preferably 92% by mass or less relative to the electrolytic solution.

The electrolytic solution of the present disclosure or the electrolytic solution for use in the alkali metal secondary battery of the present disclosure may further contain a compound (5) represented by the general formula (5).

the general formula (5):

[Formula 42]

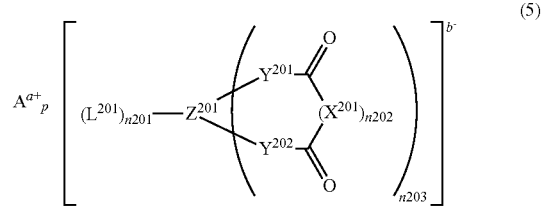

wherein $A^{a+}$ is a metal ion, a hydrogen ion, or an onium ion; a is an integer of 1 to 3, b is an integer of 1 to 3, p is b/a, n203 is an integer of 1 to 4, n201 is an integer of 0 to 8, n202 is 0 or 1, $Z^{201}$ is a transition metal or an element in group III, group IV, or group V of the Periodic Table, $X^{201}$ is O, S, an alkylene group having 1 to 10 carbon atoms, a halogenated alkylene group having 1 to 10 carbon atoms, an arylene group having 6 to 20 carbon atoms, or an halogenated arylene group having 6 to 20 carbon atoms, with the alkylene group, the halogenated alkylene group, the arylene group, and the halogenated arylene group each optionally having a substituent and/or a hetero atom in the structure thereof, and when n202 is 1 and n203 is 2 to 4, n203 $X^{201}$'s optionally bind to each other, $L^{201}$ is a halogen atom, a cyano group, an alkyl group having 1 to 10 carbon atoms, a halogenated alkyl group having 1 to 10 carbon atoms, an aryl group having 6 to 20 carbon atoms, a halogenated aryl group having 6 to 20 carbon atoms, with the alkylene group, the halogenated alkylene group, the arylene group, and the halogenated arylene group each optionally having a substituent and/or a hetero atom in the structure thereof, and when n201 is 2 to 8, n201 $L^{201}$'s optionally bind to each other to form a ring, or $—Z^{203}Y^{203}$, $Y^{201}$, $Y^{202}$, and $Z^{203}$ are each independently O, S, $NY^{204}$, a hydrocarbon group, or a fluorinated hydrocarbon group, and $Y^{203}$ and $Y^{204}$ are each independently H, F, an alkyl group having 1 to 10 carbon atoms, a halogenated alkyl group having 1 to 10 carbon atoms, an aryl group having 6 to 20 carbon atoms, or a halogenated aryl group having 6 to 20 carbon atoms, with the alkyl group, the halogenated alkyl group, the aryl group, and the halogenated aryl group each optionally having a substituent and/or a hetero atom in the structure thereof, and when multiple $Y^{203}$'s or multiple $Y^{204}$'s are present, they optionally bind to each other to form a ring.

Examples of $A^{a+}$ include a lithium ion, a sodium ion, a potassium ion, a magnesium ion, a calcium ion, a barium ion, a cesium ion, a silver ion, a zinc ion, a copper ion, a cobalt ion, an iron ion, a nickel ion, a manganese ion, a titanium ion, a lead ion, a chromium ion, a vanadium ion, a ruthenium ion, an yttrium ion, lanthanoid ions, actinoid ions, a tetrabutyl ammonium ion, a tetraethyl ammonium ion, a tetramethyl ammonium ion, a triethyl methyl ammonium ion, a triethyl ammonium ion, a pyridinium ion, an imidazolium ion, a hydrogen ion, a tetraethyl phosphonium ion, a tetramethyl phosphonium ion, a tetraphenyl phosphonium ion, a triphenyl sulfonium ion, and a triethyl sulfonium ion.

In a case of using for applications such as electrochemical devices, $A^{a+}$ is preferably a lithium ion, a sodium ion, a magnesium ion, a tetraalkyl ammonium ion, or a hydrogen ion, particularly preferably a lithium ion. The valence a of the cation $A^{a+}$ is an integer of 1 to 3. If the valence a is greater than 3, the crystal lattice energy increases, and a problem occurs in that the compound (5) has difficulty in dissolving in a solvent. Thus, the valence a is more preferably 1 when solubility is needed. The valence b of the anion is also an integer of 1 to 3, particularly preferably 1. The constant p that represents the ratio between the cation and the anion is naturally defined by the ratio b/a between the valences thereof.

Next, ligands in the general formula (5) will be described. The ligands herein mean organic or inorganic groups binding to $Z^{201}$ in the general formula (5).

$Z^{201}$ is preferably Al, B, V, Ti, Si, Zr, Ge, Sn, Cu, Y, Zn, Ga, Nb, Ta, Bi, P, As, Sc, Hf, or Sb, more preferably Al, B, or P.

$X^{201}$ represents O, S, an alkylene group having 1 to 10 carbon atoms, a halogenated alkylene group having 1 to 10 carbon atoms, an arylene group having 6 to 20 carbon atoms, or a halogenated arylene group having 6 to 20 carbon atoms. These alkylene groups and arylene groups each may have a substituent and/or a hetero atom in the structure thereof. Specifically, instead of a hydrogen atom in the alkylene group or the arylene group, the structure may have a halogen atom, a chain or cyclic alkyl group, an aryl group, an alkenyl group, an alkoxy group, an aryloxy group, a sulfonyl group, an amino group, a cyano group, a carbonyl group, an acyl group, an amide group, or a hydroxyl group as a substituent. Alternatively, instead of a carbon atom in the alkylene group or the arylene group, the structure may have nitrogen, sulfur, or oxygen introduced therein. When n202 is 1 and n203 is 2 to 4, n203 $X^{201}$'s may bind to each other. One such example thereof includes a ligand such as ethylenediaminetetraacetate.

$L^{201}$ represents a halogen atom, a cyano group, an alkyl group having 1 to 10 carbon atoms, a halogenated alkyl group having 1 to 10 carbon atoms, an aryl group having 6 to 20 carbon atoms, a halogenated aryl group having 6 to 20 carbon atoms, or $-Z^{203}Y^{203}$ ($Z^{203}$ and $Y^{203}$ will be described below). Similar to $X^{201}$, the alkyl groups and the aryl groups here each may have a substituent and/or a hetero atom in the structure thereof. When n201 is 2 to 8, n201 $L^{201}$'s may bind to each other to form a ring. $L^{201}$ is preferably a fluorine atom or a cyano group. This is because, in the case of a fluorine atom, the solubility and the degree of dissociation of a salt of an anion compound are improved thereby improving the ion conductivity. This is also because the oxidation resistance is improved to thereby enable occurrence of side reactions to be suppressed.

$Y^{201}$, $Y^{202}$, and $Z^{203}$ each independently represent O, S, $NY^{204}$, a hydrocarbon group, or a fluorinated hydrocarbon group. $Y^{201}$ and $Y^{202}$ are each preferably O, S, or $NY^{204}$, more preferably O. The compound (5) characteristically has a bond between $Y^{201}$ and $Z^{201}$ and a bond between $Y^{202}$ and $Z^{201}$ in the same ligand. These ligands each form a chelate structure with $Z^{201}$. The effect of this chelate improves the heat resistance, the chemical stability, and the hydrolysis resistance of this compound. The constant n202 of the ligand is 0 or 1. In particular, n202 is preferably 0 because this chelate ring becomes a five-membered ring, leading to the most strongly exerted chelate effect and improved stability.

The fluorinated hydrocarbon group herein means a group obtainable by replacing at least one hydrogen atom of a hydrocarbon group by a fluorine atom.

$Y^{203}$ and $Y^{204}$ are each independently H, F, an alkyl group having 1 to 10 carbon atoms, a halogenated alkyl group having 1 to 10 carbon atoms, an aryl group having 6 to 20 carbon atoms, or a halogenated aryl group having 6 to 20 carbon atoms. These alkyl groups and aryl groups each may contain a substituent or a hetero atom in the structure thereof. When multiple $Y^{203}$'s or multiple $Y^{204}$'s are present, they may bind to each other to form a ring.

The constant n203 relating to the number of the aforementioned ligands is an integer of 1 to 4, preferably 1 or 2, more preferably 2. The constant n201 relating to the number of the aforementioned ligands is an integer of 0 to 8, preferably an integer of 0 to 4, more preferably 0, 2, or 4. Further, when n203 is 1, n201 is preferably 2, and when n203 is 2, n201 is preferably 0.

In the general formula (5), the alkyl group, the halogenated alkyl group, the aryl group, and the halogenated aryl group include those having any other functional groups such as branches, hydroxy groups, and ether bonds.

The compound (5) is preferably a compound represented by the general formula:

[Formula 43]

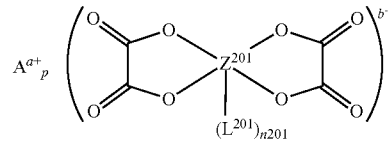

wherein $A^{a+}$, a, b, p, n201, $Z^{201}$, and $L^{201}$ are defined as described above, or a compound represented by the general formula:

[Formula 44]

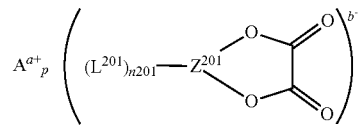

wherein $A^{a+}$, a, b, p, n201, $Z^{201}$, and $L^{201}$ are defined as described above.

The compound (5) may be a lithium oxalatoborate salt. Examples thereof include lithium bis(oxalato)borate (LIBOB) represented by the following formula:

[Formula 45]

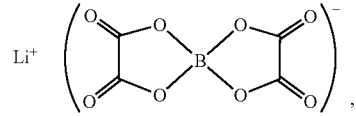

and lithium difluorooxalatoborate (LIDFOB) represented by the following formula:

[Formula 46]

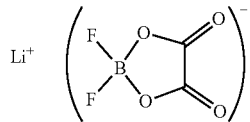

and examples of the compound (5) also include lithium difluorooxalatophosphanite (LIDFOP) represented by the following formula:

[Formula 47]

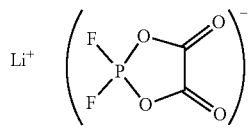

lithium tetrafluorooxalatophosphanite (LITFOP) represented by the following formula:

[Formula 48]

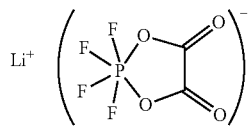

and lithium bis(oxalato)difluorophosphanite represented by the following formula:

[Formula 49]

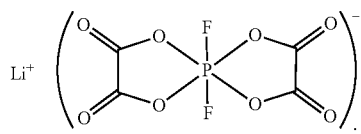

In addition, specific examples of dicarboxylic acid complex salts containing boron as a complex center element include lithium bis(malonato)borate, lithium difluoro(malonato)borate, lithium bis(methylmalonato)borate, lithium difluoro(methylmalonato)borate, lithium bis(dimethylmalonato)borate, and lithium difluoro(dimethylmalonato)borate.

Specific examples of dicarboxylic acid complex salts containing phosphorus as a complex center element include lithium tris(oxalato)phosphate, lithium tris(malonato)phosphate, lithium difluorobis(malonato)phosphate, lithium tetrafluoro(malonato)phosphate, lithium tris(methylmalonato)phosphate, lithium difluorobis(methylmalonato)phosphate, lithium tetrafluoro(methylmalonato)phosphate, lithium tris(dimethylmalonato)phosphate, lithium difluorobis(dimethylmalonato)phosphate, and lithium tetrafluoro(dimethylmalonato)phosphate.

Specific examples of dicarboxylic acid complex salts containing aluminum as a complex center element include $LiAl(C_2O_4)_2$ and $LiAlF_2(C_2O_4)$.

In view of easy availability and ability to contribute to formation of a stable film-like structure, more suitably used among these are lithium bis(oxalato)borate, lithium difluoro (oxalato)borate, lithium tris(oxalato)phosphate, lithium difluorobis(oxalato)phosphate, and lithium tetrafluoro(oxalato)phosphate.

The compound (5) is particularly preferably lithium bis(oxalato)borate.

The content of the compound (5) is preferably 0.001% by mass or more, more preferably 0.01% by mass or more, and preferably 10% by mass or less, more preferably 3% by mass or less, with respect to the solvent, because further excellent cycle characteristics can be provided.

The electrolytic solution of the present disclosure or the electrolytic solution for use in the alkali metal secondary battery of the present disclosure preferably further contains an electrolyte salt (provided that excluding the compound (5)). Examples of the electrolyte salt that can be employed include a lithium salt, an ammonium salt, and a metal salt, and any of those that can be used for an electrolytic solution, such as a liquid salt (ionic salt), an inorganic polymer salt, and an organic polymer salt.

The electrolyte salt for the electrolytic solution for an alkali metal secondary battery is preferably a lithium salt.

Any lithium salt may be used. Specific examples thereof include the following: inorganic lithium salts such as $LiPF_6$, $LiBF_4$, $LiClO_4$, $LiAlF_4$, $LiSbF_6$, $LiTaF_6$, $LiWF_7$, $LiAsF_6$, $LiAlCl_4$, LiI, LiBr, LiCl, $LiB_{10}C_{10}$, $Li_2SiF_6$, $Li_2PFO_3$, and $LiPO_2F_2$;

lithium tungstates such as $LiWOF_5$;

lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium salts having a S=O group such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$, lithium methylsulfate, lithium ethylsulfate ($C_2H_5OSO_3Li$), and lithium 2,2,2-trifluoroethylsulfate;

lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium bisperfluoroethanesulfonyl imide, lithium cyclic 1,2-perfluoroethanedisulfonyl imide, lithium cyclic 1,3-perfluoropropanedisulfonyl imide, lithium cyclic 1,2-ethanedisulfonyl imide, lithium cyclic 1,3-propanedisulfonyl imide, lithium cyclic 1,4-perfluorobutanedisulfonyl imide, $LiN(CF_3SO_2)(FSO_2)$, $LiN(CF_3SO_2)(C_3F_7SO_2)$, $LiN(CF_3SO_2)(C_4F_9SO_2)$, and $LiN(POF_2)_2$;

lithium methide salts such as $LiC(FSO_2)_3$, $LiC(CF_3SO_2)_3$, and $LiC(C_2F_5SO_2)3$; and fluorine-containing organic lithium salts such as salts represented by the formula: $LiPF_a(C_nF_{2n+1})_{6-a}$, wherein a is an integer of 0 to 5; and n is an integer of 1 to 6, such as $LiPF_3 (C_2F_5)_3$, $LiPF_3 (CF_3)_3$, $LiPF_3 (iso-C_3F_7)_3$, $LiPF_5 (iso-C_3F_7)$, $LiPF_4 (CF_3)_2$, $LiPF_4 (C_2F_5)_2)$, $LiPF_4 (CF_3SO_2)_2$, $LiPF_4 (C_2F_5SO_2)_2$, $LiBF_3CF_3$, $LiBF_3C_2F_5$, $LiBF_3C_3F_7$, $LiBF_2 (CF_3)_2$, $LiBF_2 (C_2F_5)_2$, $LiBF_2 (CF_3SO_2)_2$, and $LiBF_2 (C_2F_5SO_2)_2$, and LiSCN, $LiB(CN)_4$, $LiB(C_6H_5)_4$, $Li_2(C_2O_4)$, $LiP(C_2O_4)_3$, $Li_2B_{12}F_bH_{12-b}$, wherein b is an integer of 0 to 3.

In view of having an effect of improving properties such as output characteristics, high-rate charge and discharge characteristics, high-temperature storage characteristics, and cycle characteristics, particularly preferred among these are $LiPF_6$, $LiBF_4$, $LiSbF_6$, $LiTaF_6$, $LiPO_2F_2$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonyl imide, lithium cyclic 1,3-perfluoropropanedisulfonyl imide, LiC(FSO$_2$)$_3$, LiC(CF$_3$SO$_2$)$_3$, LiC(C$_2$F$_5$SO$_2$)$_3$, LiBF$_3$CF$_3$, LiBF$_3$C$_2$F$_5$, LiPF$_3$(CF$_3$)$_3$, and LiPF$_3$(C$_2$F$_5$)$_3$, and most preferred is at least one lithium salt selected from the group consisting of LiPF$_6$, LiN(FSO$_2$)$_2$, and LiBF$_4$.

These electrolyte salts may be used singly or in combinations of two or more thereof. Preferred examples for combination use of two or more thereof include a combination of LiPF$_6$ and LiBF$_4$ and a combination of LiPF$_6$ and LiPO$_2$F$_2$, C$_2$H$_5$OSO$_3$Li, or FSO$_3$Li. These combinations have an effect of improving the high-temperature storage characteristics, load characteristics, and cycle characteristics.

In this case, the amount of LiBF$_4$, LiPO$_2$F$_2$, C$_2$H$_5$OSO$_3$Li, or FSO$_3$Li to be blended based on 100% by mass of the total electrolytic solution is not limited and optional as long as the effects of the present disclosure are not significantly impaired. The amount thereof is usually 0.01% by mass or more, preferably 0.1% by mass or more, while usually 30% by mass or less, preferably 20% by mass or less, more preferably 10% by mass or less, further preferably 5% by mass or less, with respect to the electrolytic solution of the present disclosure or the electrolytic solution for use in the alkali metal secondary battery of the present disclosure.

In another example, an inorganic lithium salt and an organic lithium salt are used in combination. Such a combination has an effect of suppressing deterioration due to high-temperature storage. The organic lithium salt is preferably CF$_3$SO$_3$Li, LiN(F$_5$O$_2$)$_2$, LiN(F$_5$O$_2$)(CF$_3$SO$_2$), LiN(CF$_3$SO$_2$)$_2$, LiN(C$_2$F$_5$SO$_2$)$_2$, lithium cyclic 1,2-perfluoroethanedisulfonyl imide, lithium cyclic 1,3-perfluoropropanedisulfonyl imide, LiC(FSO$_2$)$_3$, LiC(CF$_3$SO$_2$)$_3$, LiC(C$_2$F$_5$SO$_2$) 3, LiBF$_3$CF$_3$, LiBF$_3$C$_2$F$_5$, LiPF$_3$(CF$_3$)$_3$, LiPF$_3$ (C$_2$F$_5$)$_3$, or the like. In this case, the proportion of the organic lithium salt is preferably 0.1% by mass or more, particularly preferably 0.5% by mass or more, while preferably 30% by mass or less, particularly preferably 20% by mass or less, based on 100% by mass of the total electrolytic solution.

The concentration of the electrolyte salt in the electrolytic solution is not limited as long as the effects of the present disclosure is not impaired. In view of making the electric conductivity of the electrolytic solution within a favorable range and ensuring favorable battery performance, the lithium in the electrolytic solution preferably has a total mole concentration of 0.3 mol/L or more, more preferably 0.4 mol/L or more, further preferably 0.5 mol/L or more, while preferably 3.0 mol/L or less, more preferably 2.5 mol/L or less, further preferably 2.0 mol/L or less.

If the total mole concentration of lithium is excessively low, the electric conductivity of the electrolytic solution may be insufficient. On the other hand, if the total mole concentration thereof is excessively high, the electric conductivity may decrease due to increase in the viscosity, and the battery performance may deteriorate.

The electrolytic solution of the present disclosure or the electrolytic solution for use in the alkali metal secondary battery of the present disclosure may further contain a compound (6) represented by the general formula (6):

[Formula 50]

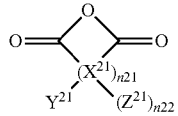

(6)

wherein $X^{21}$ is a group containing at least H or C, n21 is an integer of 1 to 3, $Y^{21}$ and $Z^{21}$ are the same as or different from each other, and are each a group containing at least H, C, O, or F, n22 is 0 or 1, and $Y^{21}$ and $Z^{21}$ optionally bind to each other to form a ring. The electrolytic solution containing the compound (6) makes the capacity retention unlikely to further decrease and makes the amount of gas generated unlikely to further increase even when stored at high temperature.

When n21 is 2 or 3, the two or three $X^{21}$'s may be the same as or different from each other.

When multiple $Y^{21}$'s and multiple $Z^{21}$'s are present, the multiple $Y^{21}$'s may be the same as or different from each other and the multiple $Z^{21}$'s may be the same as or different from each other.

$X^{21}$ is preferably a group represented by —CY$^{21}$Z$^{21}$—, wherein $Y^{21}$ and $Z^{21}$ are defined as described above, or a group represented by —CY$^{21}$=CZ$^{21}$—, wherein $Y^{21}$ and $Z^{21}$ are defined as described above.

$Y^{21}$ is preferably at least one selected from the group consisting of H—, F—, CH$_3$—, CH$_3$CH$_2$—, CH$_3$CH$_2$CH$_2$—, CF$_3$—, CF$_3$CF$_2$—, CH$_2$FCH$_2$—, and CF$_3$CF$_2$CF$_2$—.

$Z^{21}$ is preferably at least one selected from the group consisting of H—, F—, CH$_3$—, CH$_3$CH$_2$—, CH$_3$CH$_2$CH$_2$—, CF$_3$—, CF$_3$CF$_2$—, CH$_2$FCH$_2$—, and CF$_3$CF$_2$CF$_2$—.

Alternatively, $Y^{21}$ and $Z^{21}$ may bind to each other to form a carbon ring or heterocycle that may contain an unsaturated bond and may have aromaticity. The ring preferably has 3 to 20 carbon atoms.

Next, specific examples of the compound (6) will be described. In the following examples, the term "analog" means an acid anhydride obtainable by replacing part of the structure of an acid anhydride mentioned as an example by another structure without departing from the spirit of the present disclosure. Examples thereof include dimers, trimers, and tetramers each composed of a plurality of acid anhydrides, structural isomers such as those having a substituent that has the same number of carbon atoms but also has a branch, and those having a different site at which a substituent binds to the acid anhydride.

Specific examples of an acid anhydride having a 5-membered cyclic structure include succinic anhydride, methylsuccinic anhydride (4-methylsuccinic anhydride), dimethylsuccinic anhydride (e.g., 4,4-dimethylsuccinic anhydride, 4,5-dimethylsuccinic anhydride), 4,4,5-trimethylsuccinic anhydride, 4,4,5,5-tetramethylsuccinic anhydride, 4-vinylsuccinic anhydride, 4,5-divinylsuccinic anhydride, phenylsuccinic anhydride (4-phenylsuccinic anhydride), 4,5-diphenylsuccinic anhydride, 4,4-diphenylsuccinic anhydride, citraconic anhydride, maleic anhydride, methylmaleic anhydride (4-methylmaleic anhydride), 4,5-dimethylmaleic anhydride, phenylmaleic anhydride (4-phenylmaleic anhydride), 4,5-diphenylmaleic anhydride, itaconic anhydride, 5-methylitaconic anhydride, 5,5-dimethylitaconic anhydride, phthalic anhydride, 3,4,5,6-tetrahydrophthalic anhydride, and analogs thereof.

Specific examples of an acid anhydride having a 6-membered cyclic structure include cyclohexanedicarboxylic anhydride (e.g., cyclohexane-1,2-dicarboxylic anhydride), 4-cyclohexene-1,2-dicarboxylic anhydride, glutaric anhydride, glutaconic anhydride, 2-phenylglutaric anhydride, and analogs thereof.

Specific examples of an acid anhydride having other cyclic structures include 5-norbornene-2,3-dicarboxylic anhydride, cyclopentanetetracarboxylic dianhydride, pyromellitic anhydride, diglycolic anhydride, and analogs thereof.

Specific examples of an acid anhydride having a cyclic structure and substituted with a halogen atom include monofluorosuccinic anhydride (e.g., 4-fluorosuccinic anhydride), 4,4-difluorosuccinic anhydride, 4,5-difluorosuccinic anhydride, 4,4,5-trifluorosuccinic anhydride, trifluoromethylsuccinic anhydride, tetrafluorosuccinic anhydride (4,4,5,5-tetrafluorosuccinic anhydride), 4-fluoromaleic anhydride, 4,5-difluoromaleic anhydride, trifluoromethylmaleic anhydride, 5-fluoroitaconic anhydride, 5,5-difluoroitaconic anhydride, and analogs thereof.

Preferred among these as the compound (6) are glutaric anhydride, citraconic anhydride, glutaconic anhydride, itaconic anhydride, diglycolic anhydride, cyclohexanedicarboxylic anhydride, cyclopentanetetracarboxylic dianhydride, 4-cyclohexene-1,2-dicarboxylic anhydride, 3,4,5,6-tetrahydrophthalic anhydride, 5-norbornene-2,3-dicarboxylic anhydride, phenylsuccinic anhydride, 2-phenylglutaric anhydride, maleic anhydride, methylmaleic anhydride, trifluoromethylmaleic anhydride, phenylmaleic anhydride, succinic anhydride, methylsuccinic anhydride, dimethylsuccinic anhydride, trifluoromethylsuccinic anhydride, monofluorosuccinic anhydride, and tetrafluorosuccinic anhydride. More preferred are maleic anhydride, methylmaleic anhydride, trifluoromethylmaleic anhydride, succinic anhydride, methylsuccinic anhydride, trifluoromethylsuccinic anhydride, and tetrafluorosuccinic anhydride. Further preferred are maleic anhydride and succinic anhydride.

The compound (6) is preferably at least one selected from the group consisting of a compound (7) represented by the general formula (7):

[Formula 51]

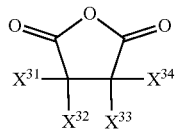

(7)

wherein $X^{31}$ to $X^{34}$ are the same as or different from each other, and are each a group containing at least H, C, O, or F, and a compound (8) represented by the general formula (8):

[Formula 52]

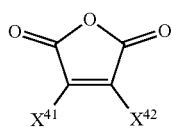

(8)

wherein $X^{41}$ and $X^{42}$ are the same as or different from each other, and are each a group containing at least H, C, O, or F.

$X^{31}$ to $X^{34}$ are the same as or different from each other, and each are preferably at least one selected from the group consisting of an alkyl group, a fluorinated alkyl group, an alkenyl group, and a fluorinated alkenyl group. $X^{31}$ to $X^{34}$ each have preferably 1 to 10 carbon atoms, more preferably 1 to 3 carbon atoms.

$X^{31}$ to $X^{34}$ are the same as or different from each other, and each are more preferably at least one selected from the group consisting of H—, F—, $CH_3$—, $CH_3CH_2$—, $CH_3CH_2CH_2$—, $CF_3$—, $CF_3CF_2$—, $CH_2FCH_2$—, and $CF_3CF_2CF_2$—.

$X^{41}$ and $X^{42}$ are the same as or different from each other, and each are preferably at least one selected from the group consisting of an alkyl group, a fluorinated alkyl group, an alkenyl group, and a fluorinated alkenyl group. $X^{41}$ and $X^{42}$ each have preferably 1 to 10 carbon atoms, more preferably 1 to 3 carbon atoms.

$X^{41}$ and $X^{42}$ are the same as or different from each other, and each are more preferably at least one selected from the group consisting of H—, F—, $CH_3$—, $CH_3CH_2$—, $CH_3CH_2CH_2$—, $CF_3$—, $CF_3CF_2$—, $CH_2FCH_2$—, and $CF_3CF_2CF_2$—.

The compound (7) is preferably any of the following compounds.

[Formula 53]

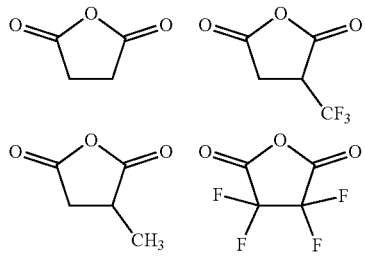

The compound (8) is preferably any of the following compounds.

[Formula 54]

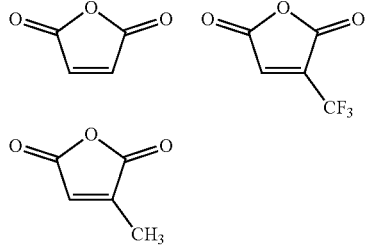

The electrolytic solution preferably contains 0.0001 to 15% by mass of the compound (6) because the capacity retention is unlikely to further decrease and the amount of gas generated is unlikely to further increase even when the electrolytic solution is stored at high temperature. The content of compound (6) is more preferably 0.01 to 10% by mass, further preferably 0.1 to 3% by mass, particularly preferably 0.1 to 1.0% by mass.

When the electrolytic solution contains both the compounds (7) and (8), the electrolytic solution preferably contains 0.08 to 2.50% by mass of the compound (7) and 0.02 to 1.50% by mass of the compound (8), more preferably 0.80 to 2.50% by mass of the compound (7) and 0.08 to 1.50% by mass of the compound (8) with respect to the electrolytic solution because the capacity retention is unlikely to further decrease and the amount of gas generated is unlikely to further increase even when the electrolytic solution is stored at high temperature.

The electrolytic solution of the present disclosure or the electrolytic solution for use in the alkali metal secondary battery of the present disclosure may contain at least one selected from the group consisting of nitrile compounds represented by the following general formulas (9a), (9b), and (9c):

[Formula 55]

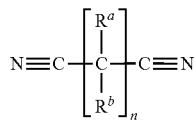

(9a)

wherein $R^a$ and $R^b$ each independently represent a hydrogen atom, a cyano group (CN), a halogen atom, an alkyl group, or a group obtainable by replacing at least one hydrogen atom of an alkyl group by a halogen atom; and n represents an integer of 1 to 10;

[Formula 56]

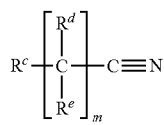

(9b)

wherein $R^c$ represents a hydrogen atom, a halogen atom, an alkyl group, a group obtainable by replacing at least one hydrogen atom of an alkyl group by a halogen atom, or a group represented by $NC-R^{c1}-X^{c1}-$, wherein $R^{c1}$ is an alkylene group, and $X^{c1}$ is an oxygen atom or a sulfur atom; $R^d$ and $R^e$ each independently represent a hydrogen atom, a halogen atom, an alkyl group, or a group obtainable by replacing at least one hydrogen atom of an alkyl group by a halogen atom; and m represents an integer of 1 to 10;

[Formula 57]

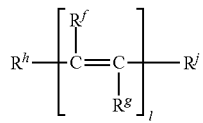

(9c)

wherein $R^f$, $R^g$, $R^h$, and $R^i$ each independently represent a group containing a cyano group (CN), a hydrogen atom (H), a halogen atom, an alkyl group, or a group obtainable by replacing at least one hydrogen atom of an alkyl group by a halogen atom; provided that at least one selected from $R^f$, $R^g$, $R^h$, and $R^i$ is a group containing a cyano group; and l represents an integer of 1 to 3.

This can improve the high-temperature storage characteristics of an electrochemical device. One of the nitrile compounds may be used alone, or two or more thereof may be used in any combination at any ratio.

In the general formula (9a), $R^a$ and $R^b$ are each independently a hydrogen atom, a cyano group (CN), a halogen atom, an alkyl group, or a group obtainable by replacing at least one hydrogen atom of an alkyl group by a halogen atom.

Examples of the halogen atom include a fluorine atom, a chlorine atom, a bromine atom, and an iodine atom. Preferred among these is a fluorine atom.

The alkyl group is preferably an alkyl group having 1 to 5 carbon atoms. Specific examples of the alkyl group include a methyl group, an ethyl group, a propyl group, an isopropyl group, a butyl group, an isobutyl group, and a tert-butyl group.

An example of the group obtainable by replacing at least one hydrogen atom of an alkyl group by a halogen atom includes a group obtainable by replacing at least one hydrogen atom of the aforementioned alkyl group by the aforementioned halogen atom.

When $R^a$ and $R^b$ are alkyl groups or groups each obtainable by replacing at least one hydrogen atom of an alkyl group by a halogen atom, $R^a$ and $R^b$ may bind to each other to form a cyclic structure (e.g., a cyclohexane ring).

$R^a$ and $R^b$ are each preferably a hydrogen atom or an alkyl group.

In the general formula (9a), n is an integer of 1 to 10. When n is 2 or more, all of n $R^a$'s may be the same as each other, or at least one of them may be different from the others. The same applies to $R^b$. n is preferably an integer of 1 to 7, more preferably an integer of 2 to 5.

Preferred as the nitrile compound represented by the general formula (9a) are dinitriles and tricarbonitriles.

Specific examples of the dinitriles include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, 3,9-bis(2-cyanoethyl)-2,4,8,10-tetraoxaspiro[5,5]undecane, butanenitrile, and phthalonitrile. Particularly preferred among these are succinonitrile, glutaronitrile, and adiponitrile.

Specific examples of the tricarbonitriles include pentanetricarbonitrile, propanetricarbonitrile, 1,3,5-hexanetricarbonitrile, 1,3,6-hexanetricarbonitrile, heptanetricarbonitrile, 1,2,3-propanetricarbonitrile, 1,3,5-pentanetricarbonitrile, cyclohexanetricarbonitrile, triscyanoethylamine, triscyanoethoxypropane, tricyanoethylene, and tris(2-cyanoethyl)

amine. Particularly preferred are 1,3,6-hexanetricarbonitrile and cyclohexanetricarbonitrile, and most preferred is cyclohexanetricarbonitrile.

In the general formula (9b), $R^c$ is a hydrogen atom, a halogen atom, an alkyl group, a group obtainable by replacing at least one hydrogen atom of an alkyl group by a halogen atom, or a group represented by NC—$R^{c1}$—$X^{c1}$—, wherein $R^{c1}$ represents an alkylene group, and $X^{c1}$ represents an oxygen atom or a sulfur atom. $R^d$ and $R^e$ are each independently a hydrogen atom, a halogen atom, an alkyl group, or a group obtainable by replacing at least one hydrogen atom of an alkyl group by a halogen atom.

Examples of the halogen atom, the alkyl group, and the group obtainable by replacing at least one hydrogen atom of an alkyl group by a halogen atom include those mentioned as examples thereof for the general formula (9a).

$R^{c1}$ in the NC—$R^{c1}$—$X^{c1}$— is an alkylene group. The alkylene group is preferably an alkylene group having 1 to 3 carbon atoms.

$R^c$, $R^d$, and $R^e$ are each preferably independently a hydrogen atom, a halogen atom, an alkyl group, or a group obtainable by replacing at least one hydrogen atom of an alkyl group by a halogen atom.

At least one of $R^c$, $R^d$, and $R^e$ is preferably a halogen atom or a group obtainable by replacing at least one hydrogen atom of an alkyl group by a halogen atom, more preferably a fluorine atom, or a group obtainable by replacing at least one hydrogen atom of an alkyl group by a fluorine atom.

When $R^d$ and $R^e$ are alkyl groups or groups each obtainable by replacing at least one hydrogen atom of an alkyl group by a halogen atom, $R^d$ and $R^e$ may bind to each other to form a cyclic structure (e.g., a cyclohexane ring).

In the general formula (9b), m is an integer of 1 to 10. When m is 2 or greater, m $R^d$'s may be the same as each other, or at least one of them may be different from the others. The same applies to $R^e$. m is preferably an integer of 2 to 7, more preferably an integer of 2 to 5.

Examples of the nitrile compound represented by the general formula (9b) include acetonitrile, propionitrile, butyronitrile, isobutyronitrile, valeronitrile, isovaleronitrile, lauronitrile, 3-methoxypropionitrile, 2-methylbutyronitrile, trimethylacetonitrile, hexanenitrile, cyclopentanecarbonitrile, cyclohexanecarbonitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, pentafluoropropionitrile, methoxyacetonitrile, and benzonitrile. Particularly preferred among these is 3,3,3-trifluoropropionitrile.

In the general formula (9c), $R^f$, $R^g$, $R^h$, and $R^i$ are each independently a group containing a cyano group (CN), a hydrogen atom, a halogen atom, an alkyl group, or a group obtainable by replacing at least one hydrogen atom of an alkyl group by a halogen atom.

Examples of the halogen atom, the alkyl group, and the group obtainable by replacing at least one hydrogen atom of an alkyl group by a halogen atom include those mentioned as examples thereof for the general formula (9a).

Examples of the group containing a cyano group include a cyano group and a group obtainable by replacing at least one hydrogen atom of an alkyl group by a cyano group. Examples of the alkyl group in this case include those mentioned as examples thereof for the general formula (9a).

At least one of $R^f$, $R^g$, $R^h$, and $R^i$ is a group containing a cyano group. Preferably, at least two of $R^f$, $R^g$, $R^h$, and $R^i$ are each a group containing a cyano group. More preferably, $R^h$ and $R^i$ are each a group containing a cyano group. When $R^h$ and $R^i$ are each a group containing a cyano group, $R^f$ and $R^g$ are preferably hydrogen atoms.

In the general formula (9c), l is an integer of 1 to 3. When l is 2 or greater, l $R^f$'s may be the same as each other, or at least one of them may be different from the others. The same applies to $R^g$. l is preferably an integer of 1 to 2.

Examples of the nitrile compound represented by the general formula (9c) include 3-hexenedinitrile, mucononitrile, maleonitrile, fumaronitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile. Preferred are 3-hexenedinitrile and mucononitrile, and particularly preferred is 3-hexenedinitrile.

The content of the nitrile compound is preferably 0.2 to 7% by mass with respect to the electrolytic solution. This can further improve the high-temperature storage characteristics and safety of an electrochemical device at a high voltage. The lower limit of the total content of the nitrile compounds is more preferably 0.3% by mass, further preferably 0.5% by mass. The upper limit thereof is more preferably 5% by mass, further preferably 2% by mass, particularly preferably 0.5% by mass.

The electrolytic solution of the present disclosure or the electrolytic solution for use in the alkali metal secondary battery of the present disclosure may contain a compound having an isocyanate group (hereinafter, also abbreviated as "isocyanate"). The isocyanate is not limited, and any isocyanate may be used. Examples of the isocyanate include monoisocyanates, diisocyanates, and triisocyanates.

Specific examples of the monoisocyanates include isocyanatomethane, isocyanatoethane, 1-isocyanatopropane, 1-isocyanatobutane, 1-isocyanatopentane, 1-isocyanatohexane, 1-isocyanatoheptane, 1-isocyanatooctane, 1-isocyanatononane, 1-isocyanatodecane, isocyanatocyclohexane, methoxycarbonyl isocyanate, ethoxycarbonyl isocyanate, propoxycarbonyl isocyanate, butoxycarbonyl isocyanate, methoxysulfonyl isocyanate, ethoxysulfonyl isocyanate, propoxysulfonyl isocyanate, butoxysulfonyl isocyanate, fluorosulfonyl isocyanate, methyl isocyanate, butyl isocyanate, phenyl isocyanate, 2-isocyanatoethyl acrylate, 2-isocyanatoethyl methacrylate, and ethyl isocyanate.

Specific examples of the diisocyanates include 1,4-diisocyanatobutane, 1,5-diisocyanatopentane, 1,6-diisocyanatohexane, 1,7-diisocyanatoheptane, 1,8-diisocyanatooctane, 1,9-diisocyanatononane, 1,10-diisocyanatodecane, 1,3-diisocyanatopropene, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, isophorone diisocyanate, bicyclo[2.2.1]heptane-2,5-diylbis(methyl=isocyanate), bicyclo[2.2.1]heptane-2,6-diylbis(methyl=isocyanate), 2,4,4-trimethylhexamethylene diisocyanate, 2,2,4-trimethylhexamethylene diisocyanate, hexamethylene diisocyanate, 1,4-phenylene diisocyanate, octamethylene diisocyanate, and tetramethylene diisocyanate.

Specific examples of the triisocyanates include 1,6,11-triisocyanatoundecane, 4-isocyanatomethyl-1,8-octamethylene diisocyanate, 1,3,5-triisocyanatomethylbenzene, 1,3,5-tris(6-isocyanatohex-1-yl)-1,3,5-triazine-2,4,6(1H,3H,5H)-trione, and 4-(isocyanatomethyl) octamethylene=diisocyanate.

Among these, 1,6-diisocyanatohexane, 1,3-bis(isocyanatomethyl)cyclohexane, 1,3,5-tris(6-isocyanatohex-1-yl)-1,3,5-triazine-2,4,6(1H,3H,5H)-trione, 2,4,4-trimethylhexamethylene diisocyanate, and 2,2,4-trimethylhexamethylene diisocyanate are industrially easily available, and preferred in view of holding down the production cost of an electrolytic solution. Also from the technical viewpoint, these isocyanates can contribute to formation of a stable film-like structure and thus are more suitably used.

The content of the isocyanate, which is not limited, is optional as long as the effects of the present disclosure are not significantly impaired, and is preferably 0.001% by mass or more and 1.0% by mass or less with respect to the electrolytic solution. A content of the isocyanate equivalent to or higher than this lower limit can give a sufficient effect of improving the cycle characteristics to a non-aqueous electrolytic solution secondary battery. A content thereof equivalent to or lower than this upper limit can avoid an initial increase in resistance of a non-aqueous electrolytic solution secondary battery. The content of the isocyanate is more preferably 0.01% by mass or more, further preferably 0.1% by mass or more, particularly preferably 0.2% by mass or more, while more preferably 0.8% by mass or less, further preferably 0.7% by mass or less, particularly preferably 0.6% by mass or less.

The electrolytic solution of the present disclosure or the electrolytic solution for use in the alkali metal secondary battery of the present disclosure may contain a cyclic sulfonate. The cyclic sulfonate is not limited, and any cyclic sulfonate may be used. Examples of the cyclic sulfonate include a saturated cyclic sulfonate, an unsaturated cyclic sulfonate, a saturated cyclic disulfonate, and an unsaturated cyclic disulfonate.

Specific examples of the saturated cyclic sulfonate include 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1,3-butanesultone, 1,4-butanesultone, 1-fluoro-1,4-butanesultone, 2-fluoro-1,4-butanesultone, 3-fluoro-1,4-butanesultone, 4-fluoro-1,4-butanesultone, 1-methyl-1,4-butanesultone, 2-methyl-1,4-butanesultone, 3-methyl-1,4-butanesultone, 4-methyl-1,4-butanesultone, and 2,4-butanesultone.

Specific examples of the unsaturated cyclic sulfonate include 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1,3-propenesultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1, 4-sultone, and 4-methyl-3-butene-14-sultone.

Among these, 1,3-propanesultone, 1-fluoro-1,3-propanesultone, 2-fluoro-1,3-propanesultone, 3-fluoro-1,3-propanesultone, and 1-propene-1,3-sultone are more suitably used in view of easy availability and ability to contribute to formation of a stable film-like structure. The content of the cyclic sulfonate, which is not limited, is optional as long as the effects of the present disclosure are not significantly impaired, and is preferably 0.001% by mass or more and 3.0% by mass or less with respect to the electrolytic solution.

A content of the cyclic sulfonate equivalent to or higher than this lower limit can give a sufficient effect of improving the cycle characteristics to a non-aqueous electrolytic solution secondary battery. A content thereof equivalent to or lower than this upper limit can avoid increase in the production cost of a non-aqueous electrolytic solution secondary battery. The content of the cyclic sulfonate is more preferably 0.01% by mass or more, further preferably 0.1% by mass or more, particularly preferably 0.2% by mass or more, while more preferably 2.5% by mass or less, further preferably 2.0% by mass or less, particularly preferably 1.8% by mass or less.

The electrolytic solution of the present disclosure or the electrolytic solution for use in the alkali metal secondary battery of the present disclosure may further contain a polyethylene oxide that has a weight average molecular weight of 2,000 to 4,000 and has —OH, —OCOOH, or —COOH at an end.

The electrolytic solution, when containing such a compound, can improve the stability at the electrode interfaces to thereby improve the characteristics of an electrochemical device.

Examples of the polyethylene oxide include polyethylene oxide monool, polyethylene oxide carboxylate, polyethylene oxide diol, polyethylene oxide dicarboxylate, polyethylene oxide triol, and polyethylene oxide tricarboxylate. One of these may be used singly, or two or more of these may be used in combination.

In view of more favorable characteristics of an electrochemical device, preferred among these are a mixture of polyethylene oxide monool and polyethylene oxide diol and a mixture of polyethylene carboxylate and polyethylene dicarboxylate.

The polyethylene oxide having an excessively small weight average molecular weight may be easily oxidatively decomposed. The weight average molecular weight is more preferably 3,000 to 4,000.

The weight average molecular weight can be measured by gel permeation chromatography (GPC) in terms of polystyrene.

The content of the polyethylene oxide is preferably $1 \times 10^{-6}$ to $1 \times 10^{-2}$ mol/kg in the electrolytic solution. An excessively large content of the polyethylene oxide may impair the characteristics of an electrochemical device.

The content of the polyethylene oxide is more preferably $5 \times 10^{-6}$ mol/kg or more.

The electrolytic solution of the present disclosure or the electrolytic solution for use in the alkali metal secondary battery of the present disclosure may further contain additives, such as a fluorinated saturated cyclic carbonate, an unsaturated cyclic carbonate, an overcharge inhibitor, and other known aids. This can suppress deterioration of the characteristics of an electrochemical device.

Examples of the fluorinated saturated cyclic carbonate include the compounds represented by the general formula (A) described above. Preferred among these are fluoroethylene carbonate, difluoroethylene carbonate, monofluoromethylethylene carbonate, trifluoromethylethylene carbonate, and 2,2,3,3,3-pentafluoropropylethylene carbonate (4-(2,2,3,3,3-pentafluoro-propyl)-[1,3]dioxolan-2-one). One of the fluorinated saturated cyclic carbonates may be used singly, or two or more thereof may be used in any combination at any ratio.

The content of the fluorinated saturated cyclic carbonate is preferably 0.001 to 10% by mass, more preferably 0.01 to 5% by mass, further preferably 0.1 to 3% by mass, with respect to the electrolytic solution.

Examples of the unsaturated cyclic carbonate include vinylene carbonates, ethylene carbonates substituted with a substituent that has an aromatic ring, a carbon-carbon double bond, or a carbon-carbon triple bond, phenyl carbonates, vinyl carbonates, allyl carbonates, and catechol carbonates.

Examples of the vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate, 4-allyl-5-fluorovinylene carbonate, ethynylethylene carbonate, propargylethylene carbonate, methylvinylene carbonate, and dimethylvinylene carbonate.

Specific examples of the ethylene carbonates substituted with a substituent that has an aromatic ring, a carbon-carbon double bond, or a carbon-carbon triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-allyl-5-phenylethylene carbonate, 4-allyl-5-phenylethylene carbonate, allylethylene carbonate, 4,5-diallylethylene carbonate, 4-methyl-5-allylethylene carbonate, 4-methylene-1,3-dioxolan-2-one, 4,5-di methylene-1,3-dioxolan-2-one, and 4-methyl-5-allylethylene carbonate.

Among these, the unsaturated cyclic carbonate is preferably vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. Particularly preferred are vinylene carbonate, vinylethylene carbonate, and ethynylethylene carbonate because of forming a more stable interface protecting film, and most preferred is vinylene carbonate.

The molecular weight of the unsaturated cyclic carbonate is not limited and is optional as long as the effects of the present disclosure are not significantly impaired. The molecular weight is preferably 50 or more and 250 or less. Within this range, the solubility of the unsaturated cyclic carbonate with respect to the electrolytic solution is likely to be ensured, and the effects of the present disclosure are likely to be sufficiently exhibited. The molecular weight of the unsaturated cyclic carbonate is more preferably 80 or more, and more preferably 150 or less.

A method for producing the unsaturated cyclic carbonate is not limited, and the unsaturated cyclic carbonate can be produced by a known method optionally selected.

One of the unsaturated cyclic carbonates may be used singly, or two or more thereof may be used in any combination at any ratio.

The content of the unsaturated cyclic carbonate is not limited and is optional as long as the effects of the present disclosure are not significantly impaired. The content of the unsaturated cyclic carbonate is preferably 0.001% by mass or more, more preferably 0.01% by mass or more, further preferably 0.1% by mass or more, based on 100% by mass of the electrolytic solution. The content is preferably 5% by mass or less, more preferably 4% by mass or less, further preferably 3% by mass or less. Within the range, an electrochemical device containing the electrolytic solution easily exhibits a sufficient effect of improving the cycle characteristics, and easily avoids a situation in which high-temperature storage characteristics deteriorate, a larger amount of gas is generated, and a discharge capacity retention decreases.

In addition to the non-fluorinated unsaturated cyclic carbonates mentioned above, a fluorinated unsaturated cyclic carbonate may also suitably be used as the unsaturated cyclic carbonate.

The fluorinated unsaturated cyclic carbonate is a cyclic carbonate having an unsaturated bond and a fluorine atom. The fluorinated unsaturated cyclic carbonate is not limited as long as the carbonate has one or more fluorine atoms. In particular, the fluorinated unsaturated cyclic carbonate has usually 6 or less fluorine atoms, preferably 4 or less fluorine atoms, most preferably 1 or 2 fluorine atoms.

Examples of the fluorinated unsaturated cyclic carbonate include a fluorinated vinylene carbonate derivative and a fluorinated ethylene carbonate derivative substituted with a substituent that has an aromatic ring or a carbon-carbon double bond.

Examples of the fluorinated vinylene carbonate derivative include 4-fluorovinylene carbonate, 4-fluoro-5-methylvinylene carbonate, 4-fluoro-5-phenylvinylene carbonate, 4-allyl-5-fluorovinylene carbonate, and 4-fluoro-5-vinylvinylene carbonate.

Examples of the fluorinated ethylene carbonate derivative substituted with a substituent that has an aromatic ring or a carbon-carbon double bond include 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

Among these, more suitably used as the fluorinated unsaturated cyclic carbonate are 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, and 4,5-difluoro-4,5-diallylethylene carbonate, because of forming a stable interface protecting film.

The molecular weight of the fluorinated unsaturated cyclic carbonate is not limited and is optional as long as the effects of the present disclosure are not significantly impaired. The molecular weight is preferably 50 or more and 500 or less. Within this range, the solubility of the fluorinated unsaturated cyclic carbonate with respect to the electrolytic solution is likely to be ensured.

A method for producing the fluorinated unsaturated cyclic carbonate is not limited, and the fluorinated unsaturated cyclic carbonate can be produced by a known method optionally selected. The molecular weight is more preferably 100 or more, while more preferably 200 or less.

One of the fluorinated unsaturated cyclic carbonates may be used singly, or two or more thereof may be used in any combination at any ratio. The content of the fluorinated unsaturated cyclic carbonate is not limited and is optional as long as the effects of the present disclosure are not significantly impaired. The content of the fluorinated unsaturated cyclic carbonate is usually preferably 0.001% by mass or more, more preferably 0.01% by mass or more, further preferably 0.1% by mass or more, while preferably 5% by mass or less, more preferably 4% by mass or less, further preferably 3% by mass or less, based on 100% by mass of the electrolytic solution. Within this range, an electrochemical device containing the electrolytic solution easily exhibits a sufficient effect of improving the cycle characteristics, and easily avoids a situation in which high-temperature storage characteristics deteriorate, a larger amount of gas is generated, and a discharge capacity retention decreases.

The electrolytic solution of the present disclosure or the electrolytic solution for use in the alkali metal secondary battery of the present disclosure may contain a compound having a triple bond. The compound may be of any type as long as the compound has one or more triple bonds in the molecule.

Specific examples of the compound having a triple bond include the following compounds:
- hydrocarbon compounds such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenyl acetylene, 1-phenyl-1-propyne, 1-phenyl-2-propyne, 1-phenyl-1-butyne, 4-phenyl-1-butyne, 4-phenyl-1-butyne, 1-phenyl-1-pentyne, 5-phenyl-1-pentyne, 1-phenyl-1-hexyne, 6-phenyl-1-hexyne, diphenyl acetylene, 4-ethynyl toluene, and dicyclohexyl acetylene;
- monocarbonates such as 2-propynylmethyl carbonate, 2-propynylethyl carbonate, 2-propynylpropyl carbonate, 2-propynylbutyl carbonate, 2-propynylphenyl carbonate, 2-propynylcyclohexyl carbonate, di-2-propynylcarbonate, 1-methyl-2-propynylmethyl carbonate, 1,1-dimethyl-2-propynylmethyl carbonate, 2-butynylmethyl carbonate, 3-butynylmethyl carbonate, 2-pentynylmethyl carbonate, 3-pentynylmethyl carbonate, and 4-pentynylmethyl carbonate; dicarbonates such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate, and 2-butyne-1,4-diol dicyclohexyl dicarbonate;
- monocarboxylates such as 2-propynyl acetate, 2-propynyl propionate, 2-propynyl butyrate, 2-propynyl benzoate, 2-propynyl cyclohexylcarboxylate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexylcarboxylate, 2-butynyl acetate, 3-butynyl acetate, 2-pentynyl acetate, 3-pentynyl acetate, 4-pentynyl acetate, methyl acrylate, ethyl acrylate, propyl acrylate, vinyl acrylate, 2-propenyl acrylate, 2-butenyl acrylate, 3-butenyl acrylate, methyl methacrylate, ethyl methacrylate, propyl methacrylate, vinyl methacrylate, 2-propenyl methacrylate, 2-butenyl methacrylate, 3-butenyl methacrylate, methyl 2-propynoate, ethyl 2-propynoate, propyl 2-propynoate, vinyl 2-propynoate, 2-propenyl 2-propynoate, 2-butenyl 2-propynoate, 3-butenyl 2-propynoate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate, and 3-butenyl 4-pentynoate, fumarates, methyl trimethylacetate, and ethyl trimethylacetate;
- dicarboxylates such as 2-butyne-1,4-diol diacetate, 2-butyne-1,4-diol dipropionate, 2-butyne-1,4-diol dibutyrate, 2-butyne-1,4-diol dibenzoate, 2-butyne-1,4-diol dicyclohexanecarboxylate, hexahydrobenzo[1,3,2]dioxathiolane-2-oxide (1,2-cyclohexane diol, 2,2-dioxide-1,2-oxathiolan-4-yl acetate, and 2,2-dioxide-1,2-oxathiolan-4-yl acetate;
- oxalic acid diesters such as methyl 2-propynyl oxalate, ethyl 2-propynyl oxalate, propyl 2-propynyl oxalate, 2-propynyl vinyl oxalate, allyl 2-propynyl oxalate, di-2-propynyl oxalate, 2-butynyl methyl oxalate, 2-butynyl ethyl oxalate, 2-butynyl propyl oxalate, 2-butynyl vinyl oxalate, allyl 2-butynyl oxalate, di-2-butynyl oxalate, 3-butynyl methyl oxalate, 3-butynyl ethyl oxalate, 3-butynyl propyl oxalate, 3-butynyl vinyl oxalate, allyl 3-butynyl oxalate, and di-3-butynyl oxalate;
- phosphine oxides such as methyl(2-propynyl)(vinyl)phosphine oxide, divinyl(2-propynyl)phosphine oxide, di(2-propynyl)(vinyl)phosphine oxide, di(2-propenyl)2(-propynyl)phosphine oxide, di(2-propynyl)(2-propenyl)phosphine oxide, di(3-butenyl)(2-propynyl)phosphine oxide, and di(2-propynyl)(3-butenyl)phosphine oxide;
- phosphinates such as 2-propynyl methyl(2-propenyl)phosphinate, 2-propynyl 2-butenyl(methyl)phosphinate, 2-propynyl di(2-propenyl)phosphinate, 2-propynyl di(3-butenyl)phosphinate, 1,1-dimethyl-2-propynyl methyl(2-propenyl)phosphinate, 1,1-dimethyl-2-propynyl 2-butenyl(methyl)phosphinate, 1,1-dimethyl-2-propynyl di(2-propenyl)phosphinate, 1,1-dimethyl-2- propynyl di(3-butenyl)phosphinate, 2-propenyl methyl (2-propynyl)phosphinate, 3-butenyl methyl(2-propynyl)phosphinate, 2-propenyl di(2-propynyl) phosphinate, 3-butenyl di(2-propynyl)phosphinate, 2-propenyl 2-propynyl(2-propenyl)phosphinate, and 3-butenyl 2-propynyl(2-propenyl)phosphinate;

phosphonates such as methyl 2-propynyl 2-propenylphosphonate, methyl(2-propynyl) 2-butenylphosphonate, (2-propynyl)(2-propenyl) 2-propenylphosphonate, (3-butenyl)(2-propynyl) 3-butenylphosphonate, (1,1-dimethyl-2-propynyl)(methyl) 2-propenylphosphonate, (1,1-dimethyl-2-propynyl)(methyl) 2-butenylphosphonate, (1,1-dimethyl-2-propynyl)(2-propenyl) 2-propenylphosphonate, (3-butenyl)(1,1-dimethyl-2-propynyl) 3-butenylphosphonate, (2-propynyl)(2-propenyl) methylphosphonate, (3-butenyl)(2-propynyl) methylphosphonate, (1,1-dimethyl-2-propynyl)(2-propenyl) methylphosphonate, (3-butenyl)(1,1-dimethyl-2-propynyl) methylphosphonate, (2-propynyl)(2-propenyl) ethylphosphonate, (3-butenyl)(2-propynyl) ethylphosphonate, (1,1-dimethyl-2-propynyl)(2-propenyl) ethylphosphonate, and (3-butenyl)(1,1-dimethyl-2-propynyl) ethylphosphonate; and phosphates such as (methyl)(2-propenyl)(2-propynyl) phosphate, (ethyl)(2-propenyl)(2-propynyl) phosphate, (2-butenyl)(methyl)(2-propynyl) phosphate, (2-butenyl)(ethyl)(2-propynyl) phosphate, (1,1-dimethyl-2-propynyl)(methyl)(2-propenyl) phosphate, (1,1-dimethyl-2-propynyl)(ethyl)(2-propenyl) phosphate, (2-butenyl)(1,1-dimethyl-2-propynyl)(methyl) phosphate, and (2-butenyl)(ethyl)(1,1-dimethyl-2-propynyl) phosphate.

Preferred among these are compounds having an alkynyloxy group because of more stably forming a negative electrode film in the electrolytic solution.

Furthermore, particularly preferred are compounds such as 2-propynylmethyl carbonate, di-2-propynyl carbonate, 2-butyne-1,4-diol dimethyl dicarbonate, 2-propynyl acetate, 2-butyne-1,4-diol diacetate, methyl 2-propynyl oxalate, and di-2-propynyl oxalate, in view of improvement in the storage characteristics.

One of the compounds having a triple bond may be used singly, or two or more thereof may be used in any combination at any ratio. The amount of the compound having a triple bond to be blended with respect to the total of the electrolytic solution of the present disclosure or the electrolytic solution for use in the alkali metal secondary battery of the present disclosure is not limited and is optional as long as the effects of the present disclosure are not significantly impaired. The compound is contained at a concentration of usually 0.01% by mass or more, preferably 0.05% by mass or more, more preferably 0.1% by mass or more, while usually 5% by mass or less, preferably 3% by mass or less, more preferably 1% by mass or less, with respect to the electrolytic solution of the present disclosure or the electrolytic solution for use in the alkali metal secondary battery of the present disclosure. When satisfying the above range, the compound further improves the effects such as output characteristics, load characteristics, cycle characteristics, and high-temperature storage characteristics.

In the electrolytic solution of the present disclosure or the electrolytic solution for use in the alkali metal secondary battery of the present disclosure, an overcharge inhibitor may be used, in order to effectively suppress burst or ignition of a battery in case of falling in a state of overcharge or the like of an electrochemical device including the electrolytic solution.

Examples of the overcharge inhibitor include aromatic compounds, including biphenyl, unsubstituted or alkyl-substituted terphenyl derivatives such as o-terphenyl, m-terphenyl, and p-terphenyl, partially hydrogenated products of unsubstituted or alkyl-substituted terphenyl derivatives, cyclohexylbenzene, t-butylbenzene, t-amylbenzene, diphenyl ether, dibenzofuran, diphenyl cyclohexane, 1,1,3-trimethyl-3-phenylindan, cyclopentylbenzene, cyclohexylbenzene, cumene, 1,3-diisopropylbenzene, 1,4-diisopropylbenzene, t-butylbenzene, t-amylbenzene, t-hexylbenzene, and anisole; partially fluorinated products of the aromatic compounds such as 2-fluorobiphenyl, 4-fluorobiphenyl, o-cyclohexylfluorobenzene, p-cyclohexylfluorobenzene, o-cyclohexylfluorobenzene, p-cyclohexylfluorobenzenefluorobenzene, fluorotoluene, and benzotrifluoride; fluorine-containing anisole compounds such as 2,4-difluoroanisole, 2,5-difluoroanisole, 1,6-difluoroanisole, 2,6-difluoroanisole, and 3,5-difluoroanisole; aromatic acetates such as 3-propylphenyl acetate, 2-ethylphenyl acetate, benzylphenyl acetate, methylphenyl acetate, benzyl acetate, and phenethylphenyl acetate; aromatic carbonates such as diphenyl carbonate and methylphenyl carbonate; toluene derivatives such as toluene and xylene, and unsubstituted or alkyl-substituted biphenyl derivatives such as 2-methylbiphenyl, 3-methylbiphenyl, 4-methylbiphenyl, and o-cyclohexylbiphenyl. Preferred among these are aromatic compounds such as biphenyl, alkylbiphenyl, terphenyl, partially hydrogenated terphenyl, cyclohexylbenzene, t-butylbenzene, t-amylbenzene, diphenyl ether, and dibenzofuran, diphenyl cyclohexane, 1,1,3-trimethyl-3-phenylindan, 3-propylphenyl acetate, 2-ethylphenyl acetate, benzylphenyl acetate, methylphenyl acetate, benzyl acetate, diphenyl carbonate, and methylphenyl carbonate. One of these may be used singly, or two or more of these may be used in combination. When two or more of these are used in combination, particularly preferred is a combination of cyclohexylbenzene and t-butylbenzene or t-amylbenzene, or a combination of at least one oxygen-free aromatic compound selected from biphenyl, alkylbiphenyl, terphenyl, partially hydrogenated terphenyl, cyclohexylbenzene, t-butylbenzene, t-amylbenzene, and the like and at least one oxygen-containing aromatic compound selected from diphenyl ether, dibenzofuran, and the like, in view of a balance between the overcharge inhibiting characteristics and the high-temperature storage characteristics with a combination use of two or more thereof.

The electrolytic solution used in the present disclosure may contain a carboxylic anhydride (provided that the compound (6) is excluded). Preferred is a compound represented by the following general formula (10). A method for producing the carboxylic anhydride is not limited, and the carboxylic anhydride can be produced by a known method optionally selected.

General Formula (10)

[Formula 58]

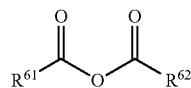

wherein $R^{61}$ and $R^{62}$ each independently represent a hydrocarbon group having 1 or more and 15 or less carbon atoms and optionally having a substituent.

The type of $R^{61}$ and $R^{62}$ is not limited as long as $R^{61}$ and $R^{62}$ each are a monovalent hydrocarbon group. For example, $R^{61}$ and $R^{62}$ may be an aliphatic hydrocarbon group or an aromatic hydrocarbon group, or may be a group having an aliphatic hydrocarbon group and an aromatic hydrocarbon group bonded. The aliphatic hydrocarbon group may be a saturated hydrocarbon group or may contain an unsaturated bond (carbon-carbon double bond or carbon-carbon triple bond). The aliphatic hydrocarbon group may be chain or cyclic. In the case of a chain group, it may be linear or branched chain. Further, the group may be a group having a chain group and a cyclic group bonded. $R^{61}$ and $R^{62}$ may be the same as or different from each other.

When the hydrocarbon group for $R^{61}$ and $R^{62}$ has a substituent, the type of the substituent is not limited unless not departing from the spirit of the present disclosure. Examples thereof include halogen atoms such as a fluorine atom, a chlorine atom, a bromine atom, and an iodine atom, and preferred is a fluorine atom. Alternatively, examples of the substituent other than the halogen atoms also include substituents having a functional group such as an ester group, a cyano group, a carbonyl group, or an ether group. Preferred are a cyano group and a carbonyl group. The hydrocarbon group for $R^{61}$ and $R^{62}$ may have only one of these substituents or may have two or more thereof. When $R^{61}$ and $R^{62}$ have two or more of the substituent, these substituents may be the same as or different from each other.

The hydrocarbon group for $R^{61}$ and $R^{62}$ each has usually one or more and usually 15 or less carbon atoms, preferably 12 or less carbon atoms, more preferably 10 or less carbon atoms, further preferably 9 or less carbon atoms. When $R^1$ and $R^2$ bind to each other to form a divalent hydrocarbon group, the divalent hydrocarbon group has usually 1 or more and usually 15 or less carbon atoms, preferably 13 or less carbon atoms, more preferably 10 or less carbon atoms, further preferably 8 or less carbon atoms. When the hydrocarbon group for $R^{61}$ and $R^{62}$ has a substituent containing a carbon atom, the total number of carbon atoms of the $R^{61}$ or $R^{62}$ including the substituent preferably satisfies the above range.

Next, specific examples of the acid anhydride represented by the general formula (10) will be described. In the following examples, the term "analog" refers to an acid anhydride obtainable by replacing part of the structure of an acid anhydride mentioned as an example by another structure without departing from the spirit of the present disclosure. Examples thereof include dimers, trimers, and tetramers each composed of a plurality of acid anhydrides, structural isomers such as those having a substituent that has the same number of carbon atoms but also has a branch, and those having a different site at which a substituent binds to the acid anhydride.

First, specific examples of an acid anhydride in which $R^{61}$ and $R^{62}$ are the same as each other will be described below.

Specific examples of an acid anhydride in which $R^{61}$ and $R^{62}$ are chain alkyl groups include acetic anhydride, propionic anhydride, butanoic anhydride, 2-methylpropionic anhydride, 2,2-dimethylpropionic anhydride, 2-methylbutanoic anhydride, 3-methylbutanoic anhydride, 2,2-dimethylbutanoic anhydride, 2,3-dimethylbutanoic anhydride, 3,3-dimethylbutanoic anhydride, 2,2,3-trimethylbutanoic anhydride, 2,3,3-trimethylbutanoic anhydride, 2,2,3,3-tetramethylbutanoic anhydride, 2-ethylbutanoic anhydride, and analogs thereof.

Specific examples of an acid anhydride in which $R^{61}$ and $R^{62}$ are cyclic alkyl groups include cyclopropanecarboxylic anhydride, cyclopentanecarboxylic anhydride, cyclohexanecarboxylic anhydride, and analogs thereof.

Specific examples of an acid anhydride in which $R^{61}$ and $R^{62}$ are alkenyl groups include acrylic anhydride, 2-methylacrylic anhydride, 3-methylacrylic anhydride, 2,3-dimethylacrylic anhydride, 3,3-dimethylacrylic anhydride, 2,3,3-trimethylacrylic anhydride, 2-phenylacrylic anhydride, 3-phenylacrylic anhydride, 2,3-diphenylacrylic anhydride, 3,3-diphenylacrylic anhydride, 3-butenoic anhydride, 2-methyl-3-butenoic anhydride, 2,2-dimethyl-3-butenoic anhydride, 3-methyl-3-butenoic anhydride, 2-methyl-3-methyl-3-butenoic anhydride, 2,2-dimethyl-3-methyl-3-butenoic anhydride, 3-pentenoic anhydride, 4-pentenoic anhydride, 2-cyclopentenecarboxylic anhydride, 3-cyclopentenecarboxylic anhydride, 4-cyclopentenecarboxylic anhydride, and analogs thereof.

Specific examples of an acid anhydride in which $R^{61}$ and $R^{62}$ are alkynyl groups include propynoic anhydride, 3-phenylpropynoic anhydride, 2-butynoic anhydride, 2-penthynoic anhydride, 3-butynoic anhydride, 3-penthynoic anhydride, 4-penthynoic anhydride, and analogs thereof.

Specific examples of an acid anhydride in which $R^{61}$ and $R^{62}$ are aryl groups include benzoic anhydride, 4-methylbenzoic anhydride, 4-ethylbenzoic anhydride, 4-tert-butylbenzoic anhydride, 2-methylbenzoic anhydride, 2,4,6-trimethylbenzoic anhydride, 1-naphthalenecarboxylic anhydride, 2-naphthalenecarboxylic anhydride, and analogs thereof.

Examples of an acid anhydride substituted with a fluorine atom are mainly listed below as examples of the acid anhydride in which $R^{61}$ and $R^{62}$ are substituted with a halogen atom. Acid anhydrides obtainable by replacing any or all of the fluorine atoms thereof with a chlorine atom, a bromine atom, or an iodine atom are also included in the exemplary compounds.

Examples of an acid anhydride in which $R^{61}$ and $R^{62}$ are halogen-substituted chain alkyl groups include fluoroacetic anhydride, difluoroacetic anhydride, trifluoroacetic anhydride, 2-fluoropropionic anhydride, 2,2-difluoropropionic anhydride, 2,3-difluoropropionic anhydride, 2,2,3-trifluoropropionic anhydride, 2,3,3-trifluoropropionic anhydride, 2,2,3,3-tetrapropionic anhydride, 2,3,3,3-tetrapropionic anhydride, 3-fluoropropionic anhydride, 3,3-difluoropropionic anhydride, 3,3,3-trifluoropropionic anhydride, perfluoropropionic anhydride, and analogs thereof.

Examples of an acid anhydride in which $R^{61}$ and $R^{62}$ are halogen-substituted cyclic alkyl groups include 2-fluorocyclopentanecarboxylic anhydride, 3-fluorocyclopentanecarboxylic anhydride, 4-fluorocyclopentanecarboxylic anhydride, and analogs thereof.

Examples of an acid anhydride in which $R^{61}$ and $R^{62}$ are halogen-substituted alkenyl groups include 2-fluoroacrylic anhydride, 3-fluoroacrylic anhydride, 2,3-difluoroacrylic anhydride, 3,3-difluoroacrylic anhydride, 2,3,3-trifluoroacrylic anhydride, 2-(trifluoromethyl) acrylic anhydride, 3-(trifluoromethyl) acrylic anhydride, 2,3-bis(trifluoromethyl)acrylic anhydride, 2,3,3-tris(trifluoromethyl)acrylic anhydride, 2-(4-fluorophenyl)acrylic anhydride, 3-(4-fluorophenyl)acrylic anhydride, 2,3-bis(4-fluorophenyl)acrylic anhydride, 3,3-bis(4-fluorophenyl)acrylic anhydride, 2-fluoro-3-butenoic anhydride, 2,2-difluoro-3-butenoic anhydride, 3-fluoro-2-butenoic anhydride, 4-fluoro-3-butenoic anhydride, 3,4-difluoro-3-butenoic anhydride, 3,3,4-trifluoro-3-butenoic anhydride, and analogs thereof.

Examples of an acid anhydride in which $R^{61}$ and $R^{62}$ are halogen-substituted alkynyl groups include 3-fluoro-2-propynoic anhydride, 3-(4-fluorophenyl)-2-propynoic anhydride, 3-(2,3,4,5,6-pentafluorophenyl)-2-propynoic anhydride, 4-fluoro-2-butynoic anhydride, 4,4-difluoro-2-butynoic anhydride, 4,4,4-trifluoro-2-butynoic anhydride, and analogs thereof.

Examples of an acid anhydride in which $R^{61}$ and $R^{62}$ are halogen-substituted aryl groups include 4-fluorobenzoic anhydride, 2,3,4,5,6-pentafluorobenzoic anhydride, 4-trifluoromethylbenzoic anhydride, and analogs thereof.

Examples of an acid anhydride in which $R^{61}$ and $R^{62}$ each has a substituent having a functional group such as an ester, a nitrile, a ketone, or an ether include methoxyformic anhydride, ethoxyformic anhydride, methyloxalic anhydride, ethyloxalic anhydride, 2-cyanoacetic anhydride, 2-oxopropionic anhydride, 3-oxobutanoic anhydride, 4-acetylbenzoic anhydride, methoxyacetic anhydride, 4-methoxybenzoic anhydride, and analogs thereof.

Subsequently, specific examples of an acid anhydride in which $R^{61}$ and $R^{62}$ are different from each other will be described below.

$R^{61}$ and $R^{62}$ may be in any combination of examples mentioned above and analogs thereof. The following gives representative examples.

Examples of a combination of chain alkyl groups include acetic propionic anhydride, acetic butanoic anhydride, butanoic propionic anhydride, and acetic 2-methylpropionic anhydride.

Examples of a combination of a chain alkyl group and a cyclic alkyl group include acetic cyclopentanoic anhydride, acetic cyclohexanoic anhydride, and cyclopentanoic propionic anhydride.

Examples of a combination of a chain alkyl group and an alkenyl group include acetic acrylic anhydride, acetic 3-methylacrylic anhydride, acetic 3-butenoic anhydride, and acrylic propionic anhydride.

Examples of a combination of a chain alkyl group and an alkynyl group include acetic propynoic anhydride, acetic 2-butynoic anhydride, acetic 3-butynoic anhydride, acetic 3-phenyl propynoic anhydride, and propionic propynoic anhydride.

Examples of a combination of a chain alkyl group and an aryl group include acetic benzoic anhydride, acetic 4-methylbenzoic anhydride, acetic 1-naphthalenecarboxylic anhydride, and benzoic propionic anhydride.

Examples of a combination of a chain alkyl group and a hydrocarbon group having a functional group include acetic fluoroacetic anhydride, acetic trifluoroacetic anhydride, acetic 4-fluorobenzoic anhydride, fluoroacetic propionic anhydride, acetic alkyloxalic anhydride, acetic 2-cyanoacetic anhydride, acetic 2-oxopropionic anhydride, acetic methoxyacetic anhydride, and methoxyacetic propionic anhydride.

Examples of a combination of cyclic alkyl groups include cyclopentanoic cyclohexanoic anhydride.

Examples of a combination of a cyclic alkyl group and an alkenyl group include acrylic cyclopentanoic anhydride, 3-methylacrylic cyclopentanoic anhydride, 3-butenoic cyclopentanoic anhydride, and acrylic cyclohexanoic anhydride.

Examples of a combination of a cyclic alkyl group and an alkynyl group include propynoic cyclopentanoic anhydride, 2-butynoic cyclopentanoic anhydride, and propynoic cyclohexanoic anhydride.

Examples of a combination of a cyclic alkyl group and an aryl group include benzoic cyclopentanoic anhydride, 4-methylbenzoic cyclopentanoic anhydride, and benzoic cyclohexanoic anhydride.

Examples of a combination of a cyclic alkyl group and a hydrocarbon group having a functional group include fluoroacetic cyclopentanoic anhydride, cyclopentanoic trifluoroacetic anhydride, cyclopentanoic 2-cyanoacetic anhydride, cyclopentanoic methoxyacetic anhydride, and cyclohexanoic fluoroacetic anhydride.

Examples of a combination of alkenyl groups include acrylic 2-methylacrylic anhydride, acrylic 3-methylacrylic anhydride, acrylic 3-butenoic anhydride, and 2-methylacrylic 3-methylacrylic anhydride.

Examples of a combination of an alkenyl group and an alkynyl group include acrylic propynoic anhydride, acrylic 2-butynoic anhydride, and 2-methylacrylic propynoic anhydride.

Examples of a combination of an alkenyl group and an aryl group include acrylic benzoic anhydride, acrylic 4-methylbenzoic anhydride, and 2-methylacrylic benzoic anhydride.

Examples of a combination of an alkenyl group and a hydrocarbon group having a functional group include acrylic fluoroacetic anhydride, acrylic trifluoroacetic anhydride, acrylic 2-cyanoacetic anhydride, acrylic methoxyacetic anhydride, and 2-methylacrylic fluoroacetic anhydride.

Examples of a combination of alkynyl groups include propynoic 2-butynoic anhydride, propynoic 3-butynoic anhydride, and 2-butynoic 3-butynoic anhydride.

Examples of a combination of an alkynyl group and an aryl group include benzoic propynoic anhydride, 4-methylbenzoic propynoic anhydride, and benzoic 2-butynoic anhydride.

Examples of a combination of an alkynyl group and a hydrocarbon group having a functional group include propynoic fluoroacetic anhydride, propynoic trifluoroacetic anhydride, propynoic 2-cyanoacetic anhydride, propynoic methoxyacetic anhydride, and 2-butynoic fluoroacetic anhydride.

Examples of a combination of aryl groups include benzoic 4-methylbenzoic anhydride, benzoic 1-naphthalenecarboxylic anhydride, and 4-methylbenzoic 1-naphthalenecarboxylic anhydride.

Examples of a combination of an aryl group and a hydrocarbon group having a functional group include benzoic fluoroacetic anhydride, benzoic trifluoroacetic anhydride, benzoic 2-cyanoacetic anhydride, benzoic methoxyacetic anhydride, and 4-methylbenzoic fluoroacetic anhydride.

Examples of a combination of hydrocarbon groups each having a functional group include fluoroacetic trifluoroacetic anhydride, fluoroacetic 2-cyanoacetic anhydride, fluoroacetic methoxyacetic anhydride, and trifluoroacetic 2-cyanoacetic anhydride.

Preferred among the above acid anhydrides forming the chain structures are acetic anhydride, propionic anhydride, 2-methylpropionic anhydride, cyclopentanecarboxylic anhydride, cyclohexanecarboxylic anhydride, acrylic anhydride, 2-methylacrylic anhydride, 3-methylacrylic anhydride, 2,3-dimethylacrylic anhydride, 3,3-dimethylacrylic anhydride, 3-butenoic anhydride, 2-methyl-3-butenoic anhydride, propynoic anhydride, 2-butynoic anhydride, benzoic anhydride, 2-methylbenzoic anhydride, 4-methylbenzoic anhydride, 4-tert-butylbenzoic anhydride, trifluoroacetic anhydride, 3,3,3-trifluoropropionic anhydride, 2-(trifluoromethyl)acrylic anhydride, 2-(4-fluorophenyl) acrylic anhydride, 4-fluorobenzoic anhydride, 2,3,4,5,6-pentafluorobenzoic anhydride, methoxyformic anhydride, and ethoxyformic anhydride. More preferred are acrylic anhydride, 2-methylacrylic anhydride, 3-methylacrylic anhydride, benzoic anhydride, 2-methylbenzoic anhydride, 4-methylbenzoic anhydride, 4-tert-butylbenzoic anhydride, 4-fluorobenzoic anhydride, 2,3,4,5,6-pentafluorobenzoic anhydride, methoxyformic anhydride, and ethoxyformic anhydride.

These compounds are preferred because these compounds can appropriately form a bond with lithium oxalate to form a film having excellent durability, thereby improving especially the charge and discharge rate characteristics after a durability test, input and output characteristics, and impedance characteristics.

The molecular weight of the carboxylic anhydride is not limited and is optional as long as the effects of the present disclosure are not significantly impaired. The molecular weight is usually 90 or more, preferably 95 or more, while usually 300 or less, preferably 200 or less. The carboxylic anhydride, when having a molecular weight within the above range, can suppress increase in a viscosity of an electrolytic solution and can appropriately improve the durability due to optimization of the film density.

A method for producing the carboxylic anhydride is also not limited, and the carboxylic anhydride can be produced by a known method optionally selected. Any one of the carboxylic anhydrides described above may be contained singly in the non-aqueous electrolytic solution of the present disclosure, or two or more thereof may be contained in any combination at any ratio.

The content of the carboxylic anhydride with respect to the electrolytic solution of the present disclosure or the electrolytic solution for use in the alkali metal secondary battery of the present disclosure is not limited, and is optional as long as the effects of the present disclosure are not significantly impaired. The carboxylic anhydride is desirably contained at a concentration of usually 0.01% by mass or more, preferably 0.1% by mass or more, while usually 5% by mass or less, preferably 3% by mass or less, with respect to the electrolytic solution of the present disclosure or the electrolytic solution for use in the alkali metal secondary battery of the present disclosure. When the content of the carboxylic anhydride is within the above range, the electrolytic solution easily exhibits an effect of improving the cycle characteristics and easily improves the battery characteristics because of having a suitable reactivity.

In the electrolytic solution of the present disclosure or the electrolytic solution for use in the alkali metal secondary battery of the present disclosure, known other aids may be used. Examples of the other aids include hydrocarbon compounds such as pentane, heptane, octane, nonane, decane, cycloheptane, benzene, furan, naphthalene, 2-phenylbicyclohexyl, cyclohexane, 2,4,8,10-tetraoxaspiro[5.5]undecane, and 3,9-divinyl-2,4,8,10-tetraoxaspiro[5.5]undecane;

fluorine-containing aromatic compounds such as fluorobenzene, difluorobenzene, hexafluorobenzene, benzotrifluoride, monofluorobenzene, 1-fluoro-2-cyclohexylbenzene, 1-fluoro-4-tert-butylbenzene, 1-fluoro-3-cyclohexylbenzene, 1-fluoro-2-cyclohexylbenzene, and fluorinated biphenyl;

carbonate compounds such as erythritan carbonate, spirobis-dimethylene carbonate, and methoxyethyl-methyl carbonate;

ether-based compounds such as dioxolane, dioxane, 2,5,8,11-tetraoxadodecane, 2,5,8,11,14-pentaoxapentadecane, ethoxymethoxyethane, trimethoxymethane, glyme, and ethylmonoglyme;

ketone-based compounds such as dimethyl ketone, diethyl ketone, and 3-pentanone;

acid anhydrides such as 2-allyl succinic anhydride;

ester compounds such as dimethyl oxalate, diethyl oxalate, ethyl methyl oxalate, di(2-propynyl)oxalate, methyl 2-propynyl oxalate, dimethyl succinate, di(2-propynyl)glutarate, methyl formate, ethyl formate, 2-propynyl formate, 2-butyne-1,4-diyl diformate, 2-propynyl methacrylate, and dimethyl malonate;

amide-based compounds such as acetamide, N-methyl formamide, N,N-dimethyl formamide, and N,N-dimethyl acetamide;

sulfur-containing compounds such as ethylene sulfate, vinylene sulfate, ethylene sulfite, methyl fluorosulfonate, ethyl fluorosulfonate, methyl methanesulfonate, ethyl methanesulfonate, busulfan, sulfolene, diphenyl sulfone, N,N-dimethylmethanesulfonamide, N,N-diethylmethanesulfonamide, methyl vinyl sulfonate, ethyl vinyl sulfonate, allyl vinyl sulfonate, propargyl vinyl sulfonate, methyl allyl sulfonate, ethyl allyl sulfonate, allyl allyl sulfonate, propargyl allyl sulfonate, 1,2-bis(vinylsulfonyloxy)ethane, propanedisulfonic anhydride, sulfobutyric anhydride, sulfobenzoic anhydride, sulfopropionic anhydride, ethanedisulfonic anhydride, methylene methanedisulfonate, 2-propynyl methanesulfonate, pentene sulfite, pentafluorophenyl methanesulfonate, propylene sulfate, propylene sulfite, propane sultone, butylene sulfite, butane-2,3-diyl dimethanesulfonate, 2-butyne-1,4-diyl dimethanesulfonate, 2-propynyl vinyl sulfonate, bis(2-vinylsulfonylethyl)ether, 5-vinyl-hexahydro-1,3,2-benzodioxathiol-2-oxide, 2-propynyl 2-(methanesulfonyloxy)propionate, 5,5-dimethyl-1,2-oxathiolan-4-one 2,2-dioxide, 3-sulfo-propionic anhydride, trimethylene methanedisulfonate, 2-methyl tetrahydrofuran, trimethylene methanedisulfonate, tetramethylene sulfoxide, dimethylene methanedisulfonate, difluoroethyl methyl sulfone, divinyl sulfone, 1,2-bis(vinylsulfonyl)ethane, methyl ethylenebissulfonate, ethyl ethylenebissulfonate, ethylene sulfate, and thiophene 1-oxide;

nitrogen-containing compounds such as 1-methyl-2-pyrrolidinone, 1-methyl-2-piperidone, 3-methyl-2-oxazolidinone, 1,3-dimethyl-2-imidazolidinone, N-methylsuccinimide, nitromethane, nitroethane, and ethylene diamine;

phosphorus-containing compounds such as trimethyl phosphite, triethyl phosphite, triphenyl phosphite, trimethyl phosphate, triethyl phosphate, triphenyl phosphate, dimethyl methyl phosphonate, diethyl ethyl phosphonate, dimethyl vinyl phosphonate, diethyl vinyl phosphonate, ethyl diethyl phosphonoacetate, methyl dimethyl phosphinate, ethyl diethyl phosphinate, trimethylphosphine oxide, triethylphosphine oxide, bis(2,2-difluoroethyl)$_2$,2,2-trifluoroethyl phosphate, bis(2,2,3,3-tetrafluoropropyl)2,2,2-trifluoroethyl phosphate, bis(2,2,2-trifluoroethyl)methyl phosphate, bis(2,2,2-trifluoroethyl)ethyl phosphate, bis(2,2,2-trifluoroethyl)2,2-difluoroethyl phosphate, bis(2,2,2-trifluoroethyl)2,2,3,3-tetrafluoropropyl phosphate, tributyl phosphate, tris(2,2,2-trifluoroethyl)phosphate, tris(1,1,1,3,3,3-hexafluoropropan-2-yl) phosphate, trioctyl phosphate, 2-phenylphenyldimethyl phosphate, 2-phenylphenyldiethyl phosphate, (2,2,2-trifluoroethyl)(2,2,3,3-tetrafluoropropyl)methyl phosphate, methyl 2-(dimethoxyphosphoryl)acetate, methyl 2-(dimethylphosphoryl)acetate, methyl 2-(diethoxyphosphoryl)acetate, methyl 2-(diethylphosphoryl)acetate, methyl methylenebisphosphonate, ethyl methylenebisphosphonte, methyl ethylenebisphosphonate, ethyl ethylenebisphosphonate, methyl butylenebisphosphonate, ethyl butylenebisphosphonate, 2-propynyl 2-(dimethoxyphosphoryl)acetate, 2-propynyl 2-(diethylphosphoryl)acetate, 2-propynyl 2-(diethoxyphosphoryl)acetate, 2-propynyl 2-(diethylphosphoryl)acetate, tris(trimethylsilyl)phosphate, tris(triethylsilyl)phosphate, tris(trimethoxysilyl)phosphate, tris(trimethylsilyl)phosphite, tris(triethylsilyl)phosphite, tris(trimethoxysilyl)phosphite, and trimethylsilyl polyphosphate;

boron-containing compounds such as tris(trimethylsilyl) borate and tris(trimethoxysilyl) borate; and silane compounds such as dimethoxyaluminoxytrimethoxysilane, diethoxyaluminoxytriethoxysilane, dipropoxyaluminoxytriethoxysilane, dibutoxyaluminoxytrimethoxysilane, dibutoxyaluminoxytriethoxysilane, titanium tetrakis(trimethylsiloxide), titanium tetrakis(triethylsiloxide), and tetramethylsilane. One of these may be used singly, or two or more of these may be used in combination. Addition of these aids can improve the capacity retention characteristics after high-temperature storage and the cycle characteristics.

Preferred among these as the above other aids are phosphorus-containing compounds, and preferred are tris(trimethylsilyl)phosphate and tris(trimethylsilyl)phosphite.

The amount of the other aids to be blended is not limited, and is optional as long as the effects of the present disclosure are not significantly impaired. The amount of the other aids to be blended is preferably 0.01% by mass or more and 5% by mass or less based on 100% by mass of the electrolytic solution. The other aids, when the amount is within this range, can easily sufficiently exhibit the effects thereof and can easily avoid a situation in which the battery characteristics deteriorate, such as high-load discharge characteristics. The amount of the other aids to be blended is more preferably 0.1% by mass or more, further preferably 0.2% by mass or more, while more preferably 3% by mass or less, further preferably 1% by mass or less.

The electrolytic solution of the present disclosure or the electrolytic solution for use in the alkali metal secondary battery of the present disclosure may further contain, as an additive, a cyclic carboxylate, a chain carboxylate, a nitrogen-containing compound, a boron-containing compound, an organosilicon-containing compound, a fireproof agent (flame retardant), a surfactant, an additive for increasing the permittivity, an improver for cycle characteristics and rate characteristics, a sulfone-based compound, and the like to the extent that the effects of the present disclosure are not impaired.

Examples of the cyclic carboxylate include those having 3 to 12 carbon atoms in total in the structural formula. Specific examples thereof include gamma-butyrolactone, gamma-valerolactone, gamma-caprolactone, epsilon-caprolactone, and 3-methyl-γ-butyrolactone. Particularly preferred among these is gamma-butyrolactone in view of improvement in the characteristics of an electrochemical device derived from improvement in the degree of dissociation of lithium ions.

The amount of the cyclic carboxylate to be blended as an additive is usually preferably 0.1% by mass or more, more preferably 1% by mass or more, based on 100% by mass of the solvent. When the amount is within this range, the cyclic carboxylate can improve the electric conductivity of the electrolytic solution and thus easily improve the large-current discharge characteristics of an electrochemical device. The amount of the cyclic carboxylate to be blended is preferably 10% by mass or less, more preferably 5% by mass or less. Setting such an upper limit may in this way allow the electrolytic solution to have a viscosity within an appropriate range, may enable reduction in the electric conductivity to be avoided, may suppress increase in the resistance of the negative electrode, and may allow an electrochemical device to have large-current discharge characteristics within a favorable range.

The cyclic carboxylate to be suitably used may also be a fluorinated cyclic carboxylate (fluorine-containing lactone). Examples of the fluorine-containing lactone include fluorine-containing lactones represented by the following formula (C):

[Formula 59]

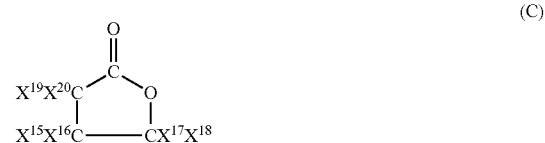

(C)

wherein $X^{15}$ to $X^{20}$ are the same as or different from each other, and are each —H, —F, —Cl, —CH$_3$, or a fluorinated alkyl group; provided that at least one of $X^{15}$ to $X^{20}$ is a fluorinated alkyl group.

Examples of the fluorinated alkyl group for $X^{15}$ to $X^{20}$ include —CFH$_2$, —CF$_2$H, —CF$_3$, —CH$_2$CF$_3$, —CF$_2$CF$_3$, —CH$_2$CF$_2$CF$_3$, and —CF(CF$_3$)$_2$. Preferred are —CH$_2$CF$_3$ and —CH$_2$CF$_2$CF$_3$ in view of high oxidation resistance and having an effect of improving the safety.

As long as at least one of $X^{15}$ to $X^{20}$ is a fluorinated alkyl group, only one site of $X^{15}$ to $X^{20}$ or a plurality of sites thereof may be replaced by —H, —F, —Cl, —CH$_3$, or a fluorinated alkyl group. In view of favorable solubility of an electrolyte salt, one to three sites of $X^{15}$ to $X^{20}$ are preferably substituted, one or two sites thereof are more preferably substituted.

The substituted site of the fluorinated alkyl group is not limited. In view of a favorable synthesizing yield, it is preferred that $X^{17}$ and/or $X^{18}$, in particular, $X^{17}$ or $X^{18}$ be a fluorinated alkyl group, especially —CH$_2$CF$_3$ or —CH$_2$CF$_2$CF$_3$. $X^{15}$ to $X^{20}$ other than the fluorinated alkyl group is —H, —F, —Cl, or CH$_3$. In view of favorable solubility of an electrolyte salt, —H is preferred.

In addition to those represented by the formula, examples of the fluorine-containing lactone include fluorine-containing lactones represented by the following formula (D):

[Formula 60]

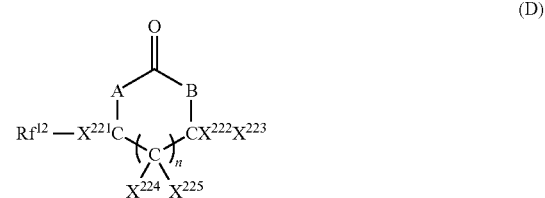

(D)

wherein either one of A or B is CX$^{226}$X$^{227}$, where X$^{226}$ and X$^{227}$ are the same as or different from each other, and are each —H, —F, —Cl, —CF$_3$, —CH$_3$, or an alkylene group in which a hydrogen atom is optionally replaced by a halogen atom and which optionally contains a hetero atom in the chain, and the other is an oxygen atom; $Rf^{12}$ is a fluorinated alkyl group or fluorinated alkoxy group optionally having an ether bond; $X^{221}$ and $X^{222}$ are the same as or different from each other, and are each —H, —F, —Cl, —$CF_3$, or $CH_3$; $X^{223}$ to $X^{225}$ are the same as or different from each other, and are each —H, —F, —Cl, or an alkyl group in which a hydrogen atom is optionally replaced by a halogen atom and which optionally contains a hetero atom in the chain; and n=0 or 1.

A preferred example of the fluorine-containing lactone represented by the formula (D) includes a 5-membered ring structure represented by the following formula (E):

[Formula 61]

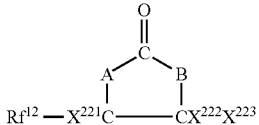

(E)

wherein A, B, $Rf^{12}$, $X^{221}$, $X^{222}$, and $X^{223}$ are defined as in the formula (D), in view of easily synthesized and having favorable chemical stability. Further, in accordance with the combination of A and B, fluorine-containing lactones represented by the following formula (F):

[Formula 62]

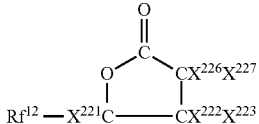

(F)

wherein $Rf^{12}$, $X^{221}$, $X^{222}$, $X^{223}$, $X^{226}$, and $X^{227}$ are defined as in the formula (D); and fluorine-containing lactones represented by the following formula (G):

[Formula 63]

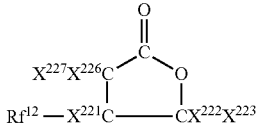

(G)

wherein $Rf^{12}$, $X^{221}$, $X^{222}$, $X^{223}$, $X^{226}$, and $X^{227}$ are defined as in the formula (D) may be mentioned.

Among these, those represented by the following formulas:

[Formula 64]

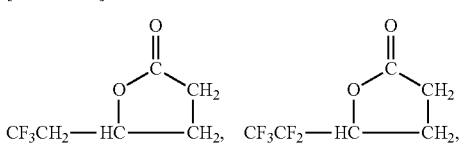

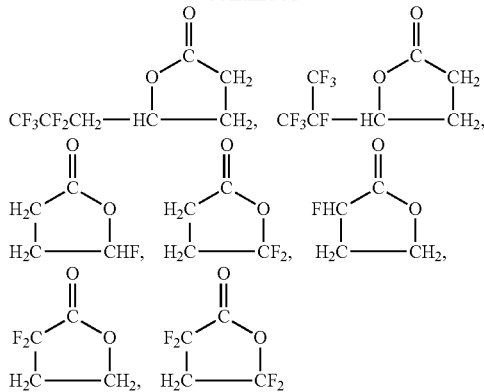

may be mentioned, because excellent characteristics such as high permittivity and high withstand voltage are particularly exerted, and other characteristics of the electrolytic solution in the present disclosure are improved, for example, good solubility of an electrolyte salt and reduction in the internal resistance.

Incorporation of a fluorinated cyclic carboxylate can result in effects of improving the ion conductivity, improving the safety, improving the stability at high temperature, and the like.

Examples of the chain carboxylate include those having 3 to 7 carbon atoms in total in the structural formula thereof. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isobutyl propionate, n-butyl propionate, methyl butyrate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Preferred among these are methyl acetate, ethyl acetate, n-propyl acetate, n-butyl acetate, methyl propionate, ethyl propionate, n-propyl propionate, isopropyl propionate, methyl butyrate, ethyl butyrate, and the like, in view of improvement in the ion conductivity owing to viscosity reduction.

Examples of the nitrogen-containing compound to be used include nitrile, fluorine-containing nitrile, carboxylic acid amide, fluorine-containing carboxylic acid amide, sulfonic acid amide and fluorine-containing sulfonic acid amide, acetamide, and formamide. 1-methyl-2-pyrrolidinone, 1-methyl-2-piperidone, 3-methyl-2-oxazilidinone, 1,3-dimethyl-2-imidazolidinone, and N-methylsuccinimide, and the like also may be used. However, the nitrile compounds represented by the general formulas (1a), (1b), and (1c) are not included in the above nitrogen-containing compounds.

Examples of the boron-containing compound include borates such as trimethyl borate and triethyl borate, boric acid ethers, and alkyl borates.

Examples of the organosilicon-containing compound include $(CH_3)_4$—Si, $(CH_3)_3$—Si—$Si(CH_3)_3$, and silicon oil.

Examples of the fireproof agent (flame retardant) include phosphates and phosphazene-based compounds. Examples of the phosphates include fluorine-containing alkyl phosphates, non-fluorine-containing alkyl phosphates, and aryl phosphates. Fluorine-containing alkyl phosphates are preferred among these because such phosphates can achieve a non-flammable effect in a small amount.

Examples of the phosphazene-based compounds include methoxypentafluorocyclotriphosphazene, phenoxypentafluorocyclotriphosphazene, dimethylaminopentafluorocyclotriphosphazene, diethylaminopentafluorocyclotriphosphazene, ethoxypentafluorocyclotriphosphazene, and ethoxyheptafluorocyclotetraphosphazene.

Specific examples of the fluorine-containing alkyl phosphates include fluorine-containing dialkyl phosphates disclosed in Japanese Patent Laid-Open No. 11-233141, cyclic alkyl phosphates disclosed in Japanese Patent Laid-Open No. 11-283669, and fluorine-containing trialkyl phosphates.

Preferred examples of the fireproof agent (flame retardant) include $(CH_3O)_3P=O$, $(CF_3CH_2O)_3P=O$, $(HCF_2CH_2O)_3P=O$, $(CF_3CF_2CH_2)_3P=O$, and $(HCF_2CF_2CH_2)_3P=O$.

The surfactant may be any of cationic surfactants, anionic surfactants, nonionic surfactants, and amphoteric surfactants. The surfactant preferably contains a fluorine atom because of giving favorable cycle characteristics and rate characteristics.

Preferred examples of such a surfactant containing a fluorine atom include fluorine-containing carboxylic acid salts represented by the following formula (30):

$$Rf^5COO^-M^+ \quad (30)$$

wherein $Rf^5$ is a fluorine-containing alkyl group having 3 to 10 carbon atoms and optionally containing an ether bond; $M^+$ is $Li^+$, $Na^+$, $K^+$, or $NHR'_3{}^+$, where R's are the same as or different from each other, and are each H or an alkyl group having 1 to 3 carbon atoms, and fluorine-containing sulfonic acid salts represented by the following formula (40):

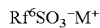

$$Rf^6SO_3^-M^+ \quad (40)$$

wherein $Rf^6$ is a fluorine-containing alkyl group having 3 to 10 carbon atoms and optionally containing an ether bond; $M^+$ is $Li^+$, $Na^+$, $K^+$, or $NHR'_3{}^+$, where R's are the same as or different from each other, and are each H or an alkyl group having 1 to 3 carbon atoms.

The content of the surfactant is preferably 0.01 to 2% by mass relative to the electrolytic solution because the surface tension of the electrolytic solution can be reduced without deterioration in the charge and discharge cycle characteristics.

Examples of the additive for increasing the permittivity include sulfolane, methylsulfolane, γ-butyrolactone, and γ-valerolactone.

Examples of the improver for cycle characteristics and rate characteristics include methyl acetate, ethyl acetate, tetrahydrofuran, and 1,4-dioxane.

The electrolytic solution of the present disclosure or the electrolytic solution for use in the alkali metal secondary battery of the present disclosure may be combined with a polymer material and thereby formed into a gel-like (plasticized) gel electrolytic solution.

Examples of such a polymer material include conventionally known polyethylene oxide and polypropylene oxide, and modified products thereof (Japanese Patent Laid-Open Nos. 8-222270 and 2002-100405); polyacrylate-based polymers, polyacrylonitrile, and fluororesins such as polyvinylidene fluoride and vinylidene fluoride-hexafluoropropylene copolymers (Japanese Translation of PCT International Application Publication Nos. 4-506726 and 8-507407, and Japanese Patent Laid-Open No. 10-294131); and composites of any of these fluororesins and any hydrocarbon resin (Japanese Patent Laid-Open Nos. 11-35765 and 11-86630). In particular, polyvinylidene fluoride or a vinylidene fluoride-hexafluoropropylene copolymer is desirably used as a polymer material for a gel electrolyte.

The electrolytic solution of the present disclosure or the electrolytic solution for use in the alkali metal secondary battery of the present disclosure may also contain an ion conductive compound disclosed in Japanese Patent Application No. 2004-301934.

This ion conductive compound is an amorphous fluorine-containing polyether compound having a fluorine-containing group at a side chain and is represented by the formula (101):

$$A\text{-}(D)\text{-}B \quad (101)$$

wherein D is represented by the formula (201):

$$\text{-}(D1)_n\text{-}(FAE)_m\text{-}(AE)_p\text{-}(Y)_q\text{-} \quad (201)$$

where D1 is an ether unit having a fluorine-containing ether group at a side chain and is represented by the formula (10a):

[Formula 65]

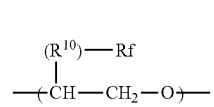

(10a)

where Rf is a fluorine-containing ether group optionally having a crosslinkable functional group; and $R^{10}$ is a group or a bond that bonds Rf and the main chain;

FAE is an ether unit having a fluorinated alkyl group at a side chain and is represented by the formula (10b):

[Formula 66]

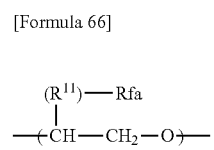

(10b)

where Rfa is a hydrogen atom or a fluorinated alkyl group optionally having a crosslinkable functional group; and $R^{11}$ is a group or a bond that bonds Rfa and the main chain;

AE is an ether unit represented by the formula (10c):

[Formula 67]

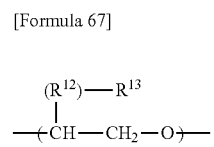

(10c)

where $R^{13}$ is a hydrogen atom, an alkyl group optionally having a crosslinkable functional group, an aliphatic cyclic hydrocarbon group optionally having a crosslinkable functional group, or an aromatic hydrocarbon group optionally having a crosslinkable functional group; and $R^{12}$ is a group or a bond that bonds $R^{13}$ and the main chain;

Y is a unit containing at least one of the formulas (10d-1) to (10d-3):

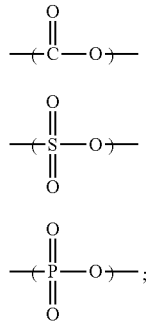

n is an integer of 0 to 200; m is an integer of 0 to 200; p is an integer of 0 to 10,000; q is an integer of 1 to 100; provided that n+m is not 0, and the bonding order of D1, FAE, AE, and Y is not specified;

A and B are the same as or different from each other, and are each a hydrogen atom, an alkyl group optionally containing a fluorine atom and/or a crosslinkable functional group, a phenyl group optionally containing a fluorine atom and/or a crosslinkable functional group, a —COOH group, —OR (where R is a hydrogen atom or an alkyl group optionally containing a fluorine atom and/or a crosslinkable functional group), an ester group, or a carbonate group (provided that, when an end of D is an oxygen atom, A and B are each none of a —COOH group, —OR, an ester group, and a carbonate group).

The electrolytic solution of the present disclosure or the electrolytic solution for use in the alkali metal secondary battery of the present disclosure may contain a sulfone-based compound. Preferred as the sulfone-based compound are a cyclic sulfone having 3 to 6 carbon atoms and a chain sulfone having 2 to 6 carbon atoms. The number of sulfonyl groups in one molecule is preferably 1 or 2.

Examples of the cyclic sulfone include monosulfone compounds such as trimethylene sulfones, tetramethylene sulfones, and hexamethylene sulfones; disulfone compounds such as trimethylene disulfones, tetramethylene disulfones, and hexamethylene disulfones.

More preferred among these are tetramethylene sulfones, tetramethylene disulfones, hexamethylene sulfones, and hexamethylene disulfones, particularly preferred are tetramethylene sulfones (sulfolanes), from the viewpoint of permittivity and viscosity.

The sulfolanes are preferably sulfolane and/or sulfolane derivatives (hereinafter, optionally abbreviated as "sulfolanes" including sulfolane). The sulfolane derivatives are preferably those in which one or more hydrogen atoms binding to any carbon atom constituting the sulfolane ring is replaced by a fluorine atom or an alkyl group.

Preferred among these are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, 3-sulfolene, 5-fluoro-3-(trifluoromethyl)sulfolane, and the like, in view of high ion conductivity and high input and output.

Examples of the chain sulfone include dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, t-butyl methyl sulfone, t-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethyl isopropyl sulfone, difluoromethyl isopropyl sulfone, trifluoromethyl isopropyl sulfone, trifluoroethyl-n-propyl sulfone, trifluoroethyl isopropyl sulfone, pentafluoroethyl-n-propyl sulfone, pentafluoroethyl isopropyl sulfone, trifluoroethyl-n-butyl sulfone, trifluoroethyl-t-butyl sulfone, pentafluoroethyl-n-butyl sulfone, and pentafluoroethyl-t-butyl sulfone.

Preferred among these are dimethyl sulfone, ethyl methyl sulfone, diethyl sulfone, n-propylmethyl sulfone, isopropylmethyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-t-butyl sulfone, trifluoromethyl-n-butyl sulfone, trifluoromethyl-t-butyl sulfone, and the like, in view of high ion conductivity and high input and output.

The content of the sulfone-based compound is not limited, and is optional as long as the effects of the present disclosure are not significantly impaired. The content thereof is usually 0.3% by volume or more, preferably 0.5% by volume or more, more preferably 1% by volume or more, while usually 40% by volume or less, preferably 35% by volume or less, more preferably 30% by volume or less based on 100% by volume of the above solvent. When the content thereof is within the range, the sulfone-based compound easily achieves an effect of improving the cycle characteristics and the durability such as storage characteristics, brings the viscosity of a non-aqueous electrolytic solution within an appropriate range, can avoid decrease in the electric conductivity, and can bring the input and output characteristics and charge and discharge rate characteristics of a non-aqueous electrolytic solution secondary battery within appropriate ranges.

The electrolytic solution of the present disclosure or the electrolytic solution for use in the alkali metal secondary battery of the present disclosure also preferably contains, as an additive, at least one compound (11) selected from the group consisting of lithium fluorophosphates (provided that excluding LiPF$_6$) and lithium salts having a S=O group, from the viewpoint of improvement in the output characteristics.

When the compound (11) is used as an additive, a compound other than the compound (11) is preferably used as the electrolyte salt mentioned above.

Examples of the lithium fluorophosphates include lithium monofluorophosphate (LiPO$_3$F) and lithium difluorophosphate (LiPO$_2$F$_2$).

Examples of the lithium salt having a S=O group include lithium monofluorosulfonate (FSO$_3$Li), lithium methyl sulfate (CH$_3$OSO$_3$Li), lithium ethyl sulfate (C$_2$H$_5$OSO$_3$Li), and lithium 2,2,2-trifluoroethyl sulfate.

Preferred among these as the compound (11) are LiPO$_2$F$_2$, FSO$_3$Li, and C$_2$H$_5$OSO$_3$Li.

The content of the compound (11) is preferably 0.001 to 20% by mass, more preferably 0.01 to 15% by mass, further preferably, 0.1 to 10% by mass, particularly preferably 0.1 to 7% by mass, with respect to the electrolytic solution.

To the electrolytic solution of the present disclosure or the electrolytic solution for use in the alkali metal secondary battery of the present disclosure, other additive may be further added, as required. Examples of the other additive include metal oxides and glass.

The electrolytic solution of the present disclosure or the electrolytic solution for use in the alkali metal secondary battery of the present disclosure preferably contains 5 to 200 ppm of hydrogen fluoride (HF). Incorporation of HF can promote formation of a film of the additive mentioned above. If the content of HF is excessively small, the ability to form a film on the negative electrode tends to decrease, and the characteristics of an electrochemical device tend to deteriorate. If the content of HF is excessively large, the oxidation resistance of the electrolytic solution tends to decrease due to the influence of HF. The electrolytic solution of the present disclosure or the electrolytic solution for use in the alkali metal secondary battery of the present disclosure, even when containing HF in the content within the above range, causes no reduction in the recovery capacity ratio after high-temperature storage of an electrochemical device.

The content of HF is more preferably 10 ppm or more, further preferably 20 ppm or more. The content of HF is more preferably 100 ppm or less, further preferably 80 ppm or less, particularly preferably 50 ppm or less. The content of HF can be measured by neutralization titration.

The electrolytic solution of the present disclosure or the electrolytic solution for use in the alkali metal secondary battery of the present disclosure is preferably prepared by any method using the components mentioned above.

<Alkali Metal Electrode>

The alkali metal electrode of the present disclosure contains the aforementioned compound represented by the general formula (1) and/or a polymer thereof. Such a negative electrode exerts an effect of enabling generation of dendrites to be suppressed. The alkali metal electrode can be used as a negative electrode.

The alkali metal electrode, in other words, includes an alkali metal element such as lithium, sodium, or potassium in a metal state.

Examples of the above negative electrode active material of the alkali metal electrode that may be used include simple alkali metals, and simple metals and alloys that form alkali metal alloys. The simple metals and alloys that form alkali metal-containing alloys are preferably materials containing any of metal and semi-metal elements in the Groups 13 and 14, more preferably simple metals of aluminum, silicon, and tin (hereinafter, also abbreviated as "specific metal elements"), and alloys containing any of these atoms. One of these may be used singly, or two or more thereof may be used in any combination at any ratio.

Among these, simple lithium metal or an alloy containing the same is most preferably used, and simple lithium metal is most preferred.

The negative electrode can be produced by a common method for producing metal foil. When an alloyed material is employed, also used is a method for forming a thin film layer containing the above negative electrode active material (negative electrode active material layer) by approaches such as vapor deposition, sputtering, and plating.

The thickness of the negative electrode plate is designed in accordance with the positive electrode plate used and is not limited. The thickness of the mixture layer excluding the thickness of the metal foil of the core material is desirably usually 15 μm or more, preferably 20 μm or more, more preferably 30 μm or more, while usually 300 μm or less, preferably 280 μm or less, more preferably 250 μm or less.

Examples of the material of the current collector for a negative electrode include metal materials including metals such as copper, nickel, titanium, tantalum, and stainless steel, and alloys thereof; and carbon materials such as carbon cloth and carbon paper. Preferred among these are metal materials, especially copper, nickel, or an alloy thereof.

In the case of a metal material, the current collector may be in the form of metal foil, metal cylinder, metal coil, metal plate, metal thin film, expanded metal, punched metal, metal foam, or the like. In the case of a carbon material, the current collector may be in the form of carbon plate, carbon thin film, carbon cylinder, or the like. Preferred among these is a metal thin film. The thin film may be in the form of mesh, as appropriate. The thin film may have any thickness, and the thickness is usually 1 μm or more, preferably 3 μm or more, more preferably 5 μm or more, while usually 1 mm or less, preferably 100 μm or less, more preferably 50 μm or less. If the thin film is thinner than the above range, the strength thereof required for a current collector may become insufficient. In contrast, if the thin film is thicker than this range, the handleability may be impaired.

The present disclosure also provides an alkali metal secondary battery comprising the above negative alkali metal electrode. A positive electrode, an electrolytic solution, a separator, and the like for use in batteries including a known alkali metal as the negative electrode may be used for the alkali metal secondary battery of the present disclosure. These will be described in detail hereinafter.

<Positive Electrode>

In the alkali metal secondary battery of the present disclosure, the positive electrode is composed of a positive electrode active material layer containing a positive electrode active material and a current collector.

The positive electrode active material is not limited as long as the material can electrochemically occlude and release alkali metal ions. A preferred example thereof includes a material containing an alkali metal and at least one transition metal. Specific examples thereof include an alkali metal-containing transition metal composite oxide, an alkali metal-containing transition metal phosphate compound, a sulfur-based material, and a conductive polymer.

Particularly preferred among these as the positive electrode active material is an alkali metal-containing transition metal composite oxide that generates a high voltage. Examples of the alkali metal ion include a lithium ion, a sodium ion, and a potassium ion. In a preferred aspect, the alkali metal ion may be a lithium ion. In other words, in the present aspect, the alkali metal ion secondary battery is a lithium ion secondary battery.

Examples of the alkali metal-containing transition metal composite oxide include lithium-manganese spinel composite oxides represented by the formula: $MaMn_{2-b}M^1_bO_4$ wherein M is at least one metal selected from the group consisting of Li, Na, and K; $0.9 \le a$; $0 \le b \le 1.5$; $M^1$ is at least one metal selected from the group consisting of Fe, Co, Ni, Cu, Zn, Al, Sn, Cr, V, Ti, Mg, Ca, Sr, B, Ga, In, Si, and Ge;

lithium-nickel composite oxides represented by the formula: $MNi_{1-c}M^2_cO_2$ wherein M is at least one metal selected from the group consisting of Li, Na, and K; $0 \le c \le 0.5$; $M^2$ is at least one metal selected from the group consisting of Fe, Co, Mn, Cu, Zn, Al, Sn, Cr, V, Ti, Mg, Ca, Sr, B, Ga, In, Si, and Ge; or lithium-cobalt composite oxides represented by the formula: $MCo_{1-d}M^3_dO_2$ wherein M is at least one metal selected from the group consisting of, Li, Na, and K; $0 \le d \le 0.5$; $M^3$ is at least one metal selected from the group consisting of Fe, Ni, Mn, Cu, Zn, Al, Sn, Cr, V, Ti, Mg, Ca, Sr, B, Ga, In, Si, and Ge. In the above, M is preferably one metal selected from the group consisting of Li, Na, and K, more preferably Li or Na, further preferably Li.

In view of enabling a high-output secondary battery having a high energy density to be provided, preferred among these are $MCoO_2$, $MMnO_2$, $MNiO_2$, $MMn_2O_4$, $MNi_{0.8}Co_{0.15}Al_{0.05}O_2$, $MNi_{1/3}Co_{1/3}Mn_{1/3}O_2$, and the like. A compound represented by the following general formula (3) is preferred:

$$MNi_hCo_iMn_jM^5_kO_2 \qquad (3)$$

wherein M is at least one metal selected from the group consisting of Li, Na, and K, $M^5$ represents at least one selected from the group consisting of Fe, Cu, Zn, Al, Sn, Cr, V, Ti, Mg, Ca, Sr, B, Ga, In, Si, and Ge, $(h+i+j+k)=1.0$, $0 \le h \le 1.0$, $0 \le i \le 1.0$, $0 \le j \le 1.5$, and $0 \le k \le 0.2$.

Examples of the alkali metal-containing transition metal phosphate compound include a compound represented by the following formula (4):

$$M_eM^4_f(PO_4)_g$$

wherein M is at least one metal selected from the group consisting of Li, Na, and K, $M^4$ represents at least one selected from the group consisting of V, Ti, Cr, Mn, Fe, Co, Ni, and Cu, $0.5 \le e \le 3$, $1 \le f \le 2$, and $1 \le g \le 3$. In the above, M is preferably one metal selected from the group consisting of Li, Na, and K, more preferably Li or Na, further preferably Li.

The transition metal of the lithium-containing transition metal phosphate compound is preferably V, Ti, Cr, Mn, Fe, Co, Ni, Cu, and the like. Specific examples thereof include iron phosphates such as $LiFePO_4$, $Li_3Fe_2(PO_4)_3$, and $LiFeP_2O_7$, cobalt phosphates such as $LiCoPO_4$, and those obtained by substituting some of transition metal atoms as main components of these lithium transition metal phosphate compounds with another element such as Al, Ti, V, Cr, Mn, Fe, Co, Li, Ni, Cu, Zn, Mg, Ga, Zr, Nb, or Si.

The lithium-containing transition metal phosphate compound is preferably one having an olivine-type structure.

Other examples of the positive electrode active material include $MFePO_4$, $MNi_{0.8}Co_{0.2}O_2$, $M_{1.2}Fe_{0.4}Mn_{0.4}O_2$, $MNi_{0.5}Mn_{1.5}O_2$, $MV_3O_6$, and $M_2MnO_3$. Particularly, positive electrode active materials such as $M_2MnO_3$ and $MNi_{0.5}Mn_{1.5}O_2$ are preferred because the crystal structure thereof does not collapse in the case where a secondary battery is operated at a voltage higher than 4.4 V or a voltage of 4.6 V or higher. Accordingly, an electrochemical device such as the secondary battery including the positive electrode material containing the positive electrode active material exemplified above is preferred, because the remaining capacity is unlikely to decrease, the resistance increase rate is unlikely to change even under storage at a high temperature, and additionally the battery performance does not deteriorate even in operation at a high voltage.

Other examples of the positive electrode active material also include solid solution materials of $M_2MnO_3$ and $MM^6O_2$, wherein M is at least one metal selected from the group consisting of Li, Na, and K, and $M^6$ is a transition metal such as Co, Ni, Mn, Fe, or the like.

Examples of the solid solution material include an alkali metal manganese oxide represented by the general formula $Mx[Mn_{(1-y)}M^7_y]O_z$. M in the formula here is at least one metal selected from the group consisting of Li, Na, and K, and $M^7$ comprises M and at least one metal element other than Mn including one or two or more elements selected from the group consisting of Co, Ni, Fe, Ti, Mo, W, Cr, Zr, and Sn, for example. The x, y, and z values in the formula are in the ranges of $1<x<2$, $0 \le y<1$, and $1.5<z<3$, respectively. Preferred among these are manganese-containing solid solution materials obtained by solutionizing $LiNiO_2$ or $LiCoO_2$ in $Li_2MnO_3$ as a base, for example, $Li_{1.2}Mn_{0.5}Co_{0.14}Ni_{0.14}O_2$, because of enabling an alkali metal ion secondary battery having a high energy density to be provided.

Incorporation of lithium phosphate in the positive electrode active material is preferred because continuous charge characteristics are improved. Use of lithium phosphate is not limited, and the positive electrode active material and the lithium phosphate are preferably mixed for use. The lower limit of the amount of lithium phosphate to be used is preferably 0.1% by mass or more, more preferably 0.3% by mass or more, further preferably 0.5% by mass or more, and the upper limit thereof is preferably 10% by mass or less, more preferably 8% by mass or less, further preferably 5% by mass or less, with respect to the total of the positive electrode active material and lithium phosphate.

Examples of the above sulfur-based material may include materials containing a sulfur atom. At least one selected from the group consisting of simple sulfur, a metal sulfide, and an organosulfur compound is preferred, and simple sulfur is more preferred. The above metal sulfide may be a metal polysulfide. The above organosulfur compound may be an organic polysulfide.

Examples of the above metal sulfide include a compound represented by $LiS_x$ ($0<x \le 8$); a compound represented by $Li_2S_x$ ($0<x \le 8$); a compound having a two-dimensional layered structure such as $TiS_2$ or $MoS_2$; and a Chevrel compound represented by the general formula $Me_xMo_6S_8$ (Me represents various transition metals, such as Pb, Ag, and Cu, $0<x \le 8$), which have a strong three-dimensional skeleton structure.

Examples of the above organosulfur compound include a carbon sulfide compound.

The organosulfur compound may be supported on a porous material such as carbon and thereby may be used as a carbon composite material. The content of sulfur contained in the carbon composite material is preferably 10 to 99% by mass, more preferably 20% by mass or more, further preferably 30% by mass or more, particularly preferably 40% by mass or more, while preferably 85% by mass or less, with respect to the carbon composite material, in view of further excellent cycle characteristics and further reduced overvoltage.

When the positive electrode active material is the above simple sulfur, the content of sulfur contained in the positive electrode active material is equivalent to the content of the above sulfur.

Examples of the conductive polymer include a p-doped conductive polymer and an n-doped conductive polymer. Examples of the conductive polymer include a polyacetylene-based polymer, a polyphenylene-based polymer, a heterocyclic polymer, an ionic polymer, a ladder-shaped polymer, and a network polymer.

One with a substance having a compositional feature different from that of the positive electrode active material attached to a surface of the positive electrode active material may be used. Examples of the substance attached to the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; and carbon.

Such a substance attached to the surface may be attached to a surface of the positive electrode active material by, for example, a method of dissolving or suspending the substance in a solvent, impregnating and adding the solution or suspension into the positive electrode active material, and drying the material; a method of dissolving or suspending a precursor of the substance attached to the surface in a solvent, impregnating and adding the solution or suspension into the positive electrode active material, and cause a reaction between the material and the precursor by heating or the like; a method of adding the substance to a precursor of the positive electrode active material and simultaneously sintering the materials; or the like. In the case of attaching carbon, for example, a carbonaceous material in the form of activated carbon may be mechanically attached to the surface afterward.

The lower limit of the amount of the substance attached to the surface is preferably 0.1 ppm or more, more preferably 1 ppm or more, further preferably 10 ppm or more, and the upper limit thereof is preferably 20% or less, more preferably 10% or less, further preferably 5% or less, in terms of mass, with respect to the positive electrode active material. The substance attached to the surface can suppress oxidation reaction of the electrolytic solution on the surface of the positive electrode active material, improving the battery life. However, an excessively small amount of the substance attached may fail to sufficiently provide this effect, and an excessively large amount thereof may hinder the entrance and exit of lithium ions, thereby increasing the resistance.

Examples of the shape of particles of the positive electrode active material include a bulky shape, a polyhedral shape, a spherical shape, an ellipsoidal shape, a plate shape, a needle shape, and a pillar shape, as conventionally used. Primary particles may agglomerate to form secondary particles.

The tap density of the positive electrode active material is preferably 0.5 g/cm$^3$ or more, more preferably 0.8 g/cm$^3$ or more, further preferably 1.0 g/cm$^3$ or more. If the positive electrode active material has a tap density falling below the lower limit, the amount of a dispersion medium required may increase as well as the amounts of a conductive material and a binder required may increase in formation of the positive electrode active material layer. Then, the packing ratio of the positive electrode active material in the positive electrode active material layer is limited to result in limitation on the battery capacity in some cases. Use of a composite oxide powder having a high tap density enables a positive electrode active material layer having a high density to be formed. Generally the tap density is preferably as high as possible and has no particular upper limit. An excessively high tap density may cause diffusion of lithium ions through the electrolytic solution as the medium in the positive electrode active material layer to be a rate-controlling factor, and then, the load characteristics may be more likely to deteriorate. Accordingly, the upper limit thereof is preferably 4.0 g/cm$^3$ or less, more preferably 3.7 g/cm$^3$ or less, further preferably 3.5 g/cm$^3$ or less.

In the present disclosure, the tap density is determined as a powder packing density (tap density) g/cm$^3$ when 5 to 10 g of the positive electrode active material powder is packed into a 10-ml glass graduated cylinder and the cylinder is tapped 200 times with a stroke of about 20 mm.

The particles of the positive electrode active material have a median size d50 (or a secondary particle size when the primary particles agglomerate to form secondary particles) of preferably 0.3 μm or more, more preferably 0.5 μm or more, further preferably 0.8 μm or more, most preferably 1.0 μm or more, while preferably 30 μm or less, more preferably 27 μm or less, further preferably 25 μm or less, most preferably 22 μm or less. The median size falling below the lower limit may fail to provide a product having a high tap density. The median size greater than the upper limit may prolong diffusion of lithium in the particles. Thus, the battery performance may deteriorate, or in formation of the positive electrode for a battery, i.e., when the active material and components such as a conductive material and a binder are formed into slurry by adding a solvent and the slurry is applied in the form of a thin film, there occur problems such as generation of streaks. Mixing two or more positive electrode active materials having different median sizes d50 can further improve packability in formation of the positive electrode.

In the present disclosure, the median size d50 is measured using a known laser diffraction/scattering particle size distribution measurement apparatus. In the case of using LA-920 manufactured by Horiba, Ltd. as the particle size distribution analyzer, the dispersion medium used in the measurement is a 0.1% by mass sodium hexametaphosphate aqueous solution, the measurement refractive index is set to 1.24 after 5-minute ultrasonic dispersion, and then measurement is performed.

When the primary particles agglomerate to form secondary particles, the average primary particle size of the positive electrode active material is preferably 0.05 μm or more, more preferably 0.1 μm or more, further preferably 0.2 μm or more. The upper limit thereof is preferably 5 μm or less, more preferably 4 μm or less, further preferably 3 μm or less, most preferably 2 μm or less. When the average primary particle size is larger than the upper limit, it is difficult to form spherical secondary particles. Then, the powder packability may be adversely affected, the specific surface area may significantly decrease, and thus the battery performance such as output characteristics is highly likely to deteriorate. In contrast, when the average primary particle size falls below the lower limit, crystals are usually insufficiently grown, causing problems such as poor charge and discharge reversibility in some cases.

In the present disclosure, the primary particle size is measured by scanning electron microscopic (SEM) observation. Specifically, the primary particle size is determined by selecting 50 primary particles in a photograph at a magnification of 10,000×, measuring the maximum length between the left and right boundary lines of each primary particle along the horizontal line, and then, calculating the average value of the maximum lengths.

The BET specific surface area of the positive electrode active material is preferably 0.1 $m^2/g$ or more, more preferably 0.2 $m^2/g$ or more, further preferably 0.3 $m^2/g$ or more. The upper limit thereof is preferably 50 $m^2/g$ or less, more preferably 40 $m^2/g$ or less, further preferably 30 $m^2/g$ or less. If the BET specific surface area is smaller than this range, the battery performance is likely to deteriorate. If the BET specific surface area is larger than this range, the tap density is less likely to increase, and a problem may be likely to occur in the coating property in formation of the positive electrode active material layer.

In the present disclosure, the BET specific surface area is defined by a value measured by single point BET nitrogen adsorption method by a gas flow method using a surface area analyzer (e.g., fully automatic surface area measurement device, Ohkura Riken Co., Ltd.), a sample pre-dried in nitrogen stream at 150° C. for 30 minutes, and then a nitrogen-helium gas mixture with the nitrogen pressure relative to the atmospheric pressure being accurately adjusted to 0.3.

When the secondary battery of the present disclosure is used as a large-size lithium ion secondary battery for hybrid vehicles or distributed generation, high output is required. Thus, the particles of the positive electrode active material are preferably mainly composed of secondary particles.

The particles of the positive electrode active material preferably include 0.5 to 7.0% by volume of fine particles having an average secondary particle size of 40 μm or less and having an average primary particle size of 1 μm or less. Incorporation of fine particles having an average primary particle size of 1 μm or less enlarges the contact area with the electrolytic solution and can accelerate diffusion of lithium ions between the electrode and the electrolytic solution, resulting in improvement in the output performance of the battery.

A method for producing the positive electrode active material to be used is a common method as a method for producing an inorganic compound. In particular, for production of a spherical or ellipsoidal active material, various methods can be contemplated. Such a method is exemplified in which a raw material substance of transition metal is dissolved or crushed and dispersed in a solvent such as water, the pH of the solution or dispersion is adjusted under stirring to form a spherical precursor, the precursor is recovered and, if necessary, dried, then, a Li source such as LiOH, $Li_2CO_3$, or $LiNO_3$ is added thereto, and the mixture is sintered at a high temperature, thereby providing an active material.

For production of the positive electrode, one of the positive electrode active materials described above may be used singly, or two or more such materials each having a different compositional feature may be used in any combination at any ratio. Preferred examples of the combination in this case include a combination of $LiCoO_2$ and $LiMn_2O_4$ or one in which part of Mn may be replaced by a different transition metal or the like, such as $LiNi_{0.33}Co_{0.33}Mn_{0.33}O_2$, and a combination with $LiCoO_2$ or one in which part of Co may be replaced by a different transition metal.

The content of the positive electrode active material is preferably 50 to 99.5% by mass, more preferably 80 to 99% by mass with respect to positive electrode mixture, in view of a high battery capacity. The content of the positive electrode active material in the positive electrode active material layer is preferably 80% by mass or more, more preferably 82% by mass or more, particularly preferably 84% by mass or more. The upper limit is preferably 99% by mass or less, more preferably 98% by mass or less. An excessively small content of the positive electrode active material in the positive electrode active material layer may cause an insufficient electric capacity. In contrast, an excessively large content thereof may cause insufficient strength of the positive electrode.

The positive electrode mixture preferably further contains a binder, a thickening agent, and a conductive material.

The binder to be used may be any material that is safe against a solvent to be used in production of the electrode and the electrolytic solution. Examples thereof include resin polymers such as polyethylene, polypropylene, polyethylene terephthalate, polymethyl methacrylate, aromatic polyamide, chitosan, alginic acid, polyacrylic acid, polyimide, cellulose, and nitro cellulose; rubbery polymers such as SBR (styrene-butadiene rubber), isoprene rubber, butadiene rubber, fluoroelastomers, NBR (acrylonitrile-butadiene rubber), and ethylene-propylene rubber; styrene-butadiene-styrene block copolymers and hydrogenated products thereof; thermoplastic elastomeric polymers such as EPDM (ethylene-propylene-diene terpolymers), styrene-ethylene-butadiene-styrene copolymers, and styrene-isoprene-styrene block copolymers and hydrogenated products thereof; soft resin polymers such as syndiotactic-1,2-polybutadiene, polyvinyl acetate, ethylene-vinyl acetate copolymers, and propylene-α-olefin copolymers; fluoropolymers such as polyvinylidene fluoride, polytetrafluoroethylene, vinylidene fluoride copolymer, and tetrafluoroethylene-ethylene copolymers; and polymer compositional features having ion conductivity of alkali metal ions (especially, lithium ions). One of these may be used singly, or two or more thereof may be used in any combination at any ratio.

The content of the binder, as the proportion of the binder in the positive electrode active material layer, is usually 0.1% by mass or more, preferably 1% by mass or more, further preferably 1.5% by mass or more, while usually 80% by mass or less, preferably 60% by mass or less, further preferably 40% by mass or less, most preferably 10% by mass or less. An excessively low proportion of the binder may fail to sufficiently hold the positive electrode active material and cause insufficient mechanical strength of the positive electrode, and the battery performance such as cycle characteristics may deteriorate. In contrast, an excessively high proportion thereof may cause reduction in battery capacity and conductivity.

Examples of the thickening agent include carboxymethyl cellulose, methyl cellulose, hydroxymethyl cellulose, ethyl cellulose, polyvinyl alcohol, oxidized starch, monostarch phosphate, casein, polyvinylpyrrolidone, and salts thereof. One of these may be used singly, or two or more thereof may be used in any combination at any ratio.

The proportion of the thickening agent with respect to the active material is in the range of usually 0.1% by mass or more, preferably 0.2% by mass or more, more preferably 0.3% by mass or more, while usually 5% by mass or less, preferably 3% by mass or less, more preferably 2% by mass or less. If the proportion falls below this range, the coating property may significantly deteriorate. If the proportion exceeds this range, the proportion of the active material in the positive electrode active material layer decreases, and there may be problems such as decrease in the capacity of the battery and increase in the resistance between the positive electrode active materials.

The conductive material to be used may be any known conductive material. Specific examples thereof include metal materials such as copper and nickel, and carbon materials such as graphite, including natural graphite and artificial graphite, carbon black, including acetylene black, Ketjen black, channel black, furnace black, lamp black, and thermal black, and amorphous carbon, including needle coke, carbon nanotube, fullerene, and VGCF. One of these may be used singly, or two or more thereof may be used in any combination at any ratio. The conductive material to be used is contained in an amount of usually 0.01% by mass or more, preferably 0.1% by mass or more, more preferably 1% by mass or more, while usually 50% by mass or less, preferably 30% by mass or less, more preferably 15% by mass or less, in positive electrode active material layer. If the content thereof is smaller than this range, the electrical conductivity may become insufficient. In contrast, if the content thereof is larger than this range, the battery capacity may decrease.

The type of solvent for forming a slurry is not limited as long as the solvent can dissolve or disperse therein the positive electrode active material, the conductive material, and the binder, as well as a thickening agent used as appropriate. The solvent may be either an aqueous solvent or an organic solvent. Examples of the aqueous solvent include water and solvent mixtures of an alcohol and water. Examples of the organic solvent include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethyl formamide, and dimethyl acetamide; and aprotic polar solvents such as hexamethylphospharamide and dimethyl sulfoxide.

Examples of the material of the current collector for a positive electrode include metal materials including metals such as aluminum, titanium, tantalum, stainless steel, and nickel, and alloys thereof; and carbon materials such as carbon cloth and carbon paper. Preferred among these are metal materials, especially aluminum or an alloy thereof.

In the case of a metal material, the current collector may be in the form of metal foil, metal cylinder, metal coil, metal plate, metal thin film, expanded metal, punched metal, metal foam, or the like. In the case of a carbon material, the current collector may be in the form of carbon plate, carbon thin film, carbon cylinder, or the like. Preferred among these is a metal thin film. The thin film may be in the form of mesh, as appropriate. The thin film may have any thickness, and the thickness is usually 1 μm or more, preferably 3 μm or more, more preferably 5 μm or more, while usually 1 mm or less, preferably 100 μm or less, more preferably 50 μm or less. If the thin film is thinner than the above range, the strength thereof may become insufficient required for a current collector. In contrast, if the thin film is thicker than this range, the handleability may be impaired.

Application of a conductive aid on the surface of the current collector is also preferred from the viewpoint of reduction in the electric contact resistance between the current collector and the positive electrode active material layer. Examples of the conductive aid include carbon and noble metals such as gold, platinum, and silver.

The ratio between the thicknesses of the current collector and the positive electrode active material layer is not limited. The value (thickness of positive electrode active material layer on one side immediately before injection of electrolytic solution)/(thickness of current collector) is in the range of preferably 20 or less, more preferably 15 or less, most preferably 10 or less, while preferably 0.5 or more, more preferably 0.8 or more, most preferably 1 or more. If the value exceeds this range, the current collector may generate heat due to Joule heating during high-current-density charge and discharge. If the value falls below this range, the ratio by volume of the current collector to the positive electrode active material increases, and the battery capacity may decrease.

The positive electrode may be produced by a usual method. An example of the production method includes a method in which the positive electrode active material is mixed with the above binder, thickening agent, conductive material, solvent, and the like to form a slurry-like positive electrode mixture, and then this mixture is applied to a current collector, dried, and pressed so as to enhance the density.

The density can be enhanced with a manual press, a roll press, or the like. The density of the positive electrode active material layer is in the range of preferably 1.5 g/cm$^3$ or more, more preferably 2 g/cm$^3$ or more, further preferably 2.2 g/cm$^3$ or more, while preferably 5 g/cm$^3$ or less, more preferably 4.5 g/cm$^3$ or less, further preferably 4 g/cm$^3$ or less. If the density exceeds this range, the permeability of the electrolytic solution toward the vicinity of the interface between the current collector and the active material decreases, charge and discharge characteristics deteriorate particularly at a high current density, and thus, high output may not be provided. If the density falls below the range, the electrical conductivity between the active materials may decrease, the battery resistance may increase, and thus, high output may not be provided.

In use of the electrolytic solution of the present disclosure or the electrolytic solution for use in the alkali metal secondary battery of the present disclosure, from the viewpoint of improvement in the stability at high output and high temperature, the area of the positive electrode active material layer is preferably large relative to the outer surface area of an external case of the battery. Specifically, the sum of the electrode areas of the positive electrode is preferably 15 times or more, more preferably 40 times or more, larger than the surface area of the external case of the secondary battery. The outer surface area of an external case of the battery herein, for a bottomed square shape, refers to the total area calculated from the dimensions of length, width, and thickness of the case portion into which a power-generating element is packed except for a protruding portion of a terminal. The outer surface area of an external case of the battery herein, for a bottomed cylindrical shape, refers to the geometric surface area of an approximated cylinder of the case portion into which a power-generating element is packed except for a protruding portion of a terminal. The sum of the electrode areas of the positive electrode herein is the geometric surface area of the positive electrode mixture layer opposite to a mixture layer including the negative electrode active material. For structures including positive electrode mixture layers formed on both sides with a current collector foil interposed therebetween, the sum of electrode areas of the positive electrode is the sum of the areas calculated on the respective sides.

The thickness of the positive electrode plate is not limited. From the viewpoint of a high capacity and high output, the thickness of the mixture layer on one side of the current collector excluding the thickness of the metal foil of the core material is, as the lower limit, preferably 10 µm or more, more preferably 20 µm or more, while preferably 500 µm or less, more preferably 450 µm or less.

There may be used a positive electrode plate onto a surface of which a substance having a compositional feature different from the positive electrode plate is attached. Examples of the substance attached to the surface include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, calcium carbonate, and magnesium carbonate; and carbon.

<Separator>

The secondary battery of the present disclosure preferably further comprises a separator.

The material or shape of the separator is not limited and known one may be used as long as the separator is stable to the electrolytic solution and excellent in a liquid-retaining ability. In particular, it is preferred to use a separator in the form of a porous sheet or a nonwoven fabric for which a resin, a glass fiber, inorganic matter, or the like formed of a material stable to the electrolytic solution of the present disclosure or the electrolytic solution for use in the alkali metal secondary battery of the present disclosure and which has excellent liquid-retaining ability.

Examples of the material of a resin or glass-fiber separator that can be used include polyolefins such as polyethylene and polypropylene, aromatic polyamide, polytetrafluoroethylene, polyether sulfone, and glass filters. One of these materials may be used singly or two or more of these may be used in any combination at any ratio, for example, in the form of a polypropylene/polyethylene bilayer film or a polypropylene/polyethylene/polypropylene trilayer film. Among these, the above separator is preferably a porous sheet or a nonwoven fabric formed from a polyolefin such as polyethylene or polypropylene as the raw material, in view of favorable permeability of the electrolytic solution and a favorable shut-down effect.

The separator may have any thickness, and the thickness is usually 1 µm or more, preferably 5 µm or more, further preferably 8 µm or more, while usually 50 µm or less, preferably 40 µm or less, further preferably 30 µm or less. If the separator is excessively thinner than the above range, the insulation and mechanical strength may decrease. If the separator is excessively thicker than the above range, not only the battery performance such as rate characteristics may deteriorate but also an energy density of the whole electrolytic solution battery may decrease.

When a separator which is a porous one such as a porous sheet or a nonwoven fabric is used, the separator may have any porosity. The porosity is usually 20% or more, preferably 35% or more, further preferably 45% or more, while usually 90% or less, preferably 85% or less, more preferably 75% or less. If the porosity is excessively smaller than the above range, the film resistance may increase, and the rate characteristics tends to deteriorate. If the porosity is excessively larger than the above range, the mechanical strength of the separator may decrease, and the insulation tends to decrease.

The separator may have any average pore size, and the average pore size is usually 0.5 µm or less, preferably 0.2 µm or less, while usually 0.05 µm or more. If the average pore size exceeds the above range, short circuits easily occur. If the average pore size falls below the above range, the film resistance may increase, and the rate characteristics may deteriorate.

Meanwhile, examples of the inorganic matter to be used include oxides such as alumina and silicon dioxide, nitrides such as aluminum nitride and silicon nitride, and sulfates such as barium sulfate and calcium sulfate, each in the form of particles or fibers.

The separator is used in the form of a thin film such as a nonwoven fabric, a woven fabric, or a microporous film. The thin film form to be used suitably has a pore size of 0.01 to 1 µm and a thickness of 5 to 50 µm. Other than the above separate thin film form, a separator may be used in which a composite porous layer containing particles of the above inorganic matter is formed on a surface layer of the positive electrode and/or negative electrode using a resin binder.

For example, alumina particles having a 90% particle size of smaller than 1 µm may be employed to form a porous layer on both the surfaces of the positive electrode using fluororesin as a binder.

<Battery Design>

The electrode group may have either a laminate structure including the above positive electrode plate and negative electrode plate with the above separator interposed therebetween, or a wound structure including the above positive electrode plate and negative electrode plate wound in a spiral form with the above separator interposed therebetween. The proportion of the volume of the electrode group in the battery internal volume (hereinafter, referred to as an electrode group occupancy) is usually 40% or more, preferably 50% or more, while usually 90% or less, preferably 80% or less.

If the electrode group occupancy falls below the above range, the battery capacity is lowered. If the electrode group occupancy exceeds the above range, the void space is small, and the battery temperature elevates. Thereby the members expand and the vapor pressure of the liquid component of the electrolyte increases to raise the internal pressure. This may deteriorate characteristics of the battery such as charge and discharge repeatability and high-temperature storage and may further actuate a gas-releasing valve for releasing the internal pressure to the outside.

The current collecting structure is not limited. In order to more effectively improve the high-current-density charge and discharge characteristics by the electrolytic solution of the present disclosure or the electrolytic solution for use in the alkali metal secondary battery of the present disclosure, the current collecting structure is preferably configured to reduce the resistance at wiring portions and joint portions. When the internal resistance is reduced in this manner, effects due to use of the electrolytic solution of the present disclosure or the electrolytic solution for use in the alkali metal secondary battery of the present disclosure are particularly favorably exerted.

In an electrode group having the above laminate structure, suitably used is a structure formed by bundling the metal core portions of the respective electrode layers to weld the bundled portions to a terminal. When an electrode has a large area, the internal resistance increases. Thus, a plurality of terminals may be suitably provided in the electrode so as to reduce the resistance. In an electrode group having the wound structure, a plurality of lead structures may be provided on each of the positive electrode and the negative electrode and bundled to a terminal to thereby reduce the internal resistance.

The material of the external case is not limited as long as the material is stable to an electrolytic solution to be used. Specific examples thereof include metals such as nickel-plated steel plates, stainless steel, aluminum and aluminum alloys, and magnesium alloys, or a layered film (laminate film) of a resin and aluminum foil. From the viewpoint of weight reduction, a metal such as aluminum or an aluminum alloy or a laminate film is suitably used.

Examples of an external case including metal include one having a sealed-up structure formed by welding the metal by laser welding, resistance welding, or ultrasonic welding, or one having a caulking structure provided using the metal via a resin gasket. Examples of an external case including a laminate film include ones having a sealed-up structure formed by hot-melting resin layers. A resin different from the resin of the laminate film may be interposed between the resin layers in order to improve the sealability. In particular, in the case of forming a sealed-up structure by hot-melting the resin layers with current collecting terminals interposed therebetween, metal and resin are to be bonded. Thus, the resin to be interposed between the resin layers to be used is suitably a resin having a polar group or a modified resin having a polar group introduced therein.

The secondary battery of the present disclosure may have any shape and examples thereof include a cylindrical shape, a square shape, a laminate shape, a coin shape, and a large-size shape. The shapes and the constitutions of the positive electrode, the negative electrode, and the separator may be changed for use in accordance with the shape of each of the battery.

A module comprising the secondary battery of the present disclosure is also an aspect of the present disclosure.

EXAMPLES

Next, the present disclosure will be described with reference to Examples, but the present disclosure is not intended to be limited to these Examples.

Unless otherwise specified in the following Examples, "parts" and "%" represent "parts by mass" and "% by mass", respectively.

<Production of Alkali Metal Electrode>

The following compounds and fluorine-containing polymer were used in Production Examples.

[Formula 69]

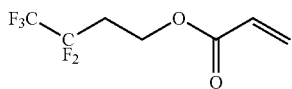
Compound A-1

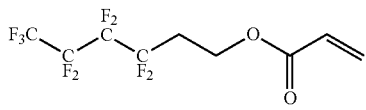
Compound A-2

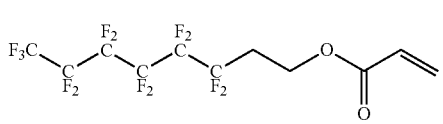
Compound A-3

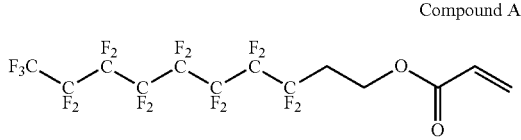
Compound A-4

[Formula 70]

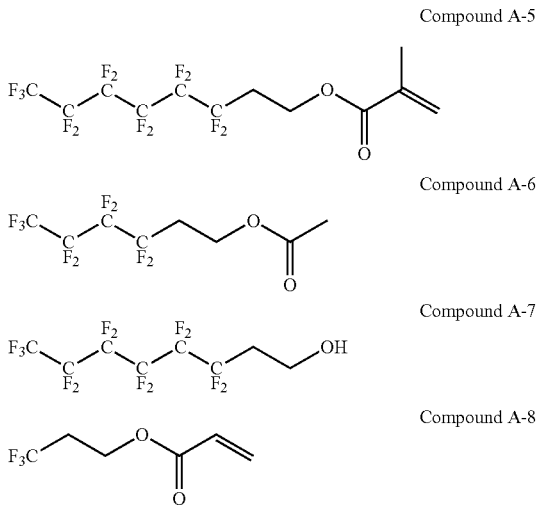

Fluorine-Containing Polymer: B-1

Perfluorohexylethyl methacrylate ($CH_2$=$C(CH_3)$ $COOCH_2CH_2C_6F_{13}$/isobornyl methacrylate=100/19 (mass ratio) copolymer (polymer weight average molecular weight: 100,500)

Production Examples 1 to 13 and Comparative Production Examples 1 to 4

Each coating solution was prepared using the above acrylate, fluorine-containing polymer, and an HFE 7200 solvent so as to have the solid concentration shown in Table 1. Immersed was 0.5-mm thick lithium metal foil in 100 g of the coating solution for one hour, and the treated lithium metal was dried to remove the solvent to thereby provide a coated alkali metal.

TABLE 1

| | Compound/ fluorine-containing polymer | Solid concentration (% by weight) |
|---|---|---|
| Production Example 1 | A-1 | 0.01 |
| Production Example 2 | | 0.1 |
| Production Example 3 | | 0.5 |
| Production Example 4 | | 1 |
| Production Example 5 | | 2 |
| Production Example 6 | | 5 |
| Production Example 7 | | 20 |
| Production Example 8 | | 50 |
| Production Example 9 | | 100 |
| Production Example 10 | A-2 | 5 |
| Production Example 11 | A-3 | 5 |
| Production Example 12 | A-5 | 5 |
| Production Example 13 | B-1 | 5 |
| Comparative Production Example 1 | A-6 | 5 |
| Comparative Production Example 2 | A-7 | 5 |
| Comparative Production Example 3 | | 100 |
| Comparative Production Example 4 | A-4 | 5 |

Examples 1 to 13 and Comparative Examples 1 to 5

The coated lithium metal provided in each of Production Examples 1 to 13 and Comparative Production Examples 1 to 4 was used to conduct a lithium precipitation/dissolution test and a battery test in the following manner. The results are shown in Table 2.

[Lithium Precipitation/Dissolution Test]

Round copper foil having a diameter of 1.3 mm was used as a working electrode, each of the treated lithium metals was used as a counter electrode, and a polypropylene-based microporous film was used as a separator. For the electrolytic solution, solvents having high permittivity, ethylene carbonate and fluoroethylene carbonate and a solvent having a low viscosity, ethylmethyl carbonate were mixed so that the volume ratio reached 20/10/70. $LiPF_6$ was added thereto at a concentration of 1.0 mol/L to thereby prepare a non-aqueous electrolytic solution.

The test was conducted at a current density of 1.33 $mA/cm^2$ by allowing 1 coulomb to flow for precipitation and 1 coulomb to flow for dissolution. In the lithium precipitation/dissolution test, the cycle at which polarization on dissolution exceeded 200 mV was defined as the life.

<Battery Test>

[Production of Positive Electrode]

In a N-methylpyrrolidone solvent, 96% by weight of $LiNi_{0.6}Co_{0.2}Mn_{0.2}O_2$ (NMC) as a positive electrode active material, 2.5% by weight of acetylene black as a conductive material, and 1.5% by weight of polyvinylidene fluoride (PVdF) as a binder were mixed to form a slurry. The resulting slurry was applied to one surface of 15-μm thick aluminum foil with a conductive aid applied thereto in advance, and dried. The foil was then roll-pressed using a press and cut to provide a piece including an active material layer having a width of 50 mm and a length of 30 mm and an uncoated portion having a width of 5 mm and a length of 9 mm as a positive electrode.

[Production of Aluminum Laminate Cell]

The above positive electrode was faced to the lithium negative electrode produced in each Production Example (width: 52 mm, length: 32 mm) roll-pressed onto Ni mesh with a 20-μm thick microporous polyethylene film (separator) interposed therebetween. The non-aqueous electrolytic solution provided above was injected therein, and the non-aqueous electrolytic solution was made to sufficiently permeate into the separator and the like. Thereafter, the assembly was sealed, then pre-charged, and aged to thereby produce a lithium ion secondary battery.

(Measurement of Battery Characteristics)

[Cycle Characteristic Test]

Each of the lithium ion secondary batteries produced above in a state of being sandwiched and pressurized between plates was subjected to constant-current constant-voltage charging to 4.4 V at 25° C. and a current corresponding to 1 C (hereinafter, denoted by CC/CV charging) (0.1 C cutting), and then discharged to 3 V at a constant current of 1 C. This was counted as one cycle, and the discharge capacity at the third cycle was used to determine the initial discharge capacity. The cycles were again performed, and the discharge capacity after the 100th cycle was determined as the capacity after cycles. The proportion of the discharge capacity after the 100th cycle to the initial discharge capacity was determined. This value was defined as the cycle capacity retention (%).

(Discharge capacity after 100th cycle)/(initial discharge capacity)×100=capacity retention (%)

The results are shown in Table 2.

[Evaluation of IV Resistance]

The battery after the evaluation of the initial discharge capacity was charged at a constant current of 1 C and at 25° C. so as to have a capacity that was half the initial discharge capacity. This was discharged at 2.0 C, and the voltage at the 10th second was measured. The resistance was calculated from the voltage drop during discharge, which was defined as the initial IV resistance. The resistance of the battery after the cycle test was also calculated in the same manner and defined as the IV resistance after cycles. The resistance increase rate was calculated as follows.

(IV resistance after 100th cycle)/(initial IV resistance)×100=resistance increase rate (%)

The results are shown in Table 2.

TABLE 2

| | Negative electrode material | Lithium dissolution/ precipitation test (cycles) | Cycle life (%) | Resistance increase rate (%) |
|---|---|---|---|---|
| Example 1 | Production Example 1 | 315 | 81 | 161 |
| Example 2 | Production Example 2 | 325 | 81 | 160 |
| Example 3 | Production Example 3 | 355 | 84 | 158 |
| Example 4 | Production Example 4 | 381 | 85 | 156 |
| Example 5 | Production Example 5 | 411 | 87 | 157 |
| Example 6 | Production Example 6 | 452 | 88 | 156 |
| Example 7 | Production Example 7 | 440 | 90 | 155 |
| Example 8 | Production Example 8 | 412 | 91 | 151 |
| Example 9 | Production Example 9 | 391 | 95 | 141 |
| Example 10 | Production Example 10 | 511 | 93 | 133 |
| Example 11 | Production Example 11 | 499 | 91 | 144 |
| Example 12 | Production Example 12 | 503 | 96 | 155 |
| Example 13 | Production Example 13 | 211 | 81 | 131 |
| Comparative Example 1 | Comparative Production Example 1 | 85 | 41 | 291 |
| Comparative Example 2 | Comparative Production Example 2 | 90 | 10 | 310 |
| Comparative Example 3 | Comparative Production Example 3 | 88 | — | — |
| Comparative Example 4 | Li metal | 86 | 5 | 454 |
| Comparative Example 5 | Comparative Production Example 4 | 195 | 61 | 221 |

Examples 14 to 17 and Comparative Examples 6 to 8

[Preparation of Electrolytic Solution and Treatment Agent]

A solvent having high permittivity, ethylene carbonate and a solvent having a low viscosity, dimethyl carbonate were mixed so that the volume ratio reached 40/60. $LiPF_6$ was added thereto at a concentration of 1.2 mol/L to thereby prepare a non-aqueous electrolytic solution. To the non-aqueous electrolytic solution, 1% by mass of an acrylate compound and a fluorine-containing polymer was added to provide an electrolytic solution.

[Production of Positive Electrode]

A N-methyl-2-pyrrolidone dispersion of $LiNi_{0.5}Mn_{1.5}O_4$ as a positive electrode active material, acetylene black as a conductive material, and polyvinylidene fluoride (PVdF) as a binder was used to prepare a positive electrode mixture slurry, in which the active material, conductive material, and binder were mixed at a solid ratio of 95/2/3 (% by mass ratio). The resulting positive electrode mixture slurry was uniformly applied to a 20-μm thick aluminum foil current collector followed by drying. Then, the collector was compression-molded with a press and cut to provide a round positive electrode having a diameter of 1.3 mm.

[Production of Coin Cell]

The above positive electrode was faced to the lithium negative electrode (diameter: 1.32 mm) roll-pressed onto Ni mesh with a 20-μm thick microporous polyethylene film (separator) interposed therebetween. The non-aqueous electrolytic solution provided above was injected therein, and the non-aqueous electrolytic solution was made to sufficiently permeate into the separator and the like. Thereafter, the assembly was sealed, then pre-charged, and aged to thereby produce a lithium ion secondary battery.

(Measurement of Battery Characteristics)

[Cycle Characteristic Test]

Each of the lithium ion secondary batteries produced above in a state of being sandwiched and pressurized between plates was subjected to constant-current constant-voltage charging to 4.95 V at 25° C. and a current corresponding to 1 C (hereinafter, denoted by CC/CV charging) (0.1 C cutting), and then discharged to 3 V at a constant current of 1 C. This was counted as one cycle, and the discharge capacity at the third cycle was used to determine the initial discharge capacity. The cycles were again performed, and the discharge capacity after the 50th cycle was determined as the capacity after cycles. The proportion of the discharge capacity after the 50th cycle to the initial discharge capacity was determined. This value was defined as the cycle capacity retention (%).

(Discharge capacity after 50th cycle)/(initial discharge capacity)×100=capacity retention (%)

The results are shown in Table 3.

[Evaluation of IV Resistance]

The initial IV resistance and the IV resistance after the 50th cycle were calculated in the same manner as in the above test to thereby calculate the resistance increase rate (%). The results are shown in Table 3.

TABLE 3

| | Monomer added | Lithium dissolution/ precipitation test (cycles) | Cycle life (%) | Resistance increase rate (%) |
|---|---|---|---|---|
| Example 14 | A-1 | 218 | 86 | 121 |
| Example 15 | A-2 | 203 | 87 | 119 |
| Example 16 | A-3 | 222 | 92 | 125 |
| Example 17 | A-5 | 185 | 88 | 116 |
| Comparative Example 6 | A-4 | 66 | 48 | 212 |
| Comparative Example 7 | A-8 | 56 | 55 | 230 |
| Comparative Example 8 | None | 53 | 31 | 255 |

It is clear from Table 2 and Table 3 that the present invention shows pronounced effects in the cycle life (%) and the resistance increase rate (%), in comparison with the case where Rf has one carbon atom (Comparative Example 7) or the case where Rf has 8 carbon atoms (Comparative Examples 5 and 6).

INDUSTRIAL APPLICABILITY

Batteries provided using the alkali metal electrode treatment agent or electrolytic solution of the present disclosure can be used as various power supply such as a portable power supply and a power source for automobiles.

The invention claimed is:

1. An electrolytic solution for an alkali metal secondary battery comprising an acrylate represented by the following general formula (1):

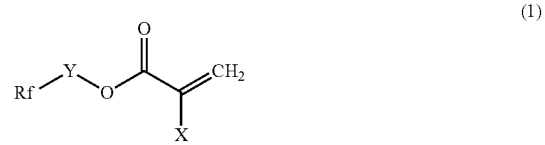

wherein X is a hydrogen atom, a fluorine atom, a chlorine atom, a bromine atom, an iodine atom, a $CFX^1X^2$ group (wherein $X^1$ and $X^2$ are the same as or different from each other and are each a hydrogen atom, a fluorine atom, or a chlorine atom), a cyano group, a linear or branched fluoroalkyl group having 1 to 21 carbon atoms, a substituted or unsubstituted benzyl group, a substituted or unsubstituted phenyl group, or a linear or branched alkyl group having 1 to 20 carbon atoms, Y is a direct bond, a hydrocarbon group having 1 to 10 carbon atoms and optionally having an oxygen atom or a sulfur atom, a —$CH_2CH_2N(R^1)SO_2$— group (wherein $R^1$ is an alkyl group having 1 to 4 carbon atoms), a —$CH_2CH(OY^1)CH_2$— group (wherein $Y^1$ is a hydrogen atom or an acetyl group), or a —$(CH_2)_nSO_2$— group (n is 1 to 10), and Rf is a linear or branched perfluoroalkyl group having 4 to 6 carbon atoms.

2. An alkali metal secondary battery using the electrolytic solution for an alkali metal secondary battery according to claim 1.

3. A module comprising the alkali metal secondary battery according to claim 2.

* * * * *